(12) United States Patent
Takeuchi et al.

(10) Patent No.: US 8,830,495 B2
(45) Date of Patent: Sep. 9, 2014

(54) IMAGE FORMING APPARATUS AND COMPUTER READABLE RECORDING MEDIUM

(71) Applicants: Naoki Takeuchi, Osaka (JP); Yoshiteru Nishikawa, Osaka (JP)

(72) Inventors: Naoki Takeuchi, Osaka (JP); Yoshiteru Nishikawa, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/736,467

(22) Filed: Jan. 8, 2013

(65) Prior Publication Data

US 2014/0022588 A1    Jan. 23, 2014

Related U.S. Application Data

(63) Continuation of application No. 12/167,496, filed on Jul. 3, 2008, now abandoned.

(30) Foreign Application Priority Data

| Jul. 6, 2007 | (JP) | 2007-178947 |
| Oct. 3, 2007 | (JP) | 2007-260388 |
| Oct. 3, 2007 | (JP) | 2007-260389 |
| Oct. 3, 2007 | (JP) | 2007-260390 |

(51) Int. Cl.
| G06F 3/12 | (2006.01) |
| G06K 15/00 | (2006.01) |
| H04N 1/00 | (2006.01) |
| H04N 1/32 | (2006.01) |
| H04N 1/23 | (2006.01) |

(52) U.S. Cl.
CPC ........ *G06K 15/40* (2013.01); *H04N 2201/3218* (2013.01); *H04N 1/00477* (2013.01); *H04N 1/32657* (2013.01); *H04N 1/00644* (2013.01); *H04N 2201/3219* (2013.01); *H04N 1/00408* (2013.01); *H04N 2201/0082* (2013.01); *H04N 1/00832* (2013.01); *H04N 2201/3221* (2013.01); *H04N 1/00416* (2013.01); *H04N 1/2392* (2013.01); *H04N 1/32635* (2013.01)
USPC ........................................ 358/1.13; 358/1.15

(58) Field of Classification Search
CPC .................................................. H04N 1/00435
USPC .................................................... 358/1.15
See application file for complete search history.

(56) References Cited

U.S. PATENT DOCUMENTS

| 2003/0011640 A1* | 1/2003 | Green et al. ............ 345/810 |
| 2004/0153688 A1* | 8/2004 | Yamamoto et al. ........ 714/1 |
| 2004/0160630 A1* | 8/2004 | Iriyama et al. ........... 358/1.15 |

(Continued)

FOREIGN PATENT DOCUMENTS

| JP | 2007-136930 | 6/2007 |
| JP | 2007136930 A * | 6/2007 |

*Primary Examiner* — Benjamin O Dulaney

(57) ABSTRACT

An image forming apparatus comprises a display unit; and a display controlling unit that causes the display unit to display a first ready screen and a second ready screen. The first ready screen is displayed when a job can be accepted, and the first ready screen indicates that a job can be accepted and has a first button for detecting operator's input of a request for displaying a screen having first information. The second ready screen is displayed when a job can be accepted after input of the request is detected, and the second ready screen has the first information and has a second button for detecting input of a request for displaying second information other than the first information.

10 Claims, 28 Drawing Sheets

(56) References Cited

U.S. PATENT DOCUMENTS

| | | | |
|---|---|---|---|
| 2004/0190057 A1* | 9/2004 | Takahashi et al. | 358/1.15 |
| 2005/0105129 A1* | 5/2005 | Takahashi | 358/1.15 |
| 2005/0276448 A1* | 12/2005 | Pryor | 382/103 |
| 2006/0007469 A1* | 1/2006 | Uruma | 358/1.14 |
| 2006/0015434 A1* | 1/2006 | Lutnick et al. | 705/35 |
| 2006/0023243 A1* | 2/2006 | Asai | 358/1.13 |
| 2006/0028690 A1* | 2/2006 | Kunori | 358/401 |
| 2007/0041055 A1* | 2/2007 | Kotani | 358/448 |
| 2009/0009803 A1* | 1/2009 | Takeuchi et al. | 358/1.15 |

* cited by examiner

Ready to print.

| 1 | A4 | 2 | LT | 3 | A4 |
| 4 | A5 | 5 | B5 | MP | A6 |

[ REGISTER ]  [ SCREEN SWITCH ]

Ready to print.

SECTION A: 007382   SECTION B: 000308

SECTION C: 203414   SECTION D: 084392

[ REGISTER ]  [ SCREEN SWITCH ]

FIG.16

Ready to print.
A4          Plain

A4:XXXX     A3:XXXX     B5:XXXX

A5:XXXX     B4:XXXX     A6:XXXX

[MENU]   [SCREEN SWITCH]   [STATUS]

FIG.17

Ready to print.
A4          Plain

1:XXXX      2:XXXX      3:XXXX

4:XXXX      5:XXXX      MP:XXXX

[MENU]   [SCREEN SWITCH]   [STATUS]

Ready to print.

JAM20 : 04
JAM21 : 11
JAM22 : 00

[ SCREEN SWITCH ]

Ready to print.

WAITING PRINT JOB

1 : Mr.abc          DOCUMENT.doc

2 :

[ SCREEN SWITCH ]

Ready to print.

FINISHED PRINT JOB

1 : Mr.abc          UPPER TRAY

2 : Mr.xyz          TRAY #3

[ SCREEN SWITCH ]

Ready to print.

A4:XXXX    LT:XXXX    B4:XXXX

A5:XXXX    B5:XXXX    A6:XXXX

[ SCREEN SWITCH ]

IMAGE FORMING APPARATUS AND COMPUTER READABLE RECORDING MEDIUM

CROSS-REFERENCE TO RELATED APPLICATIONS

This application is a continuation application of U.S. application Ser. No. 12/167,496, filed on Jul. 3, 2008. This application also relates to and claims priority rights from Japanese Patent Application Nos. 2007-178947, filed on Jul. 6, 2007; 2007-260390, filed on Oct. 3, 2007; 2007-260389, filed on Oct. 3, 2007; and 2007-260388, filed on Oct. 3, 2007 the entire disclosures of which is hereby incorporated by reference herein.

BACKGROUND OF THE INVENTION

1. Field of the Invention

This invention relates to image forming apparatus and computer readable recording medium.

2. Description of the Related Art

As disclosed in Japanese patent application laid-open publication H01-180379, some image forming apparatuses display a remaining amount of toner on a ready screen indicating that a job can be accepted when a job of print processing etc. can be accepted.

SUMMARY OF THE INVENTION

However, in the image forming apparatuses mentioned above, information on consumable goods other than toner is not displayed on the ready screen indicating that a job can be accepted. Consequently, operators who need information on consumable goods other than toner may feel inconvenience to use the image forming apparatuses mentioned above.

In addition, some operators are end users who do not need information on consumable goods such as toner. Thus, in the image forming apparatuses mentioned above, unnecessary information to operators may be displayed, therefore it confuses some operators who do not need information on consumable goods, and the operators feel inconvenience.

Further, in the image forming apparatuses mentioned above, information other than predetermined information on toner is not displayed in the ready screen even if a next executable print job to be executed exists, and consequently enough information is not provided to operators who need information on the next executable print job to be executed and/or execution order of executable print jobs to be executed, and the operators feel inconvenience.

Furthermore, in the image forming apparatuses mentioned above, information other than predetermined information on toner is not displayed in the ready screen even if a finished print job exists, and consequently enough information is not provided to operators who need information on the finished print job, and the operators feel inconvenience.

In the image forming apparatuses mentioned above, if it is determined that an error on toner may occur during execution of a new print job, information indicating that an error on toner may occur can be provided to an operator in order to alert to the operator. Thus, in the image forming apparatuses mentioned above, for an error would occur due to toner, the operator refers to the displayed information and can cope with it in advance. However, in the image forming apparatuses mentioned above, information other than information on toner is not displayed on the ready screen, and hence in case that an error due to a factor other than toner may occur during execution of a new print job, any information on the factor is not provided to an operator. Consequently, it is difficult for the operator to cope in advance of the error, and the operator feels inconvenience.

In view of these issues on displaying the ready screen mentioned above, it is an object of the present invention to provide an image forming apparatus and a computer readable recording medium storing an image forming program capable of enhancing convenience for operators by causing a display unit to display necessary information for operators on a ready screen.

The present invention solves the subject as follows.

An image forming apparatus according to the first aspect of the present invention comprises (a) a display unit and (b) a display controlling unit that causes the display unit to display a first ready screen and a second ready screen. The first ready screen is displayed when a job can be accepted, and the first ready screen indicates that a job can be accepted and has a first button for detecting operator's input of a request for displaying a screen having first information. The second ready screen is displayed when a job can be accepted after the input is detected, and the second ready screen has the first information and has a second button for detecting input of a request for displaying second information other than the first information.

According to the first aspect, it is possible to choose information to be contained in a ready screen displayed by a display unit when a job can be accepted, and therefore convenience is enhanced for operators.

A computer readable recording medium according to the second aspect of the present invention stores an image forming program that can be installed in an image forming apparatus with a display unit and causes the display unit to display ready screens indicating that a job can be accepted. The image forming program causes a computer in the image forming apparatus to perform features comprising (a) a first display controlling feature for causing the display unit to display a first ready screen indicating that a job can be accepted when a job can be accepted and (b) a second display controlling feature for causing the display unit to display a second ready screen when a job can be accepted after detecting input operation on the first ready screen by an operator to request for displaying a screen that has first information. The second ready screen has the first information and a second button for detecting input of a request for displaying a screen that has second information other than the first information.

According to the second aspect, it is possible to choose information to be contained in a ready screen displayed by a display unit when a job can be accepted, and therefore convenience is enhanced for operators.

It should be noted that a "button" is a button with an area located in a ready screen in order to detect input of a display request and a register request of a default screen; a "job" is one of various sorts of jobs such as print process for printing according to data of a print request, copy process for copying a document etc. of a copy request, and scan process for scanning a document to generate an electronic file; and an "information record medium" may be, for example, a paper such as plain paper or a OHP (OverHead Projector) film.

An image forming apparatus according to the third aspect of the present invention comprises (a) a display unit, (b) a characteristic existence determining unit that determines whether a finished print job has a predetermined characteristic based on attribution information of the finished print job and/or a characteristic value on the finished print job and (c) a display controlling unit that causes the display unit to display a ready screen when a job can be accepted if the characteristic existence determining unit determines that a finished print job has a predetermined characteristic, the ready screen indicating that a job can be accepted and having information chosen from predetermined information according to the characteristic of the finished print job.

According to the third aspect, when a job can be accepted, the display unit displays a ready screen having predetermined information chosen based on a characteristic of a finished print job. Therefore, information suggesting an issue that would occur is provided to an operator and then the operator can cope in advance of the error, and consequently convenience is enhanced for operators.

An image forming apparatus according to the fourth aspect of the present invention comprises (a) a display unit, (b) a characteristic existence determining unit that determines whether a finished print job has a predetermined characteristic based on at least one of the type of the finished print job and a threshold set on the finished print job and (c) a display controlling unit that causes the display unit to display a ready screen when a job can be accepted if the characteristic existence determining unit determines that a finished print job has the predetermined characteristic. The ready screen indicates that a job can be accepted and having information chosen from predetermined information according to the characteristic of the finished print job.

According to the fourth aspect, when a job can be accepted, the display unit displays a ready screen having predetermined information chosen based on a characteristic of a finished print job. Therefore, information suggesting an issue that would occur is provided to an operator and then the operator can cope in advance of the error, and consequently convenience is enhanced for operators.

A computer readable recording medium according to the fifth aspect of the present invention stores an image forming program that can be installed in an image forming apparatus with a display unit. The image forming program causes a computer in the image forming apparatus to perform features comprising (a) a characteristic existence determining feature for determining whether a finished print job has a predetermined characteristic based on attribution information of the finished print job and/or a characteristic value on the finished print job and (b) a display controlling feature for causing the display unit to display a ready screen when a job can be accepted if it is determined that a finished print job has the predetermined characteristic in terms of the characteristic existence determining feature. The ready screen indicates that a job can be accepted and having information chosen from predetermined information according to the characteristic of the finished print job.

According to the fifth aspect, when a job can be accepted, the display unit displays a ready screen having predetermined information chosen based on a characteristic of a finished print job. Therefore, information suggesting an issue that would occur is provided to an operator and then the operator can cope in advance of the error, and consequently convenience is enhanced for operators.

A computer readable recording medium according to the sixth aspect of the present invention stores an image forming program that can be installed in an image forming apparatus with a display unit. The image forming program causes a computer in the image forming apparatus to perform features comprising: (a) a characteristic existence determining feature for determining whether a finished print job has a predetermined characteristic based on at least one of the type of the finished print job and a threshold on the finished print job and (b) a display controlling feature for causing the display unit to display a ready screen when a job can be accepted if it is determined that a finished print job has the predetermined characteristic in terms of the characteristic existence determining feature. The ready screen indicates that a job can be accepted and having information chosen from predetermined information according to the characteristic of the finished print job.

According to the sixth aspect, when a job can be accepted, the display unit displays a ready screen having predetermined information chosen based on a characteristic of a finished print job. Therefore, information suggesting an issue that would occur is provided to an operator and then the operator can cope in advance of the error, and consequently convenience is enhanced for operators.

It should be noted that "attribution information" means data indicating either properties on a print job or content of a print job, and for example, may include information on the type of a print job.

An image forming apparatus according to the seventh aspect of the present invention comprises (a) a display unit and (b) a display controlling unit that causes the display unit to display a ready screen after a print job is finished if an error has occurred while the print job is being executed. The ready screen has information chosen based on an error type of the error.

According to the seventh aspect, if an error has occurred during execution of a print job, then after the print job is finished, the display unit displays a ready screen having information chosen based on an error type of the error, and consequently operators can cope with not only errors due to toner but errors due to factors other than toner. Hence, convenience is enhanced for operators.

An image forming apparatus according to the eighth aspect of the present invention comprises (a) a display unit, (b) an error determining unit that determines whether an error has occurred while a print job is being executed or not after the print job is finished and (c) a display controlling unit that causes the display unit to display a ready screen that has information chosen based on an error type of the error if the error determining unit determines that the error has occurred while the print job is being executed.

According to the eighth aspect, if the error determining unit determines that an error has occurred during execution of a print job, the display unit displays a ready screen having information chosen based on an error type of the error, and consequently operators can cope with not only errors due to toner but errors due to factors other than toner. Hence, convenience is enhanced for operators.

A computer readable recording medium according to the ninth aspect of the present invention stores an image forming program that can be installed in an image forming apparatus with a display unit. The image forming program causes a computer in the image forming apparatus to perform a display controlling feature for causing the display unit to display a ready screen after a print job is finished if an error has occurred while the print job is being executed. The ready screen has information chosen based on an error type of the error.

According to the ninth aspect, if an error has occurred during execution of a print job, after the print job is finished, then by the display controlling feature, the display unit displays a ready screen having information chosen based on an error type of the error, and consequently operators can cope with not only errors due to toner but errors due to factors other than toner. Hence, convenience is enhanced for operators.

A computer readable recording medium according to the tenth aspect of the present invention stores an image forming program that can be installed in an image forming apparatus with a display unit. The image forming program causes a computer in the image forming apparatus to perform features comprising (a) an error determining feature for determining whether an error has occurred while a print job is being executed or not after the print job is finished and (b) a display controlling feature for causing the display unit to display a ready screen that has information chosen based on an error type of the error if in terms of the error determining feature it is determined that the error has occurred while the print job is being executed.

According to the tenth aspect, after a print job is finished, it is determined whether an error has occurred during execution of the print job in terms of the error determining feature, and if it is determined that an error has occurred during execution of the print job, then in terms of the display controlling feature, the display unit displays a ready screen having information chosen based on an error type of the error, and consequently operators can cope with not only errors due to toner but errors due to factors other than toner. Hence, convenience is enhanced for operators.

An image forming apparatus according to the eleventh aspect of the present invention comprises (a) a display unit, (b) a print job list storing unit that stores a print job list containing executable print jobs to be executed, (c) a print job history information storing unit that stores history information of finished print jobs, (d) a job receipt permission determining unit that determines whether a next print job can be accepted with reference to the print job list stored in the print job list storing unit, (e) an executable-job existence determining unit that determines whether a next executable print job to be executed exists or not with reference to the print job list stored in the print job list storing unit, if the job receipt permission determining unit determines that a next print job can be accepted, (f) a finished-job existence determining unit that determines whether a finished print job exists or not with reference to the history information stored in the print job history information storing unit, and (g) a display controlling unit that causes the display unit to display either a ready screen having information on the executable print job to be executed or a ready screen having information on the finished print job according to the determination result of the executable job existence determining unit and the determination result of the finished job existence determining unit.

According to the eleventh aspect, with reference to the print job list stored in the print job list storing unit and the history information of finished print jobs, the display controlling unit causes the display unit to display either a ready screen having information on the executable print job to be executed or a ready screen having information on the finished print job. The ready screen with information on the executable print job to be executed is displayed when the executable print job to be executed exists, and the ready screen with information on the finished print job is displayed when the finished print job exists.

As a result, it is possible to provide either information on a next executable print job to be executed or information on execution order of executable print jobs to be executed to an operator who wants to know it, and to provide information on a finished print job to an operator who wants to know it.

Hence, convenience is enhanced for operators.

A computer readable recording medium according to the twelfth aspect of the present invention stores an image forming program that can be installed in an image forming apparatus with a display unit. The image forming program causes a computer in the image forming apparatus to perform features comprising (a) a job receipt permission determining feature for determining whether a next print job can be accepted or not with reference to a print job list stored in a print job list storing unit, (b) an executable-job existence determining feature for determining whether a next executable print job to be executed exists or not with reference to the print job list stored in the print job list storing unit, if in terms of the job receipt permission determining feature it is determined that a next print job can be accepted, (c) a finished-job existence determining feature for determining whether a finished print job exists or not with reference to history information stored in a print job history information storing unit and (d) a display controlling feature for causing the display unit to display either a ready screen having information on the executable print job to be executed or a ready screen having information on the finished print job according to the determination result of the executable-job existence determining feature and the determination result of the finished job existence determining feature.

According to the twelfth aspect, with reference to the print job list stored in the print job list storing unit and the history information of finished print jobs, the display controlling unit causes the display unit to display either a ready screen having information on the executable print job to be executed or a ready screen having information on the finished print job. The ready screen with information on the executable print job to be executed is displayed when the executable print job to be executed exists, and the ready screen with information on the finished print job is displayed when the finished print job exists.

As a result, it is possible to provide either information on a next executable print job to be executed or information on execution order of executable print jobs to be executed to an operator who wants to know it, and to provide information on a finished print job to an operator who wants to know it.

Hence, convenience is enhanced for operators.

It should be noted that "write" means either storing a predetermined data in a memory device such as a buffer, a semiconductor memory or an HDD (Hard Disk Drive) or a process for storing a predetermined data in a storing device such as a buffer, a semiconductor memory or an HDD.

These and other objects, features and advantages of the present invention will become more apparent upon reading of the following detailed description along with the accompanied drawings.

BRIEF DESCRIPTION OF THE DRAWINGS

FIG. 6 is a schematic diagram indicating an instance of a ready screen indicating a remaining amount of papers in each of paper drawers displayed on a display screen in the multi function peripheral of Embodiment 1 before the ready screen is set to a default screen;

FIG. 7 is a schematic diagram indicating an instance of a ready screen indicating the number of papers consumed for each of sections displayed on a display screen in the multi function peripheral of Embodiment 1 before the ready screen is set to a default screen;

FIG. 16 is a schematic diagram indicating an instance of a ready screen indicating the number of consumed papers with each of paper sizes displayed on a display screen in the multi function peripheral of Embodiment 1 after the ready screen is set to a default screen;

FIG. 17 is a schematic diagram indicating an instance of a ready screen indicating the number of papers consumed from each of paper drawers displayed on a display screen in the multi function peripheral of Embodiment 1 after the ready screen is set to a default screen;

FIG. 36 is a schematic diagram indicating an instance of a ready screen displayed on a display screen in the multi function peripheral of Embodiment 3 in case that a jam error has occurred in a last previous print job due to that a paper is clogged at any of upper region, middle region and lower region in a transportation path inside of the multi function peripheral;

FIG. 39 is a schematic diagram indicating an instance of a ready screen displayed on a display screen in the multi function peripheral of Embodiment 4 in case that an executable print job to be executed exists;

FIG. 40 is a schematic diagram indicating an instance of a ready screen displayed on a display screen in the multi function peripheral of Embodiment 4 in case that any executable print jobs to be executed do not exist and a finished print job exists;

DETAILED DESCRIPTION OF THE PREFERRED EMBODIMENT

Hereinafter, preferred embodiments according to aspects of the present invention will be explained with reference to drawings.

Embodiment 1

Figure 1:
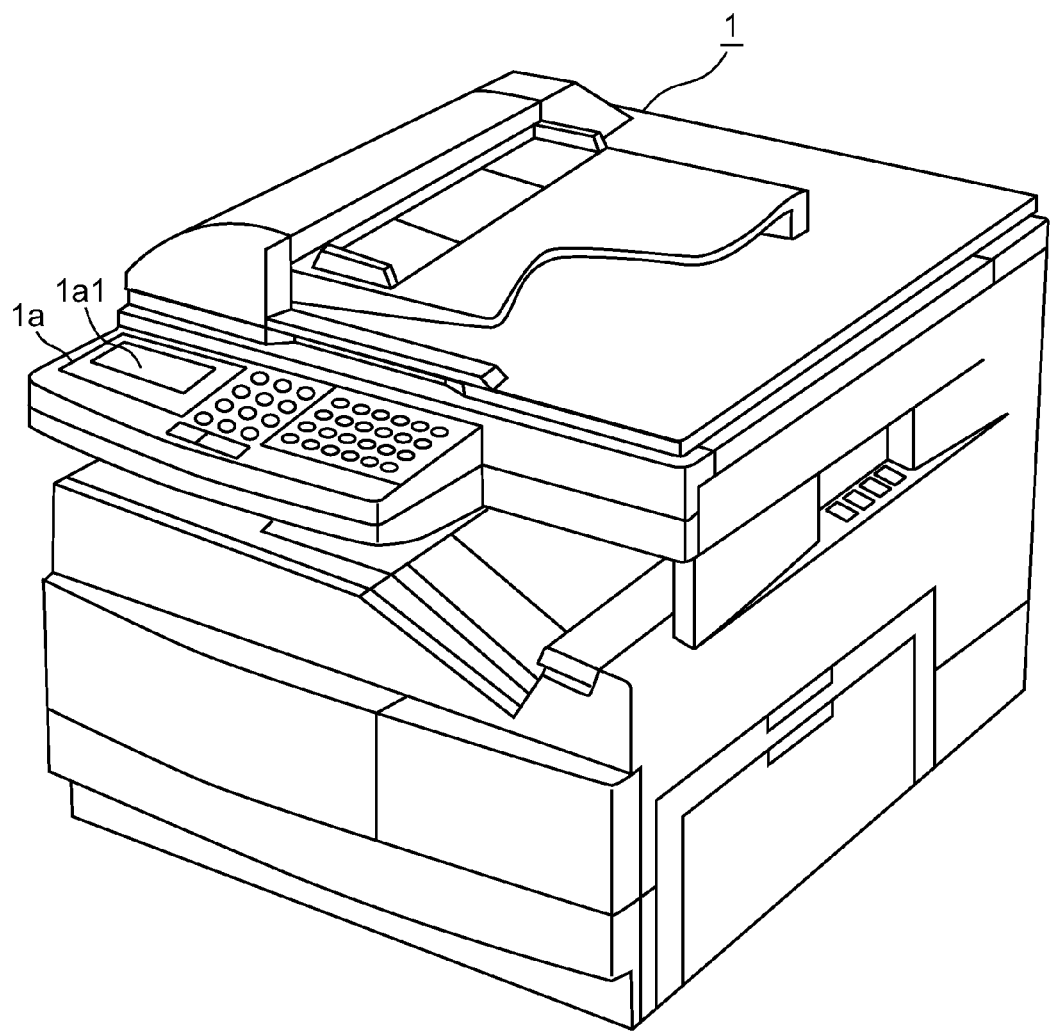
FIG. 1 is a perspective diagram indicating an instance of a multi function peripheral to which an image forming apparatus according to an aspect of the present invention is applied.

FIG. 1 is a perspective diagram indicating an instance of a multi function peripheral to which an image forming apparatus according to an aspect of the present invention is applied.

The multi function peripheral 1 has various functions such as a facsimile function, a scanner function, a copier function and a printer function. The multi function peripheral 1 is connected to a personal computer not shown here and another multi function peripheral not shown here via a communication network such as LAN (Local Area Network) or WAN (Wide Area Network).

Figure 2:
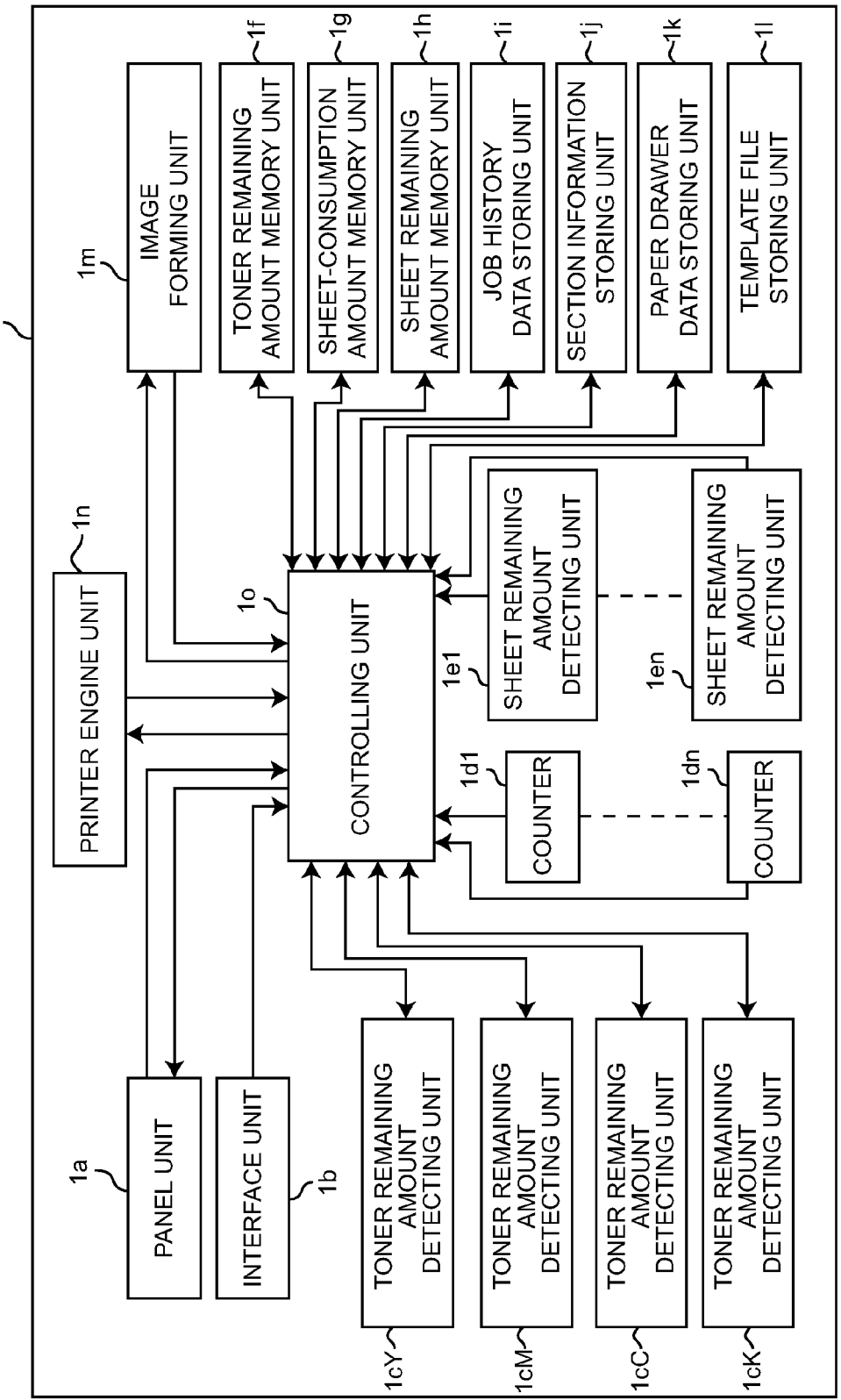
FIG. 2 is a functional block diagram indicating an instance of configuration of a multi function peripheral to which an image forming apparatus according to Embodiment 1 of the present invention is applied.

FIG. 2 is a functional block diagram indicating an instance of configuration of the multi function peripheral 1 to which an image forming apparatus according to Embodiment 1 of the present invention is applied.

The multi function peripheral 1 of Embodiment 1 displays ready screens mentioned below on a display screen 1$a$1 in a display panel when a job can be accepted, and the ready screens indicate that a job can be accepted. The multi function peripheral 1 of Embodiment 1 selectively displays information on consumable goods such as toner, fuser, or photoconductor drum or other information in the ready screens indicating that a job can be accepted when a job can be accepted.

As shown in FIG. 2, the multi function peripheral 1 of Embodiment 1 comprises a panel unit 1$a$; an interface unit 1$b$; toner remaining amount detecting units 1$c$Y, 1$c$M, 1$c$C and 1$c$K; counters 1$d$1 to 1$dn$ of respective paper drawers; sheet remaining amount detecting units 1$e$1 to 1$en$ of respective paper drawers; a toner remaining amount memory unit 1$f$; a sheet-consumption amount memory unit 1$g$; a sheet remaining amount memory unit 1$h$; a job history data storing unit 1$i$; a section information storing unit 1$j$; a paper drawer data storing unit 1$k$; a template file storing unit 1$l$; an image forming unit 1$m$; a printer engine unit 1$n$; and a controlling unit 1$o$ (an example of the display controlling unit).

Further, the multi function peripheral 1 of Embodiment 1 comprises a computer that has an internal memory (not shown) in which an image forming program was written during manufacture, or is installed an image forming program via either a computer readable recording medium or a communication network.

Each of the units in the multi function peripheral 1 of Embodiment 1 may be embodied with software (i.e. program control), hardware (i.e. specific-purpose electronic circuits) or a combination of software and hardware.

The panel unit 1$a$ has a display screen 1$a$1. The display screen 1$a$1 is an example of a display unit. The display screen 1$a$1 displays a menu screen, a status indication screen and a ready screen. The menu screen is displayed right after a power supply switch of the multi function peripheral 1 is turned on, in order to perform (a) switching a current active function among a facsimile function, a scanner function, a copier function and a printer function, (b) setting-up setting items of document scanning such as resolution, electronic file format of generated document data, image quality, density, and magnification, (c) setting-up each of operation modes, etc. The status indication screen is displayed upon an operator's operation on a touch panel, in order to indicate a current execution status of a job. The ready screen is displayed when a job can be accepted, in order to indicate that a job can be accepted.

The panel unit 1$a$ has a menu-screen request outputting function, a status-indication-screen request outputting function, an other-screen request outputting function, and a default-screen registration request outputting function.

The menu-screen request outputting function is a function for outputting a display request of the menu screen to the controlling unit 1$o$ upon detecting an operator's operation (e.g. a one-touch operation) to a menu-screen button displayed in a ready screen (an example of a first ready screen) while the ready screen is being displayed on the display screen 1a1.

The status-indication-screen request outputting function is a function for outputting a display request of the status indication screen to the controlling unit 1o upon detecting an operator's operation (e.g. a one-touch operation) to a status-indication-screen button displayed in a ready screen while the ready screen is being displayed on the display screen 1a1. The status indication screen indicates a job list of executable jobs to be executed hereafter.

The other-screen request outputting function is a function for outputting a display request of another ready screen to the controlling unit 1o upon detecting an operator's operation (e.g. a one-touch operation) to one of screen-switch buttons (examples of the first button and the second button) displayed in a ready screen while the ready screen is being displayed on the display screen 1a1. The another ready screen has information other than information indicated in a current ready screen.

The default-screen registration request outputting function is a function for outputting a registration request to the controlling unit 1o in order to register one of ready screens as a default screen upon detecting an operator's operation (e.g. a one-touch operation) to a registration button (an example of the third button) displayed in the ready screen while this ready screen is being displayed on the display screen 1a1. The default screen is a ready screen displayed initially after it becomes possible to receive a job.

The interface unit 1b receives a packet that comprises (a) a header part containing a job ID assigned to each of jobs and a MAC address of a terminal device in a communication network such as LAN or WAN and (b) a print data body described in a page description language or the like, via the communication network transmitted from the terminal device such as a personal computer or another multi function peripheral as the terminal device not shown here, and outputs data contained in the received packet to the controlling unit 1o after executing some processes such as parity check and error correction for the data of the received packet.

The toner remaining amount detecting units 1cY, 1cM, 1cC and 1cK detect remaining amounts of toner with respective colors YMCK (Yellow/Magenta/Cyan/Black), and attach toner sensor IDs assigned to the respective units 1cY, 1cM, 1cC and 1cK to respective data of the remaining amounts of toner, and output respective pairs of the remaining amount of toner and the toner sensor ID to the controlling unit 1o.

The counters 1d1 to 1dn are located with paper drawers to count the numbers of sheets printed from the respective paper drawers, and attach counter IDs assigned to the respective counters 1d1 to 1dn to respective data of the counted numbers of printed sheets, and output respective pairs of the counted number of printed sheets and the counter ID to the controlling unit 1o.

The sheet remaining amount detecting units 1e1 to 1en are located with paper drawers to detect remaining amounts of papers in the respective paper drawers, and attach paper sensor IDs assigned to the respective units 1e1 to 1en to the respective remaining amounts of papers, and output respective pairs of the remaining amount of papers and the paper sensor ID to the controlling unit 1o.

The toner remaining amount memory unit if stores the remaining amounts of toner, the toner sensor IDs and detection time as related to each other, respectively.

The sheet-consumption amount memory unit 1g stores the numbers of printed sheets, the counter IDs and detection time as related to each other, respectively.

The sheet remaining amount memory unit 1h stores the remaining amounts of papers, the paper sensor IDs and detection time as related to each other, respectively.

The job history data storing unit 1i stores at least a job ID, a job priority level, job progress information, a MAC address of the requesting terminal device, type information of either color printing or monochrome printing, execution beginning time, execution ending time, and the number of printed sheets for each of jobs, as related to each other.

The section information storing unit 1j store a MAC address uniquely assigned to each of terminal devices in the network and information on a section that accommodates the terminal device to which the MAC address is assigned, as related to each other.

The paper drawer data storing unit 1k stores data of each of the paper drawers and a paper size as related to each other.

The template file storing unit 1l stores template files of the menu screen, the status indication screen and the ready screens. One or more items to be displayed, display format, information on layout of the one or more items, and default screen assignment information indicating whether the screen is assigned to the default screen or not are defined in the template file.

The image forming unit 1m has a bitmap data generating function and a bitmap data outputting function.

The bitmap data generating function is a function for receiving print data described in a page description language from the controlling unit 1o and converting the received print data to bitmap data.

The bitmap data outputting function is a function for sending the bitmap data generated in terms of the bitmap data generating function as a response to the controlling unit 1o.

The printer engine unit 1n has an image forming function, a job list generating function, a job-start notice outputting function and a job-end notice outputting function.

The image forming function is a function for generating an image with electrophotographic process based on the bitmap data received from the controlling unit and forming the image on a surface of a paper as an information record medium.

The job list generating function is a function for generating a job list of executable jobs to be executed, with sorting the executable jobs to be executed based on a job priority level included in the data received from the controlling unit 1o if an interrupting job takes place, and for outputting the generated job list to the controlling unit 1o.

The job-start notice outputting function is a function for outputting a job-start notice to the controlling unit 1o at the beginning of a job. The job-start notice indicates that execution of the job started.

The job-end notice outputting function is a function for outputting a job-end notice to the controlling unit 1o at the end of a job. The job-end notice indicates that execution of the job ended.

The controlling unit 1o has functions mentions below and controls the panel unit 1a, the interface unit 1b, the toner remaining amount detecting units 1cY, 1cM, 1cC and 1cK, the counters 1d1 to 1dn, the sheet remaining amount detecting units 1e1 to 1en, the toner remaining amount memory unit 1f, the sheet-consumption amount memory unit 1g, the sheet remaining amount memory unit 1h, the job history data storing unit 1i, the section information storing unit 1j, the paper drawer data storing unit 1k, the template file storing unit 1l, the image forming unit 1m, and the printer engine unit 1n, in order to execute a default screen registration process mentioned below and a display control process to cause the display screen 1a1 to display ready screens mentioned below in the multi function peripheral 1 of this embodiment.

A packet data transferring function of the controlling unit 1*o* is a function for outputting to the image forming unit 1*m* data included in a packet received from the interface unit 1*b*.

A bitmap data transferring function of the controlling unit 1*o* is a function for outputting to the printer engine unit 1*n* bitmap data received from the image forming unit 1*m*.

A timer function of the controlling unit 1*o* is a function for measuring time continuously.

A toner amount writing function of the controlling unit 1*o* is a function for receiving pairs of the remaining amounts of toner with respective colors YMCK and the respective toner sensor IDs output from the toner remaining amount detecting units 1*c*Y, 1*c*M, 1*c*C and 1*c*K, and for writing a set of the remaining amount of toner, the toner sensor ID and detection time data on each of the colors in the toner remaining amount memory unit 1*f* with regarding the time when the pairs are received as the detection time and attaching the detection time data to each of the received pairs.

A number-of-printed-sheet writing function of the controlling unit 1*o* is a function for receiving pairs of the respective counted numbers of printed sheets and the respective counter IDs from the counters 1*d*1 to 1*dn*, and for writing a set of the counted number of printed sheets, the counter ID and detection time data on each of the paper drawers in the sheet-consumption amount memory unit 1*g* with regarding the time when the pairs are received as the detection time and attaching the detection time data to each of the received pairs.

A job list writing function of the controlling unit 1*o* is a function for receiving data of a job list containing jobs to be executed hereafter from the printer engine unit 1*n*, and for writing the job list with color/monochrome printing type information in the job history data storing unit 1*i* after determining whether a print data body of each of jobs in the job list has color information or not and then attaching the color/monochrome printing type information to the job. The color/monochrome printing type information is specified according to the determination result, and indicates that a print job is either color-printing job or monochrome-printing job.

A first job history updating function of the controlling unit 1*o* is a function for updating job execution beginning time in job history data stored in the job history data storing unit 1*i* upon receiving a job-start notice from the printer engine unit 1*n*.

A second job history updating function of the controlling unit 1*o* is a function for updating job history data in the job history data storing unit 1*i* by changing the value of job progress information to a value (e.g. "finished") indicating that a job ends upon receiving a job-end notice from the printer engine unit 1*n*.

A first job-reception determining function of the controlling unit 1*o* is a function for determining whether a job can be accepted or not according to whether a job is being executed or not, with reference to the job history data storing unit 1*i*.

A first display control function of the controlling unit 1*o* is a function for causing the display screen 1*a*1 to display a ready screen (an example of the first ready screen) if in terms of the first job-reception determining function it is determined that any jobs are not being executed, that is, a job can be accepted. This ready screen indicates that a job can be accepted, and has a screen-switch button (an example of the first button) to detect a request for displaying another ready screen that includes other information. In this function, a template file indicating that a job can be accepted and containing the screen-switch button for a ready screen assigned to the default screen is read out from the template file storing unit 1*l*, with reference to the default screen assignment information in the template file storing unit 1*l*, and then data of the ready screen is generated from the template file.

A menu-screen button operation determining function of the controlling unit 1*o* is a function for determining whether a request for displaying a menu screen has been input in terms of operation (e.g. one-touch operation) to the menu-screen button in a ready screen (an example of the first ready screen) assigned to the default screen or not according to whether a request for displaying a menu screen has been received from the panel unit 1*a* or not.

A menu-screen display control function of the controlling unit 1*o* is a function for reading out a template file of a menu screen from the template file storing unit 1*l* and causing the display screen 1*a*1 to display a menu screen based on the template file, if it is determined that a request for displaying the menu screen has been input in terms of the menu-screen button operation determining function mentioned above.

A status-indication-screen button operation determining function of the controlling unit 1*o* is a function for determining whether a request for displaying a status indication screen has been input in terms of operation (e.g. one-touch operation) to the status-indication-screen button in a ready screen (an example of the first ready screen) assigned to the default screen or not according to whether a request for displaying a status indication screen has been received from the panel unit 1*a* or not, in case that it is determined that a request for displaying a menu screen has not been input in terms of the menu-screen button operation determining function mentioned above.

A status-indication-screen display control function of the controlling unit 1*o* is a function for reading out data of a job list from the job history data storing unit 1*i*, reading out a template file of a status indication screen from the template file storing unit 1*l*, and combining data of the job list with the template file in order to generate ready screen data, and then causing the display screen 1*a*1 to display the status indication screen, if it is determined that a request for displaying a status indication screen has been input in terms of the status-indication-screen button operation determining function mentioned above.

A first other-screen button operation determining function of the controlling unit 1*o* is a function for determining whether a request for displaying another ready screen has been input in terms of operation (e.g. one-touch operation) to the screen-switch button (an example of the second button) in the forementioned ready screen or not according to whether a request for displaying another ready screen has been received from the panel unit 1*a* or not, in case that it is determined that a request for displaying a status indication screen has not been input in terms of the status-indication-screen button operation determining function mentioned above. The another ready screen has information in a indication manner different from the forementioned image that indicates a remaining amount of toner.

A second display control function of the controlling unit 1*o* is a function for reading out a template file of the another ready screen from the template file storing unit 1*l*, reading out data of a forementioned remaining amount of toner from the toner remaining amount memory unit 1*f* and combining the template file with data of the remaining amount of toner in order to generate ready screen data, and then causing the display screen 1*a*1 to display the another ready screen (an example of the second ready screen), if in terms of the first other-screen display button operation determining function it is determined that a request for displaying the another ready screen has been input.

A first registration-button-operation determining function of the controlling unit 1o is a function for determining whether a registration request for registering a ready screen displayed currently (e.g. the second ready screen) as the default screen has been input in terms of operation to a registration button (an example of the third button) in the forementioned another ready screen (e.g. the second ready screen) or not according to whether the registration request has been received from the panel unit 1a or not. The registration button is displayed for detecting operation to register the current ready screen as the default screen.

A first default-screen-registration function of the controlling unit 1o is a function for setting the ready screen displayed currently as the default screen in the template file storing unit 1l in terms of setting the value of the default screen assignment information to "YES" indicating that this ready screen is set to the default screen with regard to a template file of the ready screen displayed currently that includes an image indicating a remaining amount of toner in the second manner, if in terms of the first registration-button-operation determining function it is determined that the registration request has been input.

A second other-screen button operation determining function of the controlling unit 1o is a function for determining whether a request for displaying another ready screen indicating information other than a remaining amount of toner has been input in terms of operation (e.g. one-touch operation) to a screen-switch button (an example of the second button) in the ready screen indicating a remaining amount of toner or not according to whether a request for displaying the another ready screen has been received from the panel unit 1a or not, in case that it is determined that the registration request has not been input in terms of the first registration-button-operation determining function mentioned above. This screen-switch button is displayed to switch the current ready screen to another ready screen indicating information other than a remaining amount of toner.

A third display control function of the controlling unit 1o is a function for reading out a template file of the ready screen indicating information other than a remaining amount of toner from the template file storing unit 1l, reading out data of remaining amounts of papers in respective paper drawers from the sheet remaining amount memory unit 1h and combining the template file with data of the remaining amounts of papers in order to generate ready screen data, and then causing the display screen 1a1 to display the ready screen indicating a remaining amount of papers in each of paper drawers different from a remaining amount of toner, if in terms of the second other-screen display button operation determining function it is determined that a request for displaying the ready screen that indicates information other than a remaining amount of toner has been input.

A second registration-button-operation determining function of the controlling unit 1o is a function for determining whether a registration request for registering a ready screen displayed currently as the default screen has been input in terms of operation to a registration button (an example of the third button) in the ready screen indicating a remaining amount of papers in each of paper drawers or not according to whether the registration request has been received from the panel unit 1a or not. The registration button is displayed for detecting operation to register the current ready screen as the default screen.

A second default-screen-registration function of the controlling unit 1o is a function for setting the ready screen displayed currently as the default screen in the template file storing unit 1l in terms of setting the value of the default screen assignment information to "YES" indicating that this ready screen is set to the default screen with regard to a template file of the ready screen displayed currently that indicates remaining amounts of papers in respective paper drawers, if in terms of the second registration-button-operation determining function it is determined that the registration request has been input.

A third other-screen button operation determining function of the controlling unit 1o is a function for determining whether a request for displaying another ready screen indicating information other than remaining amounts of papers in respective paper drawers has been input in terms of operation to a screen-switch button (an example of the second button) in the ready screen indicating a remaining amounts of papers in respective paper drawers or not according to whether a request for displaying the another ready screen has been received from the panel unit 1a or not, in case that it is determined that the registration request has not been input in terms of the second registration-button-operation determining function mentioned above. This screen-switch button is displayed to switch the current ready screen to another ready screen indicating information other than remaining amounts of papers in respective paper drawers.

A fourth display control function of the controlling unit 1o is a function for (a) reading out data of all jobs that was finished in the past from the job history data storing unit 1i, (b) reading out MAC addresses of sections from the section information storing unit 1j, (c) summing up the number of sheets consumed for each of sections corresponding to each of the MAC addresses based on the data of all jobs, (d) reading out a template file of a ready screen from the template file storing unit 1l, (e) combining the template file with data of the numbers of sheets consumed for the respective sections in order to generate ready screen data, and (f) causing the display screen 1a1 to display the ready screen indicating the numbers of sheets consumed for the respective sections, if in terms of the third other-screen display button operation determining function it is determined that a request for displaying the another ready screen that indicates information other than a remaining amount of papers has been input.

A third registration-button-operation determining function of the controlling unit 1o is a function for determining whether a registration request for registering a ready screen displayed currently as the default screen has been input in terms of operation to a registration button (an example of the third button) in the ready screen indicating the numbers of sheets consumed for the respective sections or not according to whether the registration request has been received from the panel unit 1a or not. The registration button is displayed for detecting operation to register the current ready screen as the default screen.

A third default-screen-registration function of the controlling unit 1o is a function for setting the ready screen displayed currently as the default screen in the template file storing unit 1l in terms of setting the value of the default screen assignment information to "YES" indicating that this ready screen is set to the default screen with regard to a template file of the ready screen displayed currently that indicates the numbers of sheets consumed for the respective sections, if in terms of the third registration-button-operation determining function it is determined that the registration request has been input.

A fourth other-screen button operation determining function of the controlling unit 1o is a function for determining whether a request for displaying another ready screen indicating information other than the numbers of sheets consumed for the respective sections has been input in terms of operation to a screen-switch button (an example of the second button) in the ready screen indicating the numbers of sheets consumed for the respective sections or not according to whether a request for displaying the another ready screen has been received from the panel unit $1a$ or not, in case that it is determined that the registration request has not been input in terms of the third registration-button-operation determining function mentioned above. This screen-switch button is displayed to switch the current ready screen to another ready screen indicating information other than the numbers of sheets consumed for the respective sections.

A fifth display control function of the controlling unit $1o$ is a function for (a) reading out data of the numbers of sheets consumed from respective paper drawers from the sheet-consumption amount memory unit $1g$, (b) converting the numbers of sheets consumed from respective paper drawers to the numbers of consumed sheets with respective paper sizes with reference to data in the paper drawer data storing unit $1k$, (c) reading out a template file of a ready screen from the template file storing unit $1l$, (d) combining the template file with data of the numbers of consumed sheets with respective paper sizes in order to generate ready screen data, and (e) causing the display screen $1a1$ to display the ready screen indicating the numbers of consumed sheets with respective paper sizes rather than the numbers of sheets consumed for the respective sections, if in terms of the fourth other-screen display button operation determining function it is determined that a request for displaying the another ready screen that indicates information other than the numbers of sheets consumed for the respective sections has been input.

A fourth registration-button-operation determining function of the controlling unit $1o$ is a function for determining whether a registration request for registering a ready screen displayed currently as the default screen has been input in terms of operation to a registration button (an example of the third button) in the ready screen indicating the numbers of consumed sheets with respective paper sizes or not according to whether the registration request has been received from the panel unit $1a$ or not. The registration button is displayed for detecting operation to register the current ready screen as the default screen.

A fourth default-screen-registration function of the controlling unit $1o$ is a function for setting the ready screen displayed currently as the default screen in the template file storing unit $1l$ in terms of setting the value of the default screen assignment information to "YES" indicating that this ready screen is set to the default screen with regard to a template file of the ready screen displayed currently that indicates the numbers of consumed sheets with respective paper sizes, if in terms of the fourth registration-button-operation determining function it is determined that the registration request has been input.

A fifth other-screen button operation determining function of the controlling unit $1o$ is a function for determining whether a request for displaying another ready screen indicating information other than the numbers of consumed sheets with respective paper sizes has been input in terms of operation to a screen-switch button (an example of the second button) in the ready screen indicating the numbers of consumed sheets with respective paper sizes according to whether a request for displaying the another ready screen has been received from the panel unit $1a$ or not, in case that it is determined that the registration request has not been input in terms of the fourth registration-button-operation determining function mentioned above. This screen-switch button is displayed to switch the current ready screen to another ready screen indicating information other than the numbers of consumed sheets with respective paper sizes.

A sixth display control function of the controlling unit $1o$ is a function for reading out a template file of the another ready screen indicating information other than the numbers of consumed sheets with respective paper sizes from the template file storing unit $1l$, reading out data of the numbers of sheets consumed for respective sections from the sheet-consumption amount memory unit $1g$ and combining the template file with data of the numbers of sheets consumed from respective paper drawers in order to generate ready screen data, and then causing the display screen $1a1$ to display the another ready screen indicating the numbers of sheets consumed from respective paper drawers, if in terms of the fifth other-screen display button operation determining function it is determined that a request for displaying the another ready screen has been input.

A fifth registration-button-operation determining function of the controlling unit $1o$ is a function for determining whether a registration request for registering a ready screen displayed currently as the default screen has been input in terms of operation to a registration button (an example of the third button) in the ready screen indicating the numbers of sheets consumed from respective paper drawers or not according to whether the registration request has been received from the panel unit $1a$ or not. The registration button is displayed for detecting operation to register the current ready screen as the default screen.

A fifth default-screen-registration function of the controlling unit $1o$ is a function for setting the ready screen displayed currently as the default screen in the template file storing unit $1l$ in terms of setting the value of the default screen assignment information to "YES" indicating that this ready screen is set to the default screen with regard to a template file of the ready screen displayed currently that indicates the numbers of sheets consumed from respective paper drawers, if in terms of the fifth registration-button-operation determining function it is determined that the registration request has been input.

A sixth other-screen button operation determining function of the controlling unit $1o$ is a function for determining whether a request for displaying another ready screen indicating information other than the numbers of sheets consumed from respective paper drawers or not has been input in terms of operation to a screen-switch button (an example of the second button) in the ready screen indicating the numbers of sheets consumed from respective paper drawers according to whether a request for displaying the another ready screen has been received from the panel unit $1a$ or not, in case that it is determined that the registration request has not been input in terms of the fifth default-screen-registration determining function mentioned above. This screen-switch button is displayed to switch the current ready screen to another ready screen indicating information other than the numbers of sheets consumed from respective paper drawers.

A seventh display control function of the controlling unit $1o$ is a function for (a) reading out data of all jobs that was finished in the past from the job history data storing unit $1i$, (b) summing up the number of printed sheets in color printing and the number of printed sheets in monochrome printing with reference to color/monochrome printing type information in each of the jobs, (c) reading out a template file of another ready screen from the template file storing unit $1l$, (d) combining the template file with data of the number of printed sheets in color printing and the number of printed sheets in monochrome printing in order to generate ready screen data, and (e) causing the display screen $1a1$ to display the ready screen indicating the numbers of sheets printed in respective color printing and monochrome printing rather than the numbers of sheets consumed from respective paper drawers, if in terms of the sixth other-screen display button operation determining function it is determined that a request for displaying the another ready screen that indicates information other than a remaining amount of papers has been input.

A sixth registration-button-operation determining function of the controlling unit 1o is a function for determining whether a registration request for registering a ready screen displayed currently as the default screen has been input in terms of operation to a registration button (an example of the third button) in the ready screen indicating the numbers of sheets printed in respective color printing and monochrome printing or not according to whether the registration request has been received from the panel unit 1a or not. The registration button is displayed for detecting operation to register the current ready screen as the default screen.

A sixth default-screen-registration function of the controlling unit 1o is a function for setting the ready screen displayed currently as the default screen in the template file storing unit 1l in terms of setting the value of the default screen assignment information to "YES" indicating that this ready screen is set to the default screen with regard to a template file of the ready screen displayed currently that indicates the numbers of sheets printed in respective color printing and monochrome printing, if in terms of the sixth registration-button-operation determining function it is determined that the registration request has been input.

A seventh other-screen button operation determining function of the controlling unit 1o is a function for determining whether a request for displaying a ready screen indicating no information on either consumable goods such as toner or information record media such as paper or OHP film has been input in terms of operation to a screen-switch button (an example of the second button) in the ready screen indicating the numbers of sheets printed in respective color printing and monochrome printing according to whether a request for displaying the ready screen has been received from the panel unit 1a or not, in case that it is determined that the registration request has not been input in terms of the sixth registration-button-operation determining function mentioned above. This screen-switch button is displayed to switch the current ready screen to the ready screen indicating no information on either consumable goods or information record media.

An eighth display control function of the controlling unit 1o is a function for reading out a template file of the ready screen indicating no information on either consumable goods or information record media from the template file storing unit 1l, and causing the display screen 1a1 to display the ready screen based on the template file, if in terms of the seventh other-screen display button operation determining function it is determined that a request for displaying the ready screen has been input. This ready screen (hereinafter called as "non-content screen") indicates no information on either consumable goods or information record media, but has a screen-switch button (an example of the second button) to detect operator's input of a request for displaying a ready screen that indicates information on consumable goods and/or information record media.

A seventh registration-button-operation determining function of the controlling unit 1o is a function for determining whether a registration request for registering the non-content screen displayed currently as the default screen has been input in terms of operation to a registration button (an example of the third button) in the non-content screen or not according to whether the registration request has been received from the panel unit 1a or not. The registration button is displayed for detecting operation to register the non-content screen as the default screen.

A seventh default-screen-registration function of the controlling unit 1o is a function for setting the non-content screen displayed currently as the default screen in the template file storing unit 1l in terms of setting the value of the default screen assignment information to "YES" indicating that this screen is set to the default screen with regard to data of the non-content screen, if in terms of the seventh registration-button-operation determining function it is determined that the registration request has been input.

An eighth other-screen button operation determining function of the controlling unit 1o is a function for determining whether a request for displaying another ready screen indicating information on consumable goods and/or information record media has been input in terms of operation to the screen-switch button (an example of the second button) in the non-content screen according to whether a request for displaying the another ready screen has been received from the panel unit 1a or not, in case that it is determined that the registration request has not been input in terms of the seventh registration-button-operation determining function mentioned above.

A ninth display control function of the controlling unit 1o is a function for reading out a template file of the ready screen having a registration button and a screen-switch button from the template file storing unit 1l, reading out data of a remaining amount of toner, and causing the display screen 1a1 to display the ready screen having an image that indicates the remaining amount of toner based on the template file and the remaining amount of toner, if in terms of the eighth other-screen display button operation determining function it is determined that a request for displaying the ready screen has been input. This registration button is displayed to detect input of a request for registering the ready screen indicating information on consumable goods and/or information record media as the default screen. This screen-switch button is displayed to detect operator's input of a request for displaying a ready screen that has an image indicating a remaining amount of toner displayed in the first manner mentioned above.

An eighth registration-button-operation determining function of the controlling unit 1o is a function for determining whether a registration request for registering a ready screen displayed currently as the default screen has been input in terms of operation to the registration button (an example of the third button) in the ready screen indicating information on consumable goods and/or information record media or not according to whether the registration request has been received from the panel unit 1a or not.

An eighth default-screen-registration function of the controlling unit 1o is a function for setting the ready screen displayed currently as the default screen in the template file storing unit 1l in terms of setting the value of the default screen assignment information to "YES" indicating that this ready screen is set to the default screen with regard to a template file of the ready screen indicating information on consumable goods and/or information record media, if in terms of the eighth registration-button-operation determining function it is determined that the registration request has been input.

A ninth other-screen button operation determining function of the controlling unit 1o is a function for determining whether a request for displaying another ready screen that contains an image indicating a remaining amount of toner in the first manner has been input in terms of operation to the screen-switch button (an example of the second button) in the ready screen indicating information on consumable goods and/or information record media or not according to whether a request for displaying the ready screen has been received from the panel unit 1*a* or not, in case that it is determined that the registration request has not been input in terms of the eighth registration-button-operation determining function mentioned above.

A tenth display control function of the controlling unit 1*o* is a function for reading out a template file of the ready screen having the forementioned image indicating a remaining amount of toner from the template file storing unit 1*l*, and causing the display screen 1*a*1 to display the ready screen that contains the image indicating the remaining amount of toner in the first manner, if in terms of the ninth other-screen display button operation determining function it is determined that a request for displaying the ready screen has been input.

A default-screen-registration determining function of the controlling unit 1*o* is a function for determining whether any of ready screens of which template files are stored in the template file storing unit 1*l* has been registered as the default screen with reference to the default screen assignment information included in each of the template files stored in the template file storing unit 1*l*, in case that in terms of the ninth other-screen display button operation determining function it is determined that a request for displaying the ready screen has not been input.

A second job-reception determining function of the controlling unit 1*o* is a function for determining whether a job can be accepted or not according to whether a job is being executed or not, if in terms of the default-screen-registration determining function it is determined that any of ready screens has been registered as the default screen.

A registered-screen display control function of the controlling unit 1*o* is a function for reading out a template file of the ready screen registered as the default screen from the template file storing unit 1*l* with reference to the default screen assignment information, and causing the display screen 1*a*1 to display the ready screen registered as the default screen based on the template file, if in terms of the second job-reception determining function it is determined that a job can be accepted.

It should be noted that the toner remaining amount memory unit 1*f*, the sheet-consumption amount memory unit 1*g*, the sheet remaining amount memory unit 1*h*, the job history data storing unit 1*i*, the section information storing unit 1*j*, the paper drawer data storing unit 1*k*, and the template file storing unit 1*l* may be comprised by one component such as an internal cache of the controlling unit 1*o*, an internal buffer of the multi function peripheral 1, a semiconductor flash memory, or a data storage device located in the multi function peripheral 1 or connected via a computer network to the multi function peripheral 1, where they are equipped as different components in the multi function peripheral 1 of Embodiment 1.

Hereinafter, processes executed by the multi function peripheral 1 of Embodiment 1 with the forementioned configuration will be explained with reference to drawings.

Figure 3A:
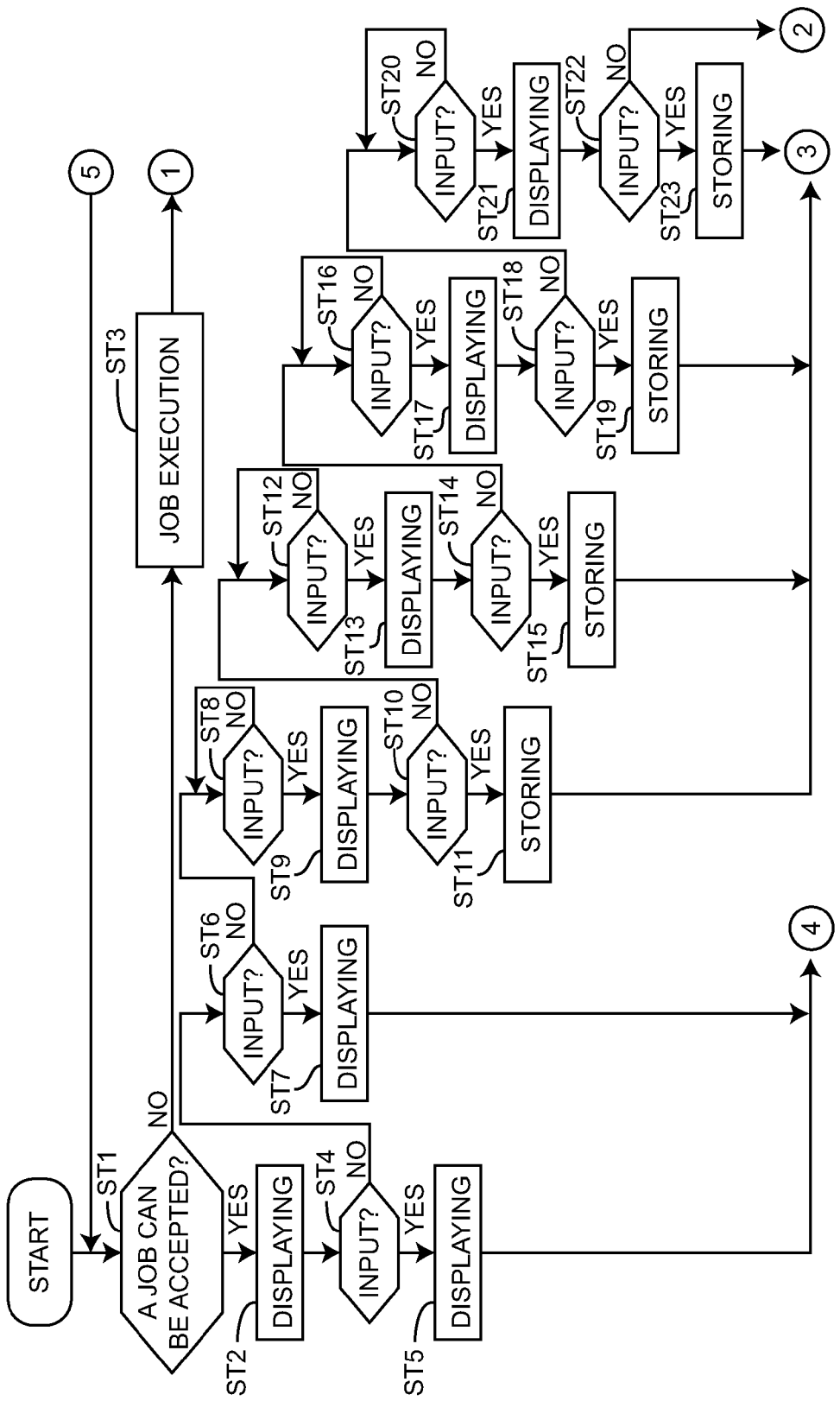
FIG. 3A and FIG. 3B are flowcharts for explaining processes executed by the multi function peripheral of Embodiment 1.
Figure 3B:
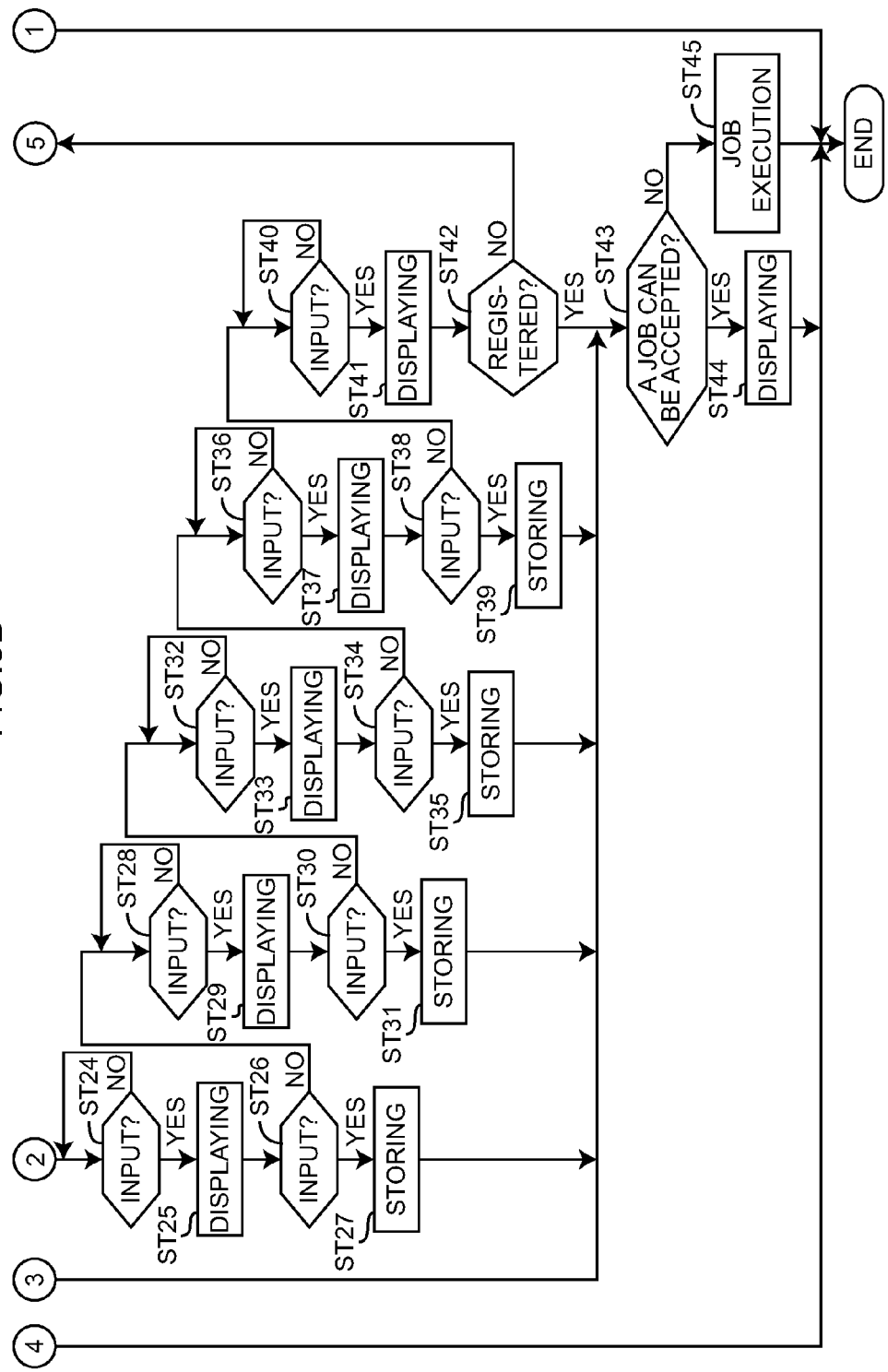

FIG. 3A and FIG. 3B are flowcharts for explaining processes executed by the multi function peripheral 1 of Embodiment 1.

The menu screen is displayed right after a power supply switch is turned on in the multi function peripheral 1, in order to detect operator's input of requests for (a) switching a current active function among a facsimile function, a scanner function, a copier function and a printer function, (b) setting-up setting items of document scanning such as resolution, electronic file format of generated document data, image quality, density, and magnification, (c) setting-up each of operation modes, etc. Upon starting displaying the menu screen, execution of an image forming program installed in a computer of the multi function peripheral 1 of Embodiment 1 is started to perform processes described below.

It should be noted that hereinafter it is assumed that the toner remaining amount detecting units 1*c*Y, 1*c*M, 1*c*C and 1*c*K detect remaining amounts of toner with respective colors YMCK (Yellow/Magenta/Cyan/Black) continuously and data of the detected remaining amounts of toner are stored in the toner remaining amount memory unit if repeatedly after a power supply switch is turned on in the multi function peripheral 1 of Embodiment 1.

Further, it is assumed that the counters 1*d*1 to 1*dn* count sheets consumed from respective paper drawers continuously and data of the numbers of sheets consumed from respective paper drawers are stored in the sheet consumption amount memory unit 1*g* repeatedly after a power supply switch is turned on in the multi function peripheral 1 of Embodiment 1.

Furthermore, it is assumed that the sheet remaining amount detecting units 1*e*1 to 1*en* detect remaining amounts of papers in respective paper drawers continuously and data of the remaining amounts of papers in respective paper drawers are stored in the sheet remaining amount memory unit 1*h* repeatedly after a power supply switch is turned on in the multi function peripheral 1 of Embodiment 1.

Furthermore, it is assumed that executable jobs to be executed hereafter are detected continuously and data of the executable jobs are stored in the job history data storing unit 1*i* repeatedly after a power supply switch is turned on in the multi function peripheral 1 of Embodiment 1.

Firstly, in Step ST1, the controlling unit 1*o* determines whether a new job can be accepted or not according to whether any of jobs is being executed or not with reference to the job history in the job history data storing unit 1*i*.

If in Step ST1 it is determined that any of jobs is not being executed, that is, a new job can be accepted (ST1: "YES"), then the controlling unit 1*o* reads out a template file of a ready screen assigned to the default screen with reference to the default screen assignment information from the template file storing unit 1*l*, and causes the display screen 1*a*1 to display the ready screen based on the template file (Step ST2). This ready screen (an example of the first ready screen) indicates that a job can be accepted, and has a screen-switch button (an example of the first button) to detect operation of a request for displaying another ready screen having information other than a first image that indicates a remaining amount of toner.

Otherwise, if in Step ST1 it is determined that any of jobs is being executed, that is, a new job can not be received (ST1: "NO"), then the job being executed is executed continuously until the job is finished (Step ST3).

Figure 4:
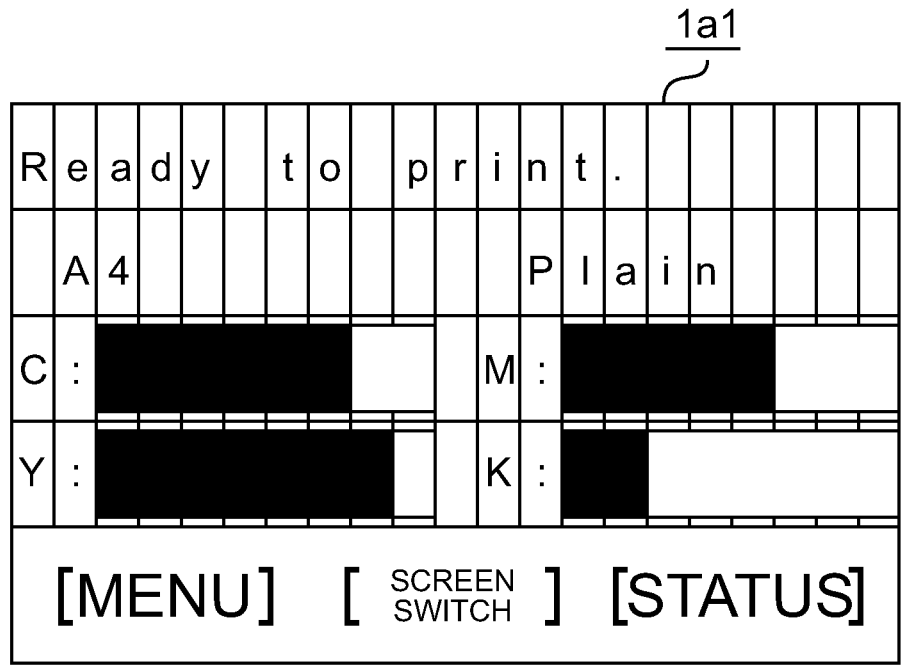
FIG. 4 is a schematic diagram indicating an instance of a ready screen having a first image that indicates a remaining amount of toner displayed on a display screen in the multi function peripheral of Embodiment 1 before the ready screen is set to a default screen.

FIG. 4 is a schematic diagram indicating an instance of a ready screen having a first image that indicates a remaining amount of toner displayed on the display screen 1*a*1 in the multi function peripheral 1 of Embodiment 1 before the ready screen is set to the default screen.

This ready screen (an example of the first ready screen) includes, as shown in FIG. 4, (a) a message "Ready to print." indicating that the current screen is a ready screen, (b) a paper size set up as a default, (c) a paper type set up as a default, (d) a first image that indicates one or more remaining amounts of toner, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs to be executed hereafter, and (g) a screen-switch button (an example of the first button) to detect inputting a request, in terms of operation to this button on this ready screen, for displaying another ready screen that indicates information different from the first image in this ready screen.

In should be noted that the number of consumed papers may be indicated together with the first image indicating one or more remaining amounts of toner in the ready screen displayed by the display screen 1a1 in the multi function peripheral 1 of Embodiment 1.

In Step ST4, the controlling unit 1o determines whether a request for displaying the menu screen has been input in terms of operation (e.g. one-touch operation) to the menu-screen button in the ready screen (an example of the first ready screen) assigned to the default screen or not according to whether a request for displaying the menu screen has been received from the panel unit 1a or not.

If in Step ST4 it is determined that a request for displaying the menu screen has been received (ST4: "YES"), then the controlling unit 1o reads out a template file of the menu screen from the template file storing unit 1l, and causes the display screen 1a1 to display the menu screen based on the template file (Step ST5), and then ends the process.

Otherwise, if in Step ST4 it is determined that a request for displaying the menu screen has not been received (ST4: "NO"), then the controlling unit 1o determines whether a request for displaying the status indication screen has been input in terms of operation (e.g. one-touch operation) to the status-indication-screen button in a ready screen (an example of the first ready screen) assigned to the default screen or not according to whether a request for displaying the status indication screen has been received from the panel unit 1a or not (Step ST6). The status indication screen is a screen that indicates a job list containing executable jobs to be executed hereafter.

If in Step ST6 it is determined that a request for displaying the status indication screen has been received (ST6: "YES"), then the controlling unit 1o reads out a job list from the job history data storing unit 1i, reads out a template file of a status indication screen from the template file storing unit 1l, and combines the job list with the template file in order to generate ready screen data, and causes the display screen 1a1 to display a status indication screen based on the combined data (Step ST7), and then ends the process.

If in Step ST6 it is determined that a request for displaying the status indication screen has not been received (ST6: "NO"), then the controlling unit 1o determines whether a request for displaying another ready screen having a second image that indicates one or more remaining amounts of toner different from the first image has been input in terms of operation (e.g. one-touch operation) to a screen-switch button (an example of the second button) in the ready screen having the first image or not according to whether a request for displaying the another ready screen has been received from the panel unit 1a or not (Step ST8).

If in Step ST8 it is determined that a request for displaying the another ready screen having the second image has been received (ST8: "YES"), then the controlling unit 1o reads out a template file of the another ready screen having the second image from the template file storing unit 1l, reads out data of one or more remaining amounts of toner from the toner remaining amount memory unit 1f and combines the template file with data of the one or more remaining amounts of toner in order to generate ready screen data, and then causing the display screen 1a1 to display the another ready screen (an example of the second ready screen) having the second image different from the first image (Step ST9).

Otherwise, if in Step ST8 it is determined that a request for displaying the another ready screen having the second image has not been received (ST8: "NO"), then the controlling unit 1o repeatedly determines whether a request for displaying the another ready screen having the second image has been received.

Figure 5:
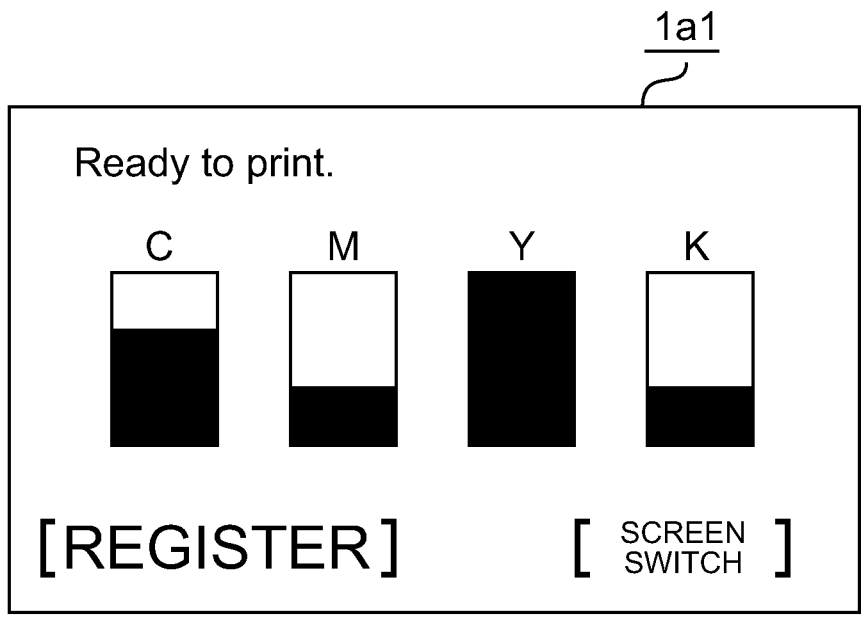
FIG. 5 is a schematic diagram indicating an instance of a ready screen having a second image that indicates a remaining amount of toner displayed on a display screen in the multi function peripheral of Embodiment 1 before the ready screen is set to a default screen.

FIG. 5 is a schematic diagram indicating an instance of a ready screen having a second image that indicates a remaining amount of toner displayed on the display screen 1a1 in the multi function peripheral of Embodiment 1 before the ready screen is set to the default screen.

This ready screen includes, as shown in FIG. 5, (a) a message "Ready to print." indicating that the current screen is a ready screen, (b) the second image that indicates one or more remaining amounts of toner, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that indicates information different from the second image.

In should be noted that the number of consumed papers may be indicated together with the second image indicating one or more remaining amounts of toner in the ready screen displayed by the display screen 1a1 in the multi function peripheral 1 of Embodiment 1.

In Step ST10, the controlling unit 1o determines whether a registration request for registering the ready screen displayed currently that has the second image (e.g. the second ready screen) as the default screen has been input in terms of operation to the registration button (an example of the third button) in the ready screen displayed currently (e.g. the second ready screen) or not according to whether the registration request has been received from the panel unit 1a or not.

If in Step ST10 it is determined that the registration request has been received (ST10: "YES"), then the controlling unit 1o sets the ready screen displayed currently as the default screen in the template file storing unit 1l in terms of setting the value of the default screen assignment information to "YES" with regard to a template file of the ready screen displayed currently that includes the second image (Step ST11). The registered ready screen will be displayed initially when a job can be accepted after the registration.

If in Step ST10 it is determined that the registration request has not been received (ST10: "NO"), then the controlling unit 1o determines whether a request for displaying another ready screen having information other than a remaining amount of toner has been input in terms of operation to the screen-switch button (an example of the second button) in the ready screen having the second image or not according to whether a request for displaying the another ready screen has been received from the panel unit 1a or not (Step ST12).

If in Step ST12 it is determined that a request for displaying the another ready screen having information other than a remaining amount of toner has been received (ST12: "YES"), then the controlling unit 1o reads out a template file of the another ready screen indicating information other than a remaining amount of toner from the template file storing unit 1l, reads out data of remaining amounts of papers in respective paper drawers from the sheet remaining amount memory unit 1h and combines the template file with data of the remaining amounts of papers in order to generate ready screen data, and then causing the display screen 1a1 to display the another ready screen indicating a remaining amount of papers in each of paper drawers, that is different from a remaining amount of toner (Step ST13).

Otherwise, if in Step ST12 it is determined that a request for displaying the another ready screen having information other than a remaining amount of toner has not been received (ST12: "NO"), then the controlling unit 1*o* repeatedly determines whether a request for displaying the another ready screen having information other than a remaining amount of toner has been received.

FIG. 6 is a schematic diagram indicating an instance of a ready screen indicating a remaining amount of papers in each of paper drawers displayed on the display screen 1*a*1 in the multi function peripheral 1 of Embodiment 1 before the ready screen is set to the default screen.

This ready screen includes, as shown in FIG. 6, (a) a message "Ready to print." indicating that the current screen is a ready screen, (b) an image that indicates a remaining amount of papers in each of paper drawers, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that indicates information different from a remaining amount of papers in each of paper drawers.

It should be noted that the type of papers such as plain paper, glossy paper, high-gloss photo paper, letter paper, or OHP film may be indicated together with the message "Ready to print.", the registration button and the screen-switch button in the ready screen in Embodiment 1.

In Step ST14, the controlling unit 1*o* determines whether a registration request for registering the ready screen displayed currently that indicates remaining amounts of papers in respective paper drawers as the default screen has been input in terms of operation to the registration button (an example of the third button) in the ready screen displayed currently or not according to whether the registration request has been received from the panel unit 1*a* or not.

If in Step ST14 it is determined that the registration request has been received (ST14: "YES"), then the controlling unit 1*o* sets the ready screen displayed currently as the default screen in the template file storing unit 1*l* in terms of setting the value of the default screen assignment information to "YES" with regard to a template file of the ready screen displayed currently that indicates remaining amounts of papers in respective paper drawers (Step ST15). The registered ready screen will be displayed initially when a job can be accepted after the registration.

If in Step ST14 it is determined that the registration request has not been received (ST14: "NO"), then the controlling unit 1*o* determines whether a request for displaying another ready screen having information other than the remaining amounts of papers has been input in terms of operation to the screen-switch button (an example of the second button) in the ready screen indicating the remaining amounts of papers in respective paper drawers or not according to whether a request for displaying the another ready screen has been received from the panel unit 1*a* or not (Step ST16).

If in Step ST16 it is determined that a request for displaying the another ready screen having information other than the remaining amounts of papers has been received (ST16: "YES"), then the controlling unit 1*o* reads out data of all jobs in the past which job progress information has a value (e.g. "finished") indicating that a job was finished from the job history data storing unit 1*i*, reads out MAC addresses of sections from the section information storing unit 1*j*, sums up the number of sheets consumed for each of sections corresponding to each of the MAC addresses based on the data of all jobs, reads out a template file of a ready screen from the template file storing unit 1*l*, combines the template file with data of the numbers of sheets consumed for the respective sections in order to generate ready screen data, and causes the display screen 1*a*1 to display the ready screen indicating the numbers of sheets consumed for the respective sections, that is different from the remaining amounts of papers (Step ST17).

Otherwise, if in Step ST16 it is determined that a request for displaying the another ready screen having information other than the remaining amounts of papers has not been received (ST16: "NO"), then the controlling unit 1*o* repeatedly determines whether a request for displaying the another ready screen having information other than the remaining amounts of papers has been received.

FIG. 7 is a schematic diagram indicating an instance of a ready screen indicating the number of papers consumed for each of sections displayed on the display screen 1*a*1 in the multi function peripheral 1 of Embodiment 1 before the ready screen is set to the default screen.

This ready screen includes, as shown in FIG. 7, (a) a message "Ready to print." indicating that the current screen is a ready screen, (b) an image that indicates the number of sheets consumed for each of sections, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that indicates information different from the number of sheets consumed for each of sections.

In Step ST18, the controlling unit 1*o* determines whether a registration request for registering the ready screen displayed currently that indicates the numbers of sheets consumed for respective sections as the default screen has been input in terms of operation to the registration button (an example of the third button) in the ready screen displayed currently or not according to whether the registration request has been received from the panel unit 1*a* or not.

If in Step ST18 it is determined that the registration request has been received (ST18: "YES"), then the controlling unit 1*o* sets the ready screen displayed currently as the default screen in the template file storing unit 1*l* in terms of setting the value of the default screen assignment information to "YES" with regard to a template file of the ready screen displayed currently that indicates the numbers of sheets consumed for respective sections (Step ST19). The registered ready screen will be displayed initially when a job can be accepted after the registration.

If in Step ST18 it is determined that the registration request has not been received (ST18: "NO"), then the controlling unit 1*o* determines whether a request for displaying another ready screen having information other than the numbers of sheets consumed for respective sections has been input in terms of operation to the screen-switch button (an example of the second button) in the ready screen indicating the numbers of sheets consumed for respective sections or not according to whether a request for displaying the another ready screen has been received from the panel unit 1*a* or not (Step ST20).

If in Step ST20 it is determined that a request for displaying the another ready screen having information other than the numbers of sheets consumed for respective sections has been received (ST20: "YES"), then the controlling unit 1*o* reads out the numbers of sheets consumed from respective paper drawers from the sheet-consumption amount memory unit 1*g*, converts the numbers of sheets consumed from respective paper drawers to the numbers of consumed sheets with respective paper sizes with reference to the paper drawer data storing unit 1*k*, reads out a template file of a ready screen from the template file storing unit 1*l*, combines the template file with data of the numbers of consumed sheets with respective paper sizes in order to generate ready screen data, and causes the display screen 1*a*1 to display the ready screen indicating the numbers of consumed sheets with respective paper sizes rather than the numbers of sheets consumed for the respective sections (Step ST21).

Otherwise, if in Step ST20 it is determined that a request for displaying the another ready screen having information other than the numbers of sheets consumed for respective sections has not been received (ST20: "NO"), then the controlling unit 1*o* repeatedly determines whether a request for displaying the another ready screen having information other than the numbers of sheets consumed for respective sections has been received.

Figure 8:
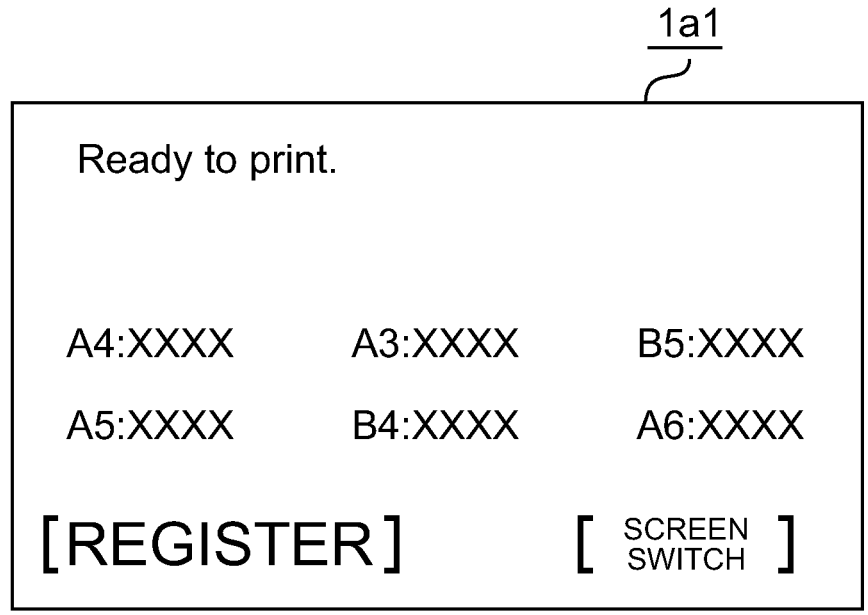
FIG. 8 is a schematic diagram indicating an instance of a ready screen indicating the number of consumed papers with each of paper sizes displayed on a display screen in the multi function peripheral of Embodiment 1 before the ready screen is set to a default screen.

FIG. 8 is a schematic diagram indicating an instance of a ready screen indicating the number of consumed papers with each of paper sizes displayed on the display screen 1*a*1 in the multi function peripheral 1 of Embodiment 1 before the ready screen is set to the default screen.

This ready screen includes, as shown in FIG. 8, (a) a message "Ready to print." indicating that the current screen is a ready screen, (b) an image that indicates the numbers of consumed sheets with respective paper sizes, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that indicates information different from the numbers of consumed sheets with respective paper sizes.

In Step ST22, the controlling unit 1*o* determines whether a registration request for registering the ready screen displayed currently that indicates the numbers of consumed sheets with respective paper sizes as the default screen has been input in terms of operation to the registration button (an example of the third button) in the ready screen displayed currently or not according to whether the registration request has been received from the panel unit 1*a* or not.

If in Step ST22 it is determined that the registration request has been received (ST22: "YES"), then the controlling unit 1*o* sets the ready screen displayed currently as the default screen in the template file storing unit 1*l* in terms of setting the value of the default screen assignment information to "YES" with regard to a template file of the ready screen displayed currently that indicates the numbers of consumed sheets with respective paper sizes (Step ST23). The registered ready screen will be displayed initially when a job can be accepted after the registration.

If in Step ST22 it is determined that the registration request has not been received (ST22: "NO"), then the controlling unit 1*o* determines whether a request for displaying another ready screen having information other than the numbers of consumed sheets with respective paper sizes has been input in terms of operation to the screen-switch button (an example of the second button) in the ready screen indicating the numbers of consumed sheets with respective paper sizes or not according to whether a request for displaying the another ready screen has been received from the panel unit 1*a* or not (Step ST24).

If in Step ST24 it is determined that a request for displaying the another ready screen having information other than the numbers of consumed sheets with respective paper sizes has been received (ST24: "YES"), then the controlling unit 1*o* reads out a template file of the another ready screen having information other than the numbers of consumed sheets with respective paper sizes from the template file storing unit 1*l*, reads out the numbers of sheets consumed from respective paper drawers from the sheet-consumption amount memory unit 1*g* and combines the template file with the numbers of sheets consumed from respective paper drawers in order to generate ready screen data, and then causes the display screen 1*a*1 to display the another ready screen indicating the numbers of sheets consumed from respective paper drawers (Step ST25).

Otherwise, if in Step ST24 it is determined that a request for displaying the another ready screen having information other than the numbers of consumed sheets with respective paper sizes has not been received (ST24: "NO"), then the controlling unit 1*o* repeatedly determines whether a request for displaying the another ready screen having information other than the numbers of consumed sheets with respective paper sizes has been received.

Figure 9:
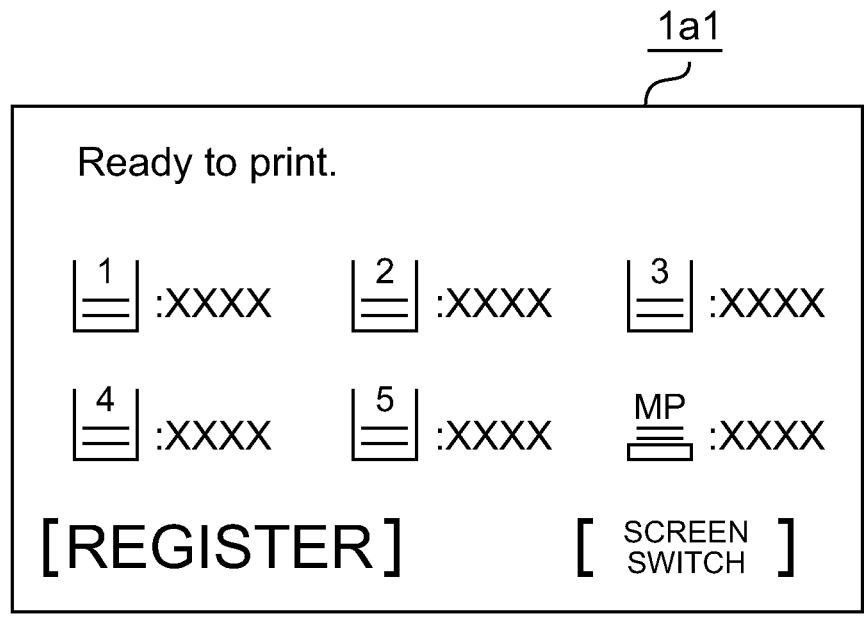
FIG. 9 is a schematic diagram indicating an instance of a ready screen indicating the number of papers consumed from each of paper drawers displayed on a display screen in the multi function peripheral of Embodiment 1 before the ready screen is set to a default screen.

FIG. 9 is a schematic diagram indicating an instance of a ready screen indicating the number of papers consumed from each of paper drawers displayed on the display screen 1*a*1 in the multi function peripheral 1 of Embodiment 1 before the ready screen is set to the default screen.

This ready screen includes, as shown in FIG. 9, (a) a message "Ready to print." indicating that the current screen is a ready screen, (b) an image that indicates the numbers of sheets consumed from respective paper drawers, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that indicates information different from the numbers of sheets consumed from respective paper drawers.

In Step ST26, the controlling unit 1*o* determines whether a registration request for registering the ready screen displayed currently that indicates the numbers of sheets consumed from respective paper drawers as the default screen has been input in terms of operation to the registration button (an example of the third button) in the ready screen displayed currently or not according to whether the registration request has been received from the panel unit 1*a* or not.

If in Step ST26 it is determined that the registration request has been received (ST26: "YES"), then the controlling unit 1*o* sets the ready screen displayed currently as the default screen in the template file storing unit 1*l* in terms of setting the value of the default screen assignment information to "YES" with regard to a template file of the ready screen displayed currently that indicates the numbers of sheets consumed from respective paper drawers (Step ST27). The registered ready screen will be displayed initially when a job can be accepted after the registration.

Otherwise, if in Step ST26 it is determined that the registration request has not been received (ST26: "NO"), then the controlling unit 1*o* determines whether a request for displaying another ready screen having information other than the numbers of sheets consumed from respective paper drawers has been input in terms of operation to the screen-switch button (an example of the second button) in the ready screen indicating the numbers of sheets consumed from respective paper drawers or not according to whether a request for displaying the another ready screen has been received from the panel unit 1*a* or not (Step ST28).

If in Step ST28 it is determined that a request for displaying the another ready screen having information other than the numbers of sheets consumed from respective paper drawers has been received (ST28: "YES"), then the controlling unit 1*o* reads out data of all jobs that was finished in the past from the job history data storing unit 1*i*, sums up the number of printed sheets in color printing and the number of printed sheets in monochrome printing with reference to color/monochrome printing type information in each of the jobs, reads out a template file of another ready screen from the template file storing unit 1*l*, combines the template file with the number of printed sheets in color printing and the number of printed sheets in monochrome printing in order to generate ready screen data, and causes the display screen 1*a*1 to display the ready screen indicating the numbers of sheets printed in respective color printing and monochrome printing rather than the numbers of sheets consumed from respective paper drawers (Step ST29).

Otherwise, if in Step ST28 it is determined that a request for displaying the another ready screen having information other than the numbers of sheets consumed from respective paper drawers has not been received (ST28: "NO"), then the controlling unit 1*o* repeatedly determines whether a request for displaying the another ready screen having information other than the numbers of sheets consumed from respective paper drawers has been received.

Figure 10:
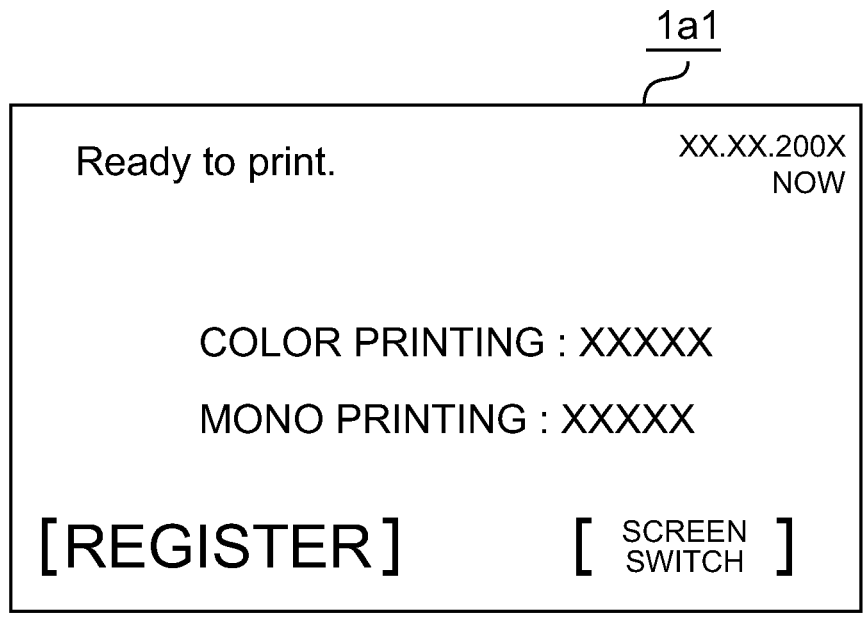
FIG. 10 is a schematic diagram indicating an instance of a ready screen indicating the number of papers printed in each of color printing and monochrome printing displayed on a display screen in the multi function peripheral of Embodiment 1 before the ready screen is set to a default screen.

FIG. 10 is a schematic diagram indicating an instance of a ready screen indicating the number of papers printed in each of color printing and monochrome printing displayed on the display screen 1*a*1 in the multi function peripheral 1 of Embodiment 1 before the ready screen is set to the default screen.

This ready screen includes, as shown in FIG. 10, (a) a message "Ready to print." indicating that the current screen is a ready screen, (b) the number of printed sheets in color printing and the number of printed sheets in monochrome printing, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that indicates information different from the numbers of printed sheets in respective color printing and monochrome printing.

In Step ST30, the controlling unit 1*o* determines whether a registration request for registering the ready screen displayed currently that indicates the numbers of printed sheets in respective color printing and monochrome printing as the default screen has been input in terms of operation to the registration button (an example of the third button) in the ready screen displayed currently or not according to whether the registration request has been received from the panel unit 1*a* or not.

If in Step ST30 it is determined that the registration request has been received (ST30: "YES"), then the controlling unit 1*o* sets the ready screen displayed currently as the default screen in the template file storing unit 1*l* in terms of setting the value of the default screen assignment information to "YES" with regard to a template file of the ready screen displayed currently that indicates the numbers of printed sheets in respective color printing and monochrome printing (Step ST31). The registered ready screen will be displayed initially when a job can be accepted after the registration.

If in Step ST30 it is determined that the registration request has not been received (ST30: "NO"), then the controlling unit 1*o* determines whether a request for displaying a ready screen indicating no information on either consumable goods such as toner or information record media such as paper or OHP film has been input in terms of operation to a screen-switch button (an example of the second button) in the ready screen indicating the numbers of sheets printed in respective color printing and monochrome printing according to whether a request for displaying the ready screen has been received from the panel unit 1*a* or not (Step ST32).

If in Step ST32 it is determined that a request for displaying the ready screen indicating no information on either consumable goods or information record media has been received (ST32: "YES"), then the controlling unit 1*o* reads out a template file of the ready screen indicating no information on either consumable goods or information record media from the template file storing unit 1*l*, and causes the display screen 1*a*1 to display the ready screen, that is, the non-content screen (Step ST33). The non-content screen indicates no information on either consumable goods or information record media but has a screen-switch button (an example of the second button) to detect input of a request for displaying a ready screen that indicates information on consumable goods and/or information record media.

Otherwise, if in Step ST32 it is determined that a request for displaying the ready screen indicating no information on either consumable goods or information record media has not been received (ST32: "NO"), then the controlling unit 1*o* repeatedly determines whether a request for displaying the non-content screen has been received.

Figure 11:
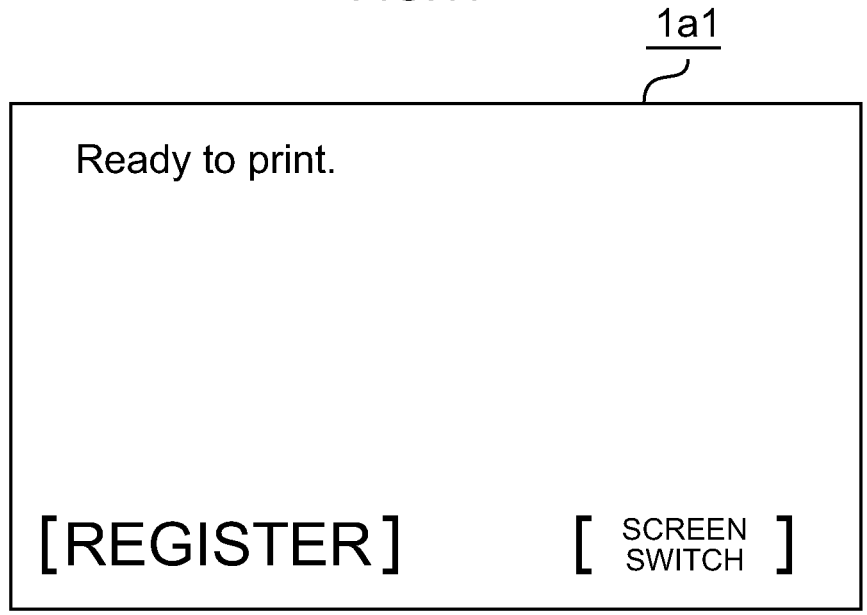
FIG. 11 is a schematic diagram indicating an instance of a non-content screen that does not have any information on consumable goods and information record media displayed on a display screen in the multi function peripheral of Embodiment 1 before the non-content screen is set to a default screen.

FIG. 11 is a schematic diagram indicating an instance of a non-content screen that does not have any information on consumable goods and information record media displayed on the display screen 1*a*1 in the multi function peripheral 1 of Embodiment 1 before the non-content screen is set to the default screen.

This ready screen is a ready screen indicating no information on either consumable goods or information record media. This ready screen includes, as shown in FIG. 11, (a) a message "Ready to print." indicating that the current screen is a ready screen, (b) a registration button (an example of the third button) to detect inputting a request, in terms of operation to this button on this ready screen, for registering this ready screen as the default screen that is displayed initially when a job can be accepted after the registration, and (c) a screen-switch button (an example of the second button) to detect inputting a request, in terms of operation to this button on this ready screen, for displaying another ready screen that indicates information on consumable goods and/or information record media.

In Step ST34, the controlling unit 1*o* determines whether a registration request for registering the non-content screen displayed currently as the default screen has been input in terms of operation to a registration button (an example of the third button) in the non-content screen or not according to whether the registration request has been received from the panel unit 1*a* or not.

If in Step ST34 it is determined that the registration request has been received (ST34: "YES"), then the controlling unit 1*o* sets the non-content screen displayed currently as the default screen in the template file storing unit 1*l* in terms of setting the value of the default screen assignment information to "YES" with regard to a template file of the non-content screen (Step ST35). The registered non-content screen will be displayed initially when a job can be accepted after the registration.

Otherwise, if in Step ST34 it is determined that the registration request has not been received (ST34: "NO"), then the controlling unit 1o determines whether a request for displaying another ready screen indicating information on consumable goods and/or information record media has been input in terms of operation to the screen-switch button (an example of the second button) in the non-content screen according to whether a request for displaying the another ready screen has been received from the panel unit 1a or not (Step ST36).

If in Step ST36 it is determined that a request for displaying the another ready screen indicating information on consumable goods and/or information record media has been received (ST36: "YES"), then the controlling unit 1o reads out a template file of the ready screen having the image indicating a remaining amount of toner in the first manner from the template file storing unit 1l, and causes the display screen 1a1 to display the ready screen having the image that indicates the remaining amount of toner in the first manner (Step ST37).

Otherwise, if in Step ST36 it is determined that a request for displaying the another ready screen indicating information on consumable goods and/or information record media has not been received (ST36: "NO"), then the controlling unit 1o repeatedly determines whether a request for displaying the another ready screen indicating information on consumable goods and/or information record media has been received.

Figure 12:
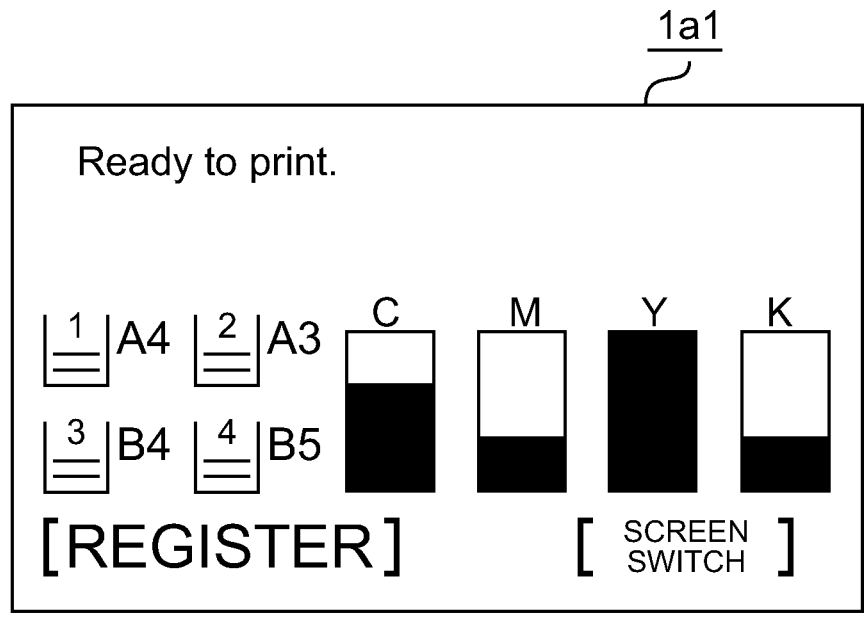
FIG. 12 is a schematic diagram indicating an instance of a ready screen indicating information on consumable goods and information record media displayed on a display screen in the multi function peripheral of Embodiment 1 before the ready screen is set to a default screen.

FIG. 12 is a schematic diagram indicating an instance of a ready screen indicating information on consumable goods and information on information record media displayed on the display screen 1a1 in the multi function peripheral 1 of Embodiment 1 before the ready screen is set to the default screen.

This ready screen includes, as shown in FIG. 12, (a) a message "Ready to print." indicating that the current screen is a ready screen, (b) an image that indicates one or more remaining amounts of toner and the numbers of sheets consumed from respective paper drawers, (c) a registration button (an example of the third button) to detect inputting a request, in terms of operation to this button on this ready screen, for registering this ready screen as the default screen that is displayed initially when a job can be accepted after the registration, and (d) a screen-switch button (an example of the second button) to detect inputting a request, in terms of operation to this button on this ready screen, for displaying another ready screen that includes the forementioned first image indicating one or more remaining amounts of toner.

In Step ST38, the controlling unit 1o determines whether a registration request for registering the ready screen indicating information on consumable goods and/or information record media displayed currently as the default screen has been input in terms of operation to a registration button (an example of the third button) in the ready screen displayed currently or not according to whether the registration request has been received from the panel unit 1a or not.

If in Step ST38 it is determined that the registration request has been received (ST38: "YES"), then the controlling unit 1o sets the ready screen displayed currently as the default screen in the template file storing unit 1l in terms of setting the value of the default screen assignment information to "YES" with regard to a template file of the ready screen displayed currently that indicates information on consumable goods and/or information record media (Step ST39).

If in Step ST38 it is determined that the registration request has not been received (ST38: "NO"), then the controlling unit 1o determines whether a request for displaying a ready screen that has an image (i.e. a first image) indicating one or more remaining amounts of toner in the first manner has been input in terms of operation to a screen-switch button (an example of the second button) in the ready screen indicating information on consumable goods and/or information record media according to whether a request for displaying the ready screen has been received from the panel unit 1a or not (Step ST40).

If in Step ST40 it is determined that a request for displaying the ready screen that includes the first image indicating one or more remaining amounts of toner has been received (ST40: "YES"), then the controlling unit 1o reads out a template file of the ready screen containing the forementioned first image from the template file storing unit 1l, and causes the display screen 1a1 to display the ready screen that contains the first image indicating one or more remaining amounts of toner (Step ST41).

Otherwise, if in Step ST40 it is determined that a request for displaying the ready screen containing the forementioned first image has not been received (ST40: "NO"), then the controlling unit 1o repeatedly determines whether a request for displaying the ready screen containing the forementioned first image has been received.

In Step ST42, the controlling unit 1o determines whether any of ready screens of which template files are stored in the template file storing unit 1l has been registered as the default screen with reference to the default screen assignment information in each of the template files stored in the template file storing unit 1l.

If in Step ST42 it is determined that any of ready screens other than the ready screen containing the first image has been registered as the default screen (ST42: "YES"), then the controlling unit 1o determines whether a job can be accepted or not according to whether a job is being executed (Step ST43). After Step ST11, ST15, ST19, ST23, ST27, ST31, ST35, or ST39, the controlling unit 1o does the same in Step ST43.

Otherwise, if in Step ST42 it is determined that any of ready screens other than the ready screen containing the first image has not been registered as the default screen (ST42: "NO"), then the controlling unit 1o transits to Step ST1 and determines whether a job can be accepted or not.

If in Step ST43 it is determined that a job can be accepted (ST43: "YES"), then the controlling unit 1o reads out a template file of the ready screen registered as the default screen with reference to the default screen assignment information from the template file storing unit 1l, and causes the display screen 1a1 to display the ready screen registered as the default screen based on the template file (Step ST44).

Figure 13:
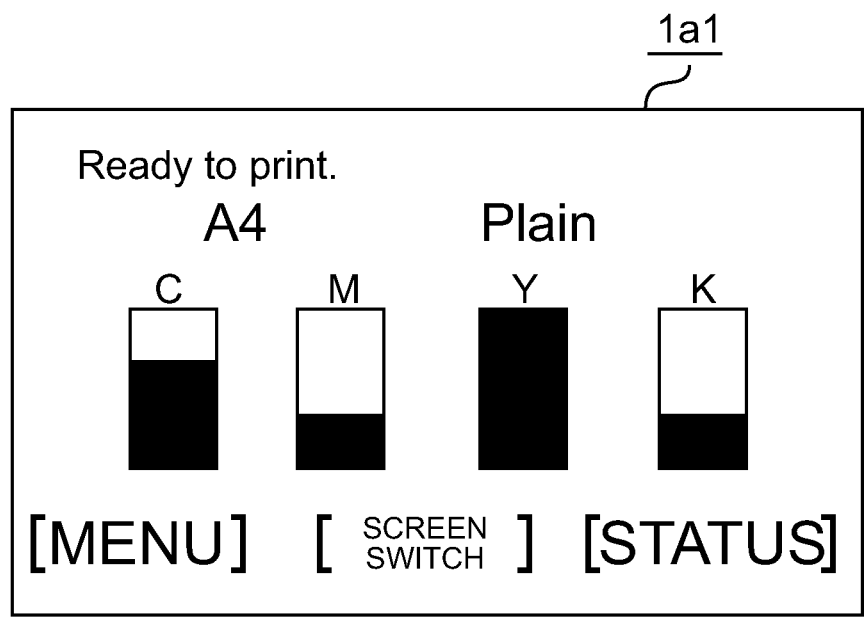
FIG. 13 is a schematic diagram indicating an instance of a ready screen having a second image that indicates a remaining amount of toner displayed on a display screen in the multi function peripheral of Embodiment 1 after the ready screen is set to a default screen.

For instance, the controlling unit 1o causes the display screen 1a1 to display a ready screen shown in FIG. 13, in Step ST44. This ready screen includes (a) a message "Ready to print." indicating that the current screen is a ready screen, (b) a paper size, (c) a paper type, (d) a second image that indicates one or more remaining amounts of toner, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the second image included in this ready screen.

Figure 14:
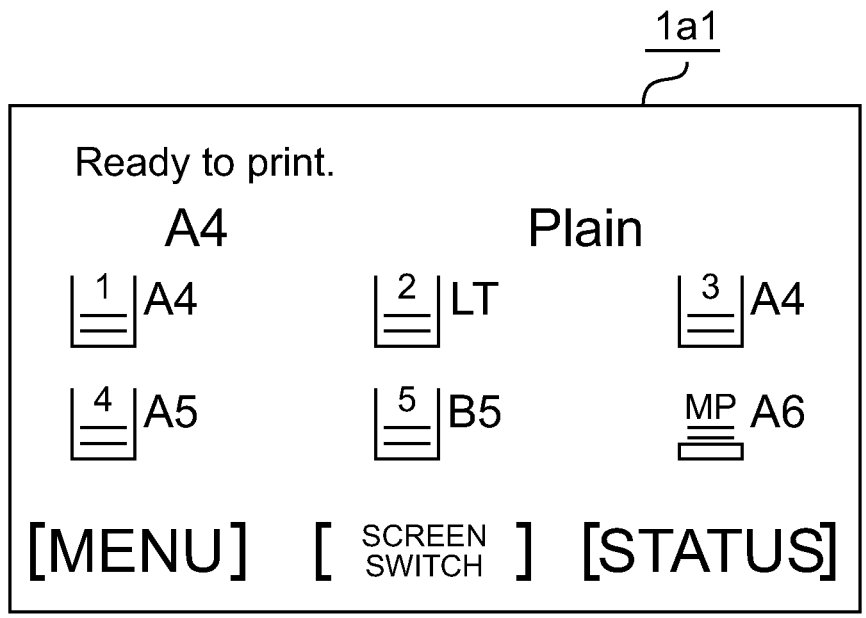
FIG. 14 is a schematic diagram indicating an instance of a ready screen indicating a remaining amount of papers in each of paper drawers displayed on a display screen in the multi function peripheral of Embodiment 1 after the ready screen is set to a default screen.

Further, in case that the ready screen indicating remaining amounts of papers in respective paper drawers as shown in FIG. 6 has been registered in the forementioned default screen registration process (in Step ST15), the controlling unit 1*o* causes the display screen 1*a*1 to display a ready screen as shown in FIG. 14, in Step ST44. This ready screen includes (a) a message "Ready to print." indicating that the current screen is a ready screen, (b) a paper size, (c) a paper type, (d) an image that indicates remaining amounts of papers in respective paper drawers, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the image indicating remaining amounts of papers in respective paper drawers.

Figure 15:
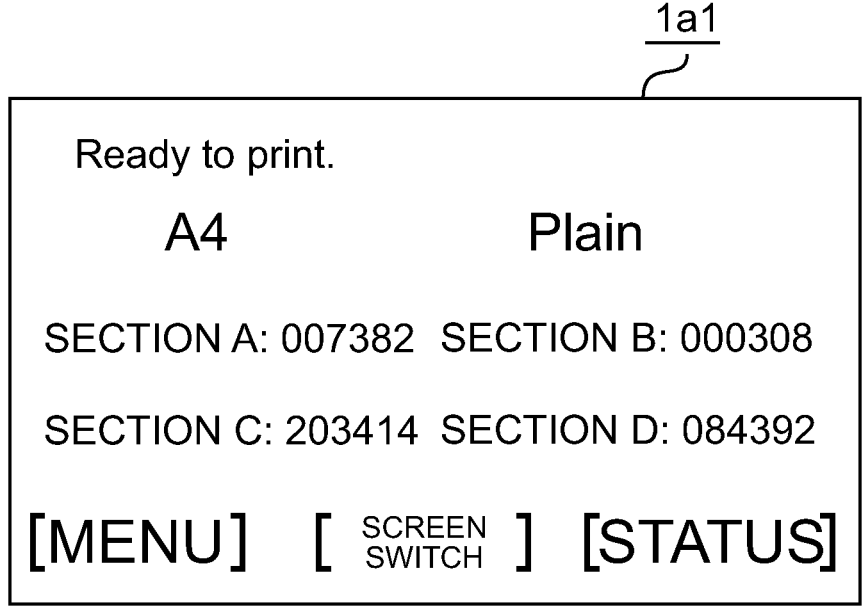
FIG. 15 is a schematic diagram indicating an instance of a ready screen indicating the number of papers consumed for each of sections displayed on a display screen in the multi function peripheral of Embodiment 1 after the ready screen is set to a default screen.

Furthermore, in case that the ready screen indicating the numbers of sheets consumed for respective sections as shown in FIG. 7 has been registered in the forementioned default screen registration process (in Step ST19), the controlling unit 1*o* causes the display screen 1*a*1 to display a ready screen as shown in FIG. 15, in Step ST44. This ready screen includes (a) a message "Ready to print." indicating that the current screen is a ready screen, (b) a paper size, (c) a paper type, (d) an image that indicates the numbers of sheets consumed for respective sections, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the image indicating the numbers of sheets consumed for respective sections.

Furthermore, in case that the ready screen indicating the numbers of consumed sheets with respective paper sizes as shown in FIG. 8 has been registered in the forementioned default screen registration process (in Step ST23), the controlling unit 1*o* causes the display screen 1*a*1 to display a ready screen as shown in FIG. 16, in Step ST44. This ready screen includes (a) a message "Ready to print." indicating that the current screen is a ready screen, (b) a paper size, (c) a paper type, (d) an image that indicates the numbers of consumed sheets with respective paper sizes, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the image indicating the numbers of consumed sheets with respective paper sizes.

Furthermore, in case that the ready screen indicating the numbers of sheets consumed from respective paper drawers as shown in FIG. 9 has been registered in the forementioned default screen registration process (in Step ST27), the controlling unit 1*o* causes the display screen 1*a*1 to display a ready screen as shown in FIG. 17, in Step ST44. This ready screen includes (a) a message "Ready to print." indicating that the current screen is a ready screen, (b) a paper size, (c) a paper type, (d) an image that indicates the numbers of sheets consumed from respective paper drawers, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the image indicating the numbers of sheets consumed from respective paper drawers.

Figure 18:
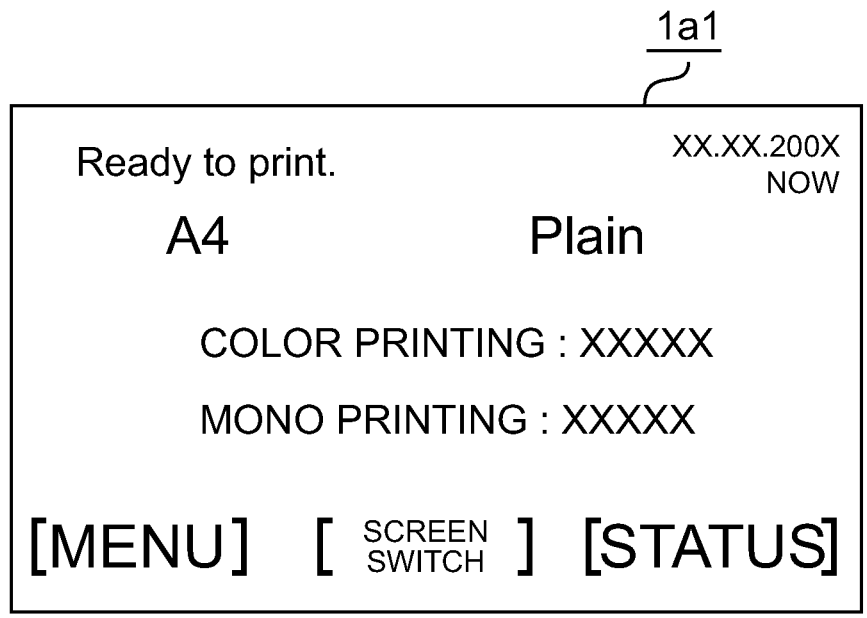
FIG. 18 is a schematic diagram indicating an instance of a ready screen indicating the number of papers printed in each of color printing and monochrome printing displayed on a display screen in the multi function peripheral of Embodiment 1 after the ready screen is set to a default screen.

Furthermore, in case that the ready screen indicating the numbers of printed sheets in respective color printing and monochrome printing as shown in FIG. 10 has been registered in the forementioned default screen registration process (in Step ST31), the controlling unit 1*o* causes the display screen 1*a*1 to display a ready screen as shown in FIG. 18, in Step ST44. This ready screen includes (a) a message "Ready to print." indicating that the current screen is a ready screen, (b) a paper size, (c) a paper type, (d) an image that indicates the numbers of printed sheets in respective color printing and monochrome printing, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the image indicating the numbers of printed sheets in respective color printing and monochrome printing.

Figure 19:
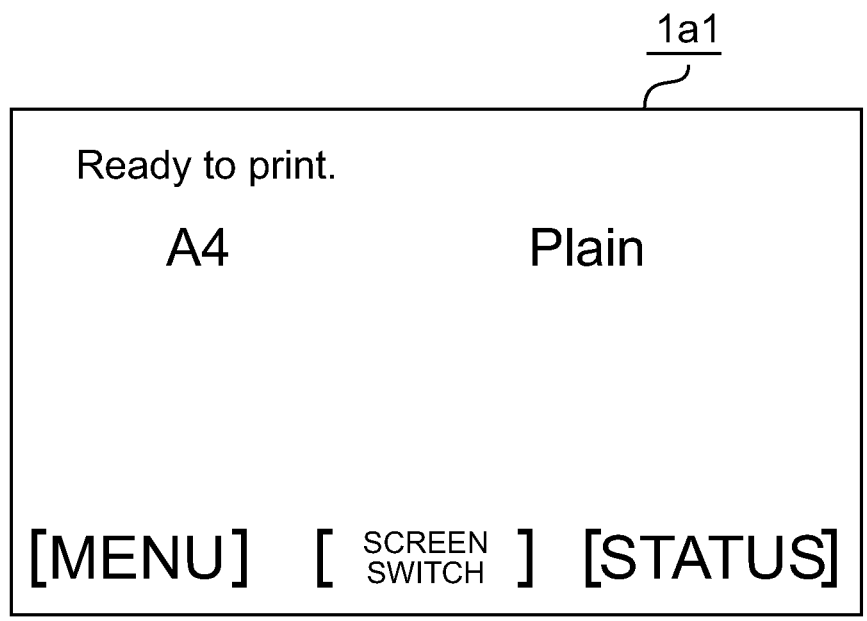
FIG. 19 is a schematic diagram indicating an instance of a non-content screen that does not have any information on consumable goods and information record media displayed on a display screen in the multi function peripheral of Embodiment 1 after the non-content screen is set to a default screen.

Furthermore, in case that the non-content screen as shown in FIG. 11 has been registered in the forementioned default screen registration process (in Step ST35), the controlling unit 1*o* causes the display screen 1*a*1 to display a ready screen as shown in FIG. 19, in Step ST44. This ready screen includes (a) a message "Ready to print." indicating that the current screen is a ready screen, (b) a menu-screen button to detect inputting a request, in terms of operation to this button on this ready screen, for displaying a menu screen, (c) a status-indication-screen button to detect inputting a request, in terms of operation to this button on this ready screen, for displaying a status indication screen that indicates a job list of executable jobs, and (d) a screen-switch button (an example of the first button) to detect inputting a request, in terms of operation to this button on this ready screen, for displaying another ready screen that indicates information on consumable goods and/or information record media.

Figure 20:
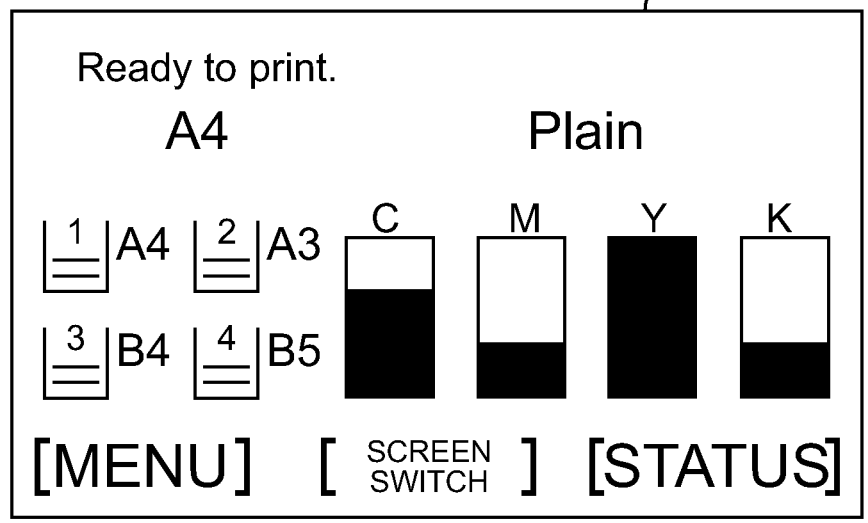
FIG. 20 is a schematic diagram indicating an instance of a ready screen indicating information on consumable goods and information record media displayed on a display screen in the multi function peripheral of Embodiment 1 after the ready screen is set to a default screen.

Furthermore, in case that the ready screen indicating information on consumable goods and/or information record media as shown in FIG. 12 has been registered in the forementioned default screen registration process (in Step ST39), the controlling unit 1*o* causes the display screen 1*a*1 to display a ready screen as shown in FIG. 20, in Step ST44. This ready screen includes (a) a message "Ready to print." indicating that the current screen is a ready screen, (b) a paper size, (c) a paper type, (d) an image that indicates information on consumable goods and/or information record media, (e) a menu-screen button to detect inputting a request, in terms of operation to this button on this ready screen, for displaying a menu screen, (f) a status-indication-screen button to detect inputting a request, in terms of operation to this button on this ready screen, for displaying a status indication screen that indicates a job list of executable jobs, and (g) a screen-switch button (an example of the first button) to detect inputting a request, in terms of operation to this button on this ready screen, for displaying another ready screen that indicates information different from the image indicating information on consumable goods and/or information record media.

In the multi function peripheral 1 of Embodiment 1, the ready screens are displayed in turn along the order of (a) the ready screen that includes the first image indicating one or more remaining amounts of toner, (b) the ready screen that includes the second image indicating one or more remaining amounts of toner, (c) the ready screen that includes the image indicating remaining amounts of papers in respective paper drawers, (d) the ready screen that includes the image indicating the numbers of sheets consumed for respective sections, (e) the ready screen that includes the image indicating the numbers of consumed sheets with respective paper sizes, (f) the ready screen that includes the image indicating the numbers of printed sheets in respective color printing and monochrome printing, (g) the ready screen with no information on either consumable goods or information record media (i.e. non-content screen), (h) the ready screen indicating information on consumable goods and/or information record media, but the order that the ready screens are displayed may be changed.

In the multi function peripheral 1 of Embodiment 1, a ready screen displayed in the display screen 1a1 may indicates other information such as time to replace a fuser, time to replace photoconductor drum, an advertisement of a new product, stock information of consumable goods, consumable goods prices, information on a nearest agency, or a combination of any of them with any of the forementioned information, that is, one or more remaining amounts of toner, remaining amounts of papers in respective paper drawers, the numbers of sheets consumed for respective sections, the numbers of consumed sheets with respective paper sizes, and the numbers of printed sheets in respective color printing and monochrome printing.

Further, in the multi function peripheral 1 of Embodiment 1, the images included in the ready screens may be replaced with other images indicating one or more remaining amounts of toner, remaining amounts of papers in respective paper drawers, the numbers of sheets consumed for respective sections, the numbers of consumed sheets with respective paper sizes, the numbers of printed sheets in respective color printing and monochrome printing, and information on consumable goods and/or information record media, respectively.

Moreover, if in Step ST43 it is determined that a job can not be received, then the controlling unit 1o continuously executes the current job until the current job is finished (Step ST45), and then ends the process.

As mentioned above, the multi function peripheral 1 of Embodiment 1 executes a series of the processes.

According to the multi function peripheral 1 of Embodiment 1, information indicated in a ready screen displayed by the display screen 1a1 when a job can be accepted is selectable, and consequently usability is enhanced for operators who need the information.

As a result, convenience is enhanced for the operators.

Further, according to the multi function peripheral 1 of Embodiment 1, the non-content screen can be chosen when a job can be accepted, and therefore convenience is enhanced for operators who do not need the forementioned information.

Further, according to the multi function peripheral 1 of Embodiment 1, information indicated in the default screen displayed initially when a job can be accepted can be chosen from ready screens in terms of one-touch operation for the registration, for example, in order to check information that operators do not need usually, and consequently, convenience is further enhanced for the operators.

Embodiment 2

Figure 21:
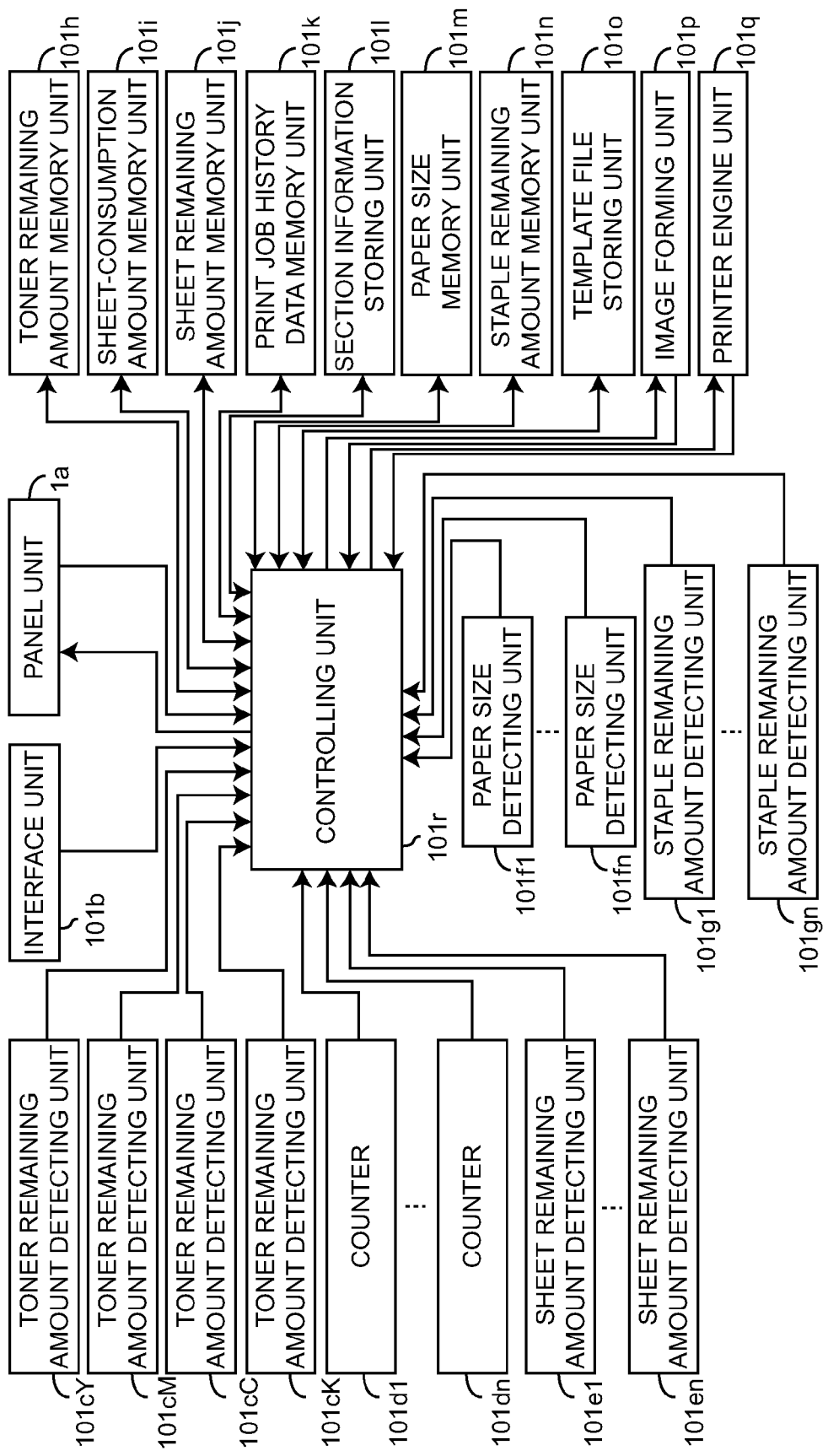
FIG. 21 is a functional block diagram indicating an instance of configuration of a multi function peripheral according to Embodiment 2.

A multi function peripheral 1 of Embodiment 2 causes a display screen 1a1 to display a ready screen that includes information chosen from predetermined information according to whether a characteristic of a print job exists or not after the print job is finished. FIG. 21 is a functional block diagram indicating an instance of configuration of the multi function peripheral 1 according to Embodiment 2.

The multi function peripheral 1 of Embodiment 2 is a multi function peripheral as shown in FIG. 1, that displays ready screens indicating that a job can be accepted on a display screen 1a1 in a display panel when a job can be accepted. The ready screens further indicate predetermined various sorts of information specified by contents of errors that occurred in execution of a last previous print job.

As shown in FIG. 21, the multi function peripheral 1 of Embodiment 2 comprises a panel unit 1a; an interface unit 101b; toner remaining amount detecting units 101cY, 101cM, 101cC and 101cK; counters 101d1 to 101dn of respective paper drawers; sheet remaining amount detecting units 101e1 to 101en of respective paper drawers; paper size detecting units 101f1 to 101fn of respective paper drawers; staple remaining amount detecting units 101g1 to 101gn of respective staple types; a toner remaining amount memory unit 101h; a sheet-consumption amount memory unit 101i; a sheet remaining amount memory unit 101j; a print job history data storing unit 101k; a section information storing unit 101l; a paper size memory unit 101m; a staple remaining amount memory unit 101n; a template file storing unit 101o; an image forming unit 101p; a printer engine unit 101q; and a controlling unit 101r.

Further, the multi function peripheral 1 of Embodiment 2 comprises a computer that has an internal memory (not shown) in which an image forming program was written during manufacture, or is installed an image forming program via either a computer readable recording medium or a communication network.

Each of the units in the multi function peripheral 1 of Embodiment 2 may be embodied with software (i.e. program control), hardware (i.e. specific-purpose electronic circuits) or a combination of software and hardware.

The panel unit 1a has a display screen 1a1. The display screen 1a1 is an example of a display unit. The display screen 1a1 displays a menu screen, a status indication screen and a ready screen. The menu screen is displayed right after a power supply switch of the multi function peripheral 1 is turned on, in order to perform (a) switching a current active function among a facsimile function, a scanner function, a copier function and a printer function, (b) setting-up setting items of document scanning such as resolution, electronic file format of generated document data, image quality, density, and magnification, (c) setting-up each of operation modes, etc. The status indication screen is displayed upon an operator's operation on a touch panel, in order to indicate a current execution status of a job. The ready screen is displayed when a job can be accepted, in order to indicate that a job can be accepted.

The panel unit 1a of Embodiment 2 has a display-period setting operation detecting function and a display-period setting request outputting function.

The display-period setting operation detecting function is a function for detecting inputting a display period of a ready screen in terms of operator's operation to a touch panel. The display period can be set to an optional period within the period from the end of the finished print job to the beginning of a next print job in terms of the operator's operation.

The display-period setting request outputting function is a function is a function for outputting to the controlling unit 101*r* a pair of the display period data and a request to set the display period of each of ready screens.

The interface unit 101*b* receives a packet that comprises (a) a header part containing a job ID assigned to each of jobs and a MAC address of a terminal device in a communication network such as LAN or WAN and (b) a print data body described in a page description language or the like, via the communication network transmitted from the terminal device such as a personal computer or another multi function peripheral as the terminal device not shown here, and outputs data included in the received packet to the controlling unit 101*r* after executing some processes such as parity check and error correction for the data of the received packet.

The toner remaining amount detecting units 101*c*Y, 101*c*M, 101*c*C and 101*c*K detect remaining amounts of toner with respective colors YMCK (Yellow/Magenta/Cyan/Black), and attach toner sensor IDs assigned to the respective units 101*c*Y, 101*c*M, 101*c*C and 101*c*K to respective data of the remaining amounts of toner, and output respective pairs of the remaining amount of toner and the toner sensor ID to the controlling unit 101*r*.

The counters 101*d*1 to 101*dn* are located with paper drawers to count the numbers of sheets printed from the respective paper drawers, and attach counter IDs assigned to the respective counters 101*d*1 to 101*dn* to respective data of the counted numbers of printed sheets, and output respective pairs of the counted number of printed sheets and the counter ID to the controlling unit 101*r*.

The sheet remaining amount detecting units 101*e*1 to 101*en* are located with paper drawers to detect remaining amounts of papers in the respective paper drawers, and attach paper sensor IDs assigned to the respective units 101*e*1 to 101*en* to the respective remaining amounts of papers, and output respective pairs of the remaining amount of papers and the paper sensor ID to the controlling unit 101*r*.

The paper size detecting units 101*f*1 to 101*fn* have a function for detecting paper sizes of papers supplied in respective paper drawers, and a function for attaching size sensor IDs assigned to the respective paper size detecting units 101*f*1 to 101*fn* to respective detected paper sizes and outputting respective pairs of the size sensor ID and the detected paper size to the controlling unit 101*r*.

The staple remaining amount detecting units 101*g*1 to 101*gn* detect remaining amounts of staples in respective staple storages, and output to the controlling unit 101*r* a pair of each of the remaining amounts of staples and a staple sensor ID assigned to each of the staple remaining amount detecting units 101*g*1 to 101*gn*.

The toner remaining amount memory unit 101*h* stores the remaining amounts of toner, the toner sensor IDs and detection time as related to each other, respectively.

The sheet-consumption amount memory unit 101*i* stores the numbers of printed sheets, the counter IDs and detection time as related to each other, respectively.

The sheet remaining amount memory unit 101*j* stores the remaining amounts of papers, the paper sensor IDs and detection time as related to each other, respectively.

The print job history data storing unit 101*k* stores at least a job type, a job priority level, job progress information, a MAC address of a requesting terminal device, execution beginning time, execution ending time, a coverage rate and the number of printed sheets for each of jobs, as related to each other.

The section information storing unit 101*l* stores a MAC address uniquely assigned to each of terminal devices in the network and information on a section that accommodates the terminal device to which the MAC address is assigned, as related to each other.

The paper size memory unit 101*m* stores relationships between respective paper drawers and respective paper sizes.

The staple remaining amount memory unit 101*n* stores at least staple types and remaining amounts of staples with the respective staple types.

The template file storing unit 101*o* stores template files of the menu screen, the status indication screen and the ready screens. Information on whether a predetermined characteristic exists or not, type of the characteristic, display period data, one or more items to be displayed, display format, and information on layout of the one or more items are defined in the template file.

The image forming unit 101*p* has a bitmap data generating function and a bitmap data outputting function.

The bitmap data generating function is a function for receiving print data described in a page description language from the controlling unit 101*r* and converting the received print data to bitmap data.

The bitmap data outputting function is a function for sending the bitmap data generated in terms of the bitmap data generating function as a response to the controlling unit 101*r*.

The printer engine unit 101*q* has a print job executing function, a print job list generating function, a print-job-start notice outputting function and a print-job-end notice outputting function.

The print job executing function is a function for generating an image with electrophotographic process based on the bitmap data received from the controlling unit 101*r* and forming the image on a surface of a paper as an information record medium.

The print job list generating function is a function for receiving bitmap data and coverage rate data calculated from the bitmap data and generating a print job list of executable print jobs to be executed, with sorting the executable print jobs to be executed based on a job priority level included in the data received from the controlling unit 101*r* if an interrupting job takes place, and for outputting the generated print job list to the controlling unit 101*r*.

The print-job-start notice outputting function is a function for outputting a print-job-start notice to the controlling unit 101*r* at the beginning of a job. The print-job-start notice indicates that execution of the job started.

The print-job-end notice outputting function is a function for outputting a print-job-end notice to the controlling unit 101*r* at the end of a job. The print-job-end notice indicates that execution of the job ended.

The controlling unit 101*r* has functions mentions below and controls the panel unit 1*a*, the interface unit 101*b*, the toner remaining amount detecting units 101*c*Y, 101*c*M, 101*c*C and 101*c*K, the counters 101*d*1 to 101*dn*, the sheet remaining amount detecting units 101*e*1 to 101*en*, the paper size detecting units 101*f*1 to 101*fn*, the staple remaining amount detecting units 101*g*1 to 101*gn*, the toner remaining amount memory unit 101*h*, the sheet-consumption amount memory unit 101*i*, the sheet remaining amount memory unit 101*j*, the print job history data storing unit 101*k*, the section information storing unit 101*l*, the paper size memory unit 101*m*, the staple remaining amount memory unit 101*n*, the template file storing unit 101*o*, the image forming unit 101*p*, and the printer engine unit 101*q*, in order to execute an error existence determination process mentioned below and a display control process to cause the display screen 1a1 to display ready screens mentioned below in the multi function peripheral 1 of this embodiment.

A display-period setting request determining function of the controlling unit 101r is a function for determining whether a display-period setting request for setting-up a display period of a ready screen has been received from an operator or not according to whether a pair of the display period data and the display-period setting request has been received from the panel unit 1a.

A display-period setting-up function of the controlling unit 101r is a function for setting-up the display period of a template file of a ready screen stored in the template file storing unit 101o if in terms of the display-period setting request determining function it is determined that the display-period setting request has been received.

A packet data transferring function of the controlling unit 101r is a function for outputting to the image forming unit 101p data included in a packet received from the interface unit 101b.

A coverage rate calculating function of the controlling unit 101r is a function for counting the number of bits included in characters and/or images in bitmap data received from the image forming unit 101p, and for calculating a coverage rate of a print job by dividing the number of the bits by the number of all bits in the bitmap data.

A bitmap data transferring function of the controlling unit 101r is a function for outputting to the printer engine unit 101q a pair of bitmap data and the coverage rate data calculated in terms of the coverage rate calculating function.

A print job list writing function of the controlling unit 101r is a function for receiving the print job list containing the coverage rate from the printer engine 101q, and writing one or more executable print jobs to be executed hereafter included in the received print job list into the print job history data storing unit 101k.

A timer function of the controlling unit 101r is a function for measuring time continuously.

A toner amount writing function of the controlling unit 101r is a function for receiving pairs of the remaining amounts of toner with respective colors YMCK and the respective toner sensor IDs output from the toner remaining amount detecting units 101cY, 101cM, 101cC and 101cK, and for writing a set of the remaining amount of toner, the toner sensor ID and detection time data on each of the colors in the toner remaining amount memory unit 101h with regarding the time when the pairs are received as the detection time and attaching the detection time data to each of the received pairs.

A number-of-printed-sheet writing function of the controlling unit 101r is a function for receiving pairs of the respective counted numbers of printed sheets and the respective counter IDs from the counters 101d1 to 101dn, and for writing a set of the counted number of printed sheets, the counter ID and detection time on each of the paper drawers in the sheet-consumption amount memory unit 101i with regarding the time when the pairs are received as the detection time and attaching the detection time data to each of the received pairs.

A staple remaining amount writing function of the controlling unit 101r is a function for receiving pairs of the respective remaining amounts of staples and the respective staple sensor IDs from the staple remaining amount detecting units 101g1 to 101gn, and for writing a set of the remaining amount of staples, the staple sensor ID and detection time data with a staple type in the staple remaining amount memory unit 101n after attaching the detection time data to each of the received pairs.

A first print job history updating function of the controlling unit 101r is a function for updating print job execution beginning time in print job history data stored in the print job history data storing unit 101k upon receiving a print-job-start notice from the printer engine unit 101q.

A second print job history updating function of the controlling unit 101r is a function for updating print job history data in the print job history data storing unit 101k by changing the value of job progress information to a value (e.g. "finished") indicating that a job ends upon receiving a print-job-end notice from the printer engine unit 101q.

A print-job-end determining function of the controlling unit 101r is a function for determining whether a print job ends or not according to whether the print-job-end notice has been received from the printer engine unit 101q.

A print job data updating function of the controlling unit 101r is a function for updating print job history data in the print job history data storing unit 101k by writing end time of a finished print job in the print job history data storing unit 101k if in terms o the print-job-end determining function it is determined that the print job is finished.

A first characteristic-existence determining function of the controlling unit 101r is a function for determining whether a finished print job has a characteristic or not according to whether or not the coverage rate calculated in terms of the coverage rate calculating function is equal to or greater than a predetermined threshold.

A first display controlling function of the controlling unit 101r is a function for reading out a template file of a ready screen that the value of information on whether or not a characteristic exists is "YES" and the type of the characteristic is "coverage rate excess" from the template file storing unit 101o, reading out one or more remaining amounts of toner from the toner remaining amount memory unit 101h and combining the template file with the one or more remaining amounts of toner in order to generate ready screen data, and then causing the display screen 1a1 to display the ready screen indicating one or more remaining amounts of toner only in the preset display period, if in terms of the first characteristic-existence determining function it is determined that a finished print job has the characteristic.

A number-of-printed-sheets reading-out function of the controlling unit 101r is a function for reading out data of the number of sheets printed in the last previous finished print job, if in terms of the first characteristic-existence determining function it is determined that a finished print job does not have the characteristic.

A second characteristic-existence determining function of the controlling unit 101r is a function for determining whether a finished print job has a characteristic or not according to whether or not the number of printed sheets read out in terms of the number-of-printed-sheets reading-out function is equal to or greater than a predetermined threshold.

A second display controlling function of the controlling unit 101r is a function for reading out a template file of a ready screen that the value of information on whether or not a characteristic exists is "YES" and the type of the characteristic is "printed-sheet excess" from the template file storing unit 101o, reading out remaining amounts of papers in respective paper drawers from the sheet remaining amount memory unit 101j, and combining the template file with the remaining amounts of papers in respective paper drawers in order to generate ready screen data, and then causing the display screen 1a1 to display the ready screen indicating remaining amounts of papers in respective paper drawers only in the preset display period, if in terms of the second characteristic-existence determining function it is determined that a finished print job has the characteristic.

A first print-type-data reading-out function of the controlling unit 101r is a function for reading out print job type data from the print job history data storing unit 101k, if in terms of the second characteristic-existence determining function it is determined that a finished print job does not have the characteristic.

A number-of-printed-sheets summing-up function of the controlling unit 101r is a function for (a) reading out data of all jobs that was finished in the past from the print job history data storing unit 101k, (b) reading out MAC addresses of sections from the section information storing unit 101l, (c) calculating the numbers of sheets printed for respective sections in terms of summing up the number of sheets printed for each of sections corresponding to each of the MAC addresses based on the data of all jobs, if in terms of the second characteristic-existence determining function it is determined that a finished print job does not have the characteristic.

A third characteristic-existence determining function of the controlling unit 101r is a function for determining whether a finished print job has a characteristic or not according to whether or not any of differences between respective predetermined uppermost limit values and the numbers of sheets printed for respective sections is less than a predetermined threshold.

A third display controlling function of the controlling unit 101r is a function for reading out a template file of a ready screen that the value of information on whether or not a characteristic exists is "YES" and the type of the characteristic is that "number of printed sheets reaches limit in near future" from the template file storing unit 101o, and combining the template file with a pair of the number of printed sheets and a predetermined uppermost limit value with regard to a section for which the difference between the predetermined uppermost limit value and the number of printed sheets is less than a predetermined threshold, and then causing the display screen 1a1 to display the ready screen indicating the uppermost limit value and the number of printed sheets with regard to the section only in the preset display period, if in terms of the third characteristic-existence determining function it is determined that a finished print job has the characteristic.

A second print-type-data reading-out function of the controlling unit 101r is a function for reading out print job type data from the print job history data storing unit 101k, if in terms of the third characteristic-existence determining function it is determined that a finished print job does not have the characteristic.

A staple remaining amount reading-out function of the controlling unit 101r is a function for reading out data of staple types and remaining amounts of staples with the respective staple types from the staple remaining amount memory unit 101n, if in terms of the third characteristic-existence determining function it is determined that a finished print job does not have the characteristic.

A fourth characteristic-existence determining function of the controlling unit 101r is a function for determining whether a finished print job has a characteristic or not according to whether or not the type of the finished print job is "staple printing" and a remaining amount of staples with any of staple types is less than a predetermined threshold.

A fourth display controlling function of the controlling unit 101r is a function for reading out a template file of a ready screen that the value of information on whether or not a characteristic exists is "YES" and the type of the characteristic is that "staples will be short in near future" from the template file storing unit 101o, and combining the template file with the data of remaining amounts of staples with respective staple types in order to generate ready screen data, and then causing the display screen 1a1 to display the ready screen indicating remaining amounts of staples with respective staple types only in the preset display period, if in terms of the fourth characteristic-existence determining function it is determined that a finished print job has the characteristic.

A fifth display controlling function of the controlling unit 101r is a function for reading out a template file of a ready screen that the value of information on whether or not a characteristic exists is "NO" from the template file storing unit 101o, and combining the template file with data of one or more remaining amounts of toner read out from the toner remaining amount memory unit 101h in order to generate ready screen data, and then causing the display screen 1a1 to display the ready screen containing an image indicating one or more remaining amounts of toner only in the preset display period, if in terms of the fourth characteristic-existence determining function it is determined that a finished print job does not have the characteristic.

Hereinafter, processes executed by the multi function peripheral 1 of Embodiment 2 with the forementioned configuration will be explained with reference to drawings.

Figure 22:
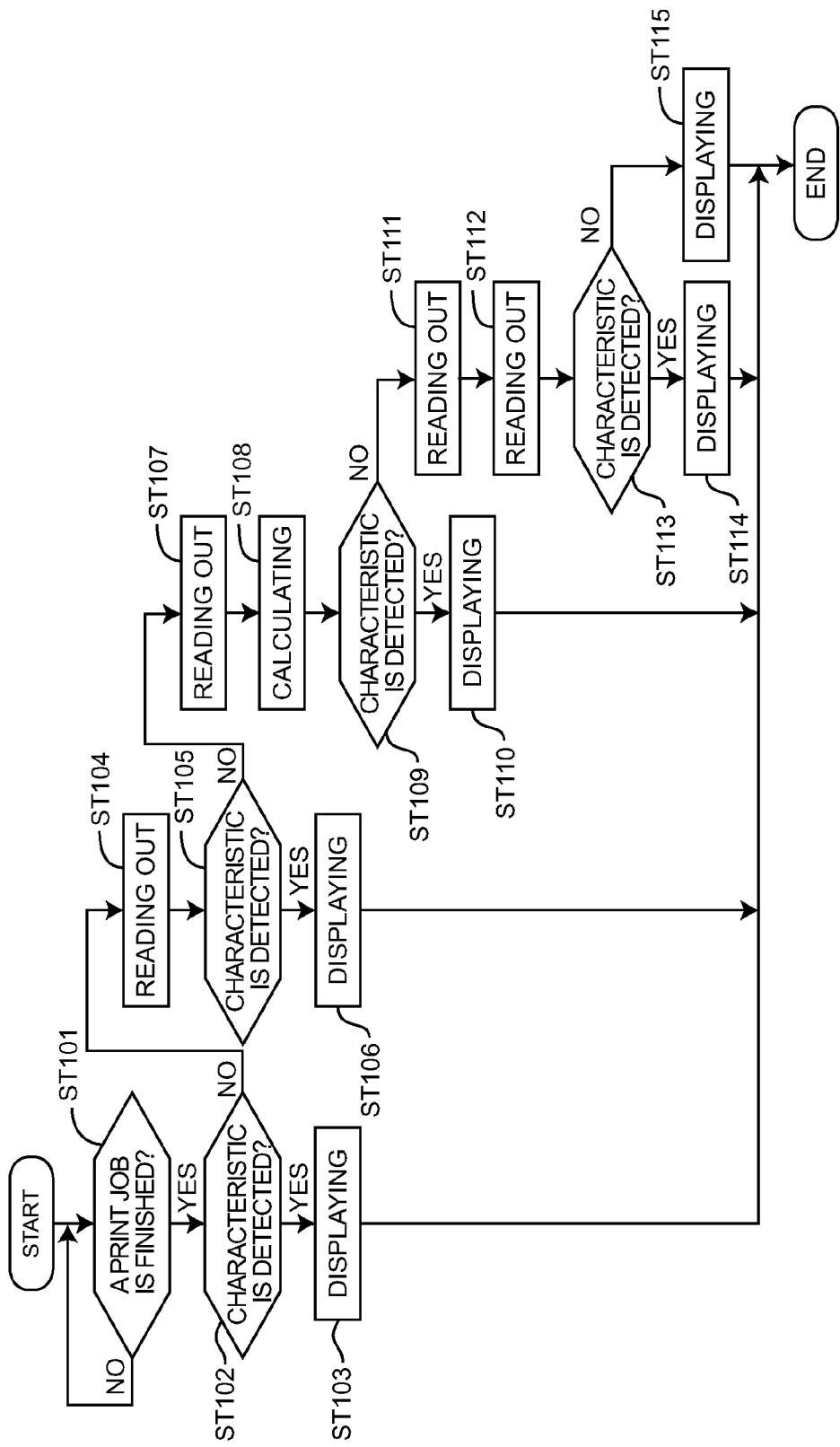
FIG. 22 is a flowchart for explaining a process executed by the multi function peripheral of Embodiment 2.

FIG. 22 is a flowchart for explaining a process executed by the multi function peripheral of Embodiment 2.

In the multi function peripheral 1 of Embodiment 2, when process of a print job is started, execution of an image forming program installed in a computer of the multi function peripheral 1 is started to perform processes described below.

Firstly, the controlling unit 101r determines whether a current print job is finished or not according to whether a print-job-end notice has been received from the printer engine unit 101q (Step ST101).

If in Step ST101 it is determined that a current print job is finished (ST101: "YES"), then the controlling unit 101r reads out a coverage rate of the finished print job from the print job history data storing unit 101k, and determines whether the finished print job has a characteristic or not according to whether or not the coverage rate is equal to or greater than a predetermined threshold (Step ST102).

In Embodiment 2, the controlling unit 101r counts the number of bits included in characters and/or images in bitmap data and calculates the coverage rate by dividing the number of the bits by the number of all bits in the bitmap data, and then determines whether or not the print job has the characteristic based on the calculated coverage rate. Alternatively, the controlling unit 101r may count the number of bits included in characters and/or images in each of pages in bitmap data, and calculate coverage rates of the respective pages by dividing the numbers of the bits on the pages by the numbers of all bits on the pages respectively, and then determine whether the print job has the characteristic or not according to whether or not an average of the coverage rates of the pages is equal to or greater than a predetermined threshold.

Otherwise, if in Step ST101 it is determined that a current print job has not been finished (ST101: "NO"), then the controlling unit 101r repeatedly determines whether or not the current print job is finished.

If in Step ST102 it is determined that the finished print job has the characteristic (ST102: "YES"), then the controlling unit 101r reads out a template file of a ready screen that the value of information on whether or not a characteristic exists is "YES" and the type of the characteristic is "coverage rate excess" from the template file storing unit 101o, reads out data of one or more remaining amounts of toner from the toner remaining amount memory unit 101*h*, and combines the template file with data of the one or more remaining amounts of toner in order to generate ready screen data, and then causes the display screen 1*a*1 to display the ready screen indicating one or more remaining amounts of toner (Step ST103).

Figure 23:
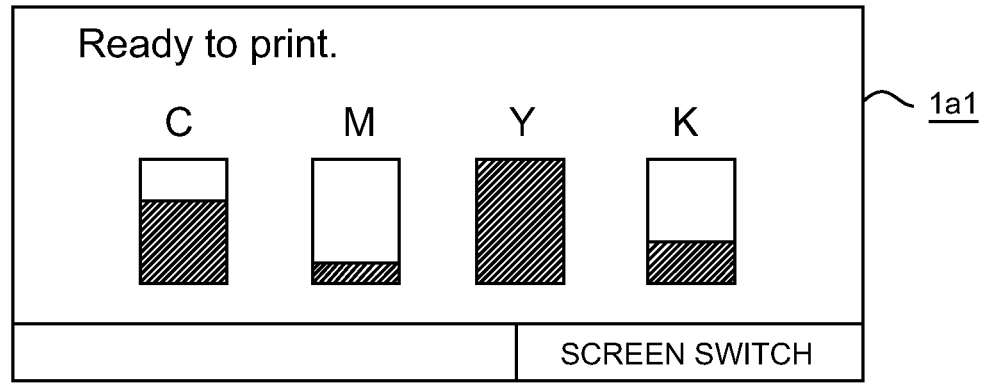
FIG. 23 is a schematic diagram indicating an instance of a ready screen displayed on a display screen in the multi function peripheral of Embodiment 2 in case that a last previous print job has a characteristic on a coverage rate.

FIG. 23 is a schematic diagram indicating an instance of a ready screen displayed on the display screen 1*a*1 in the multi function peripheral 1 of Embodiment 2 in case that a last previous print job has a characteristic on a coverage rate.

This ready screen includes (a) a message "Ready to print." indicating that the current screen is a ready screen, (b) a first image that indicates one or more remaining amounts of toner, and (c) a screen-switch button to detect inputting a request, in terms of operation to this button on this ready screen, for displaying another ready screen mentioned below that contains a second image indicating one or more remaining amounts of toner different from the first image. The another ready screen is a ready screen displayed when any errors has not taken place.

Otherwise, if in Step ST102 it is determined that the finished print job does not have the characteristic (ST102: "NO"), then the controlling unit 101*r* reads out the number of printed sheets in the last previous finished print job from the print job history data storing unit 101*k* (Step ST104).

In Step ST105, the controlling unit 101*r* determines whether the finished print has a characteristic or not according to whether or not the read-out number of printed sheets is equal to or greater than a predetermined threshold.

If in Step ST105 it is determined that the print job has the characteristic (ST105: "YES"), then the controlling unit 101*r* reads out a template file of a ready screen that the value of information on whether or not a characteristic exists is "YES" and the type of the characteristic is "printed-sheet excess" from the template file storing unit 101*o*, reads out data of remaining amounts of papers in respective paper drawers from the sheet remaining amount memory unit 101*j*, and combines the template file with data of the remaining amounts of papers in respective paper drawers in order to generate ready screen data, and then causes the display screen 1*a*1 to display the ready screen indicating remaining amounts of papers in respective paper drawers.

Figure 24:
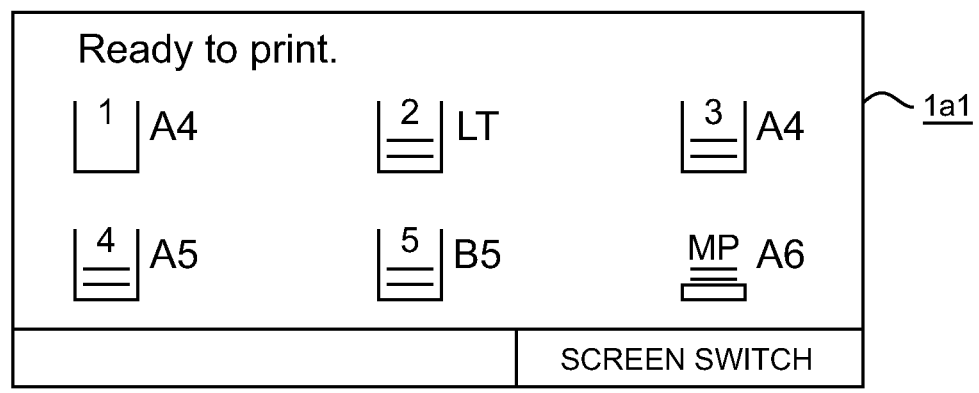
FIG. 24 is a schematic diagram indicating an instance of a ready screen displayed on a display screen in the multi function peripheral of Embodiment 2 in case that a last previous print job has a characteristic on the number of printed sheets.

FIG. 24 is a schematic diagram indicating an instance of a ready screen displayed on the display screen 1*a*1 in the multi function peripheral 1 of Embodiment 2 in case that a last previous print job has a characteristic on the number of printed sheets.

This ready screen includes (a) a message "Ready to print." indicating that the current screen is a ready screen, (b) a third image that indicates remaining amounts of papers in respective paper drawers, and (c) a screen-switch button to detect inputting a request, in terms of operation to this button on this ready screen, for displaying another ready screen mentioned below that includes the second image indicating one or more remaining amounts of toner different from the third image. The another ready screen is a ready screen displayed when any errors has not taken place.

Otherwise, if in Step ST105 it is determined that the print job does not have the characteristic (ST105: "NO"), then the controlling unit 101*r* reads out the print type of the print job (i.e. the last previous print job) from the print job history data storing unit 101*k* (Step ST107).

In Step ST108, the controlling unit 101*r* reads out data of all jobs that was finished in the past from the print job history data storing unit 101*k*, reads out MAC addresses of sections from the section information storing unit 101*l*, calculates the numbers of sheets printed for respective sections by summing up the number of sheets printed for each of sections corresponding to each of the MAC addresses based on the data of all jobs.

In Embodiment 2, the numbers of sheets printed for respective sections are calculated after the print type data is read out from the print job history data storing unit 101*k*. Alternatively, the numbers of sheets printed for respective sections may be calculated before the print type data is read out from the print job history data storing unit 101*k*. Further, alternatively, the process of calculating the numbers of sheets printed for respective sections and the process of reading out the print type data from the print job history data storing unit 101*k* may be performed in parallel.

In Step ST109, the controlling unit 101*r* determines whether the print job has a characteristic or not according to whether or not the type of the print job is section management printing and any of differences between respective predetermined uppermost limit values and the numbers of sheets printed for respective sections is less than a predetermined threshold.

If in Step ST109 it is determined that the print job has the characteristic (ST109: "YES"), then the controlling unit 101*r* reads out a template file of a ready screen that the value of information on whether or not a characteristic exists is "YES" and the type of the characteristic is that "number of printed sheets reaches limit in near future" from the template file storing unit 101*o*, and combines the template file with a pair of the number of printed sheets and a predetermined uppermost limit value with regard to a section that the difference between the predetermined uppermost limit value and the number of printed sheets is less than a predetermined threshold, and then causes the display screen 1*a*1 to display the ready screen indicating the uppermost limit value and the number of printed sheets with regard to the section (Step ST110).

Figure 25:
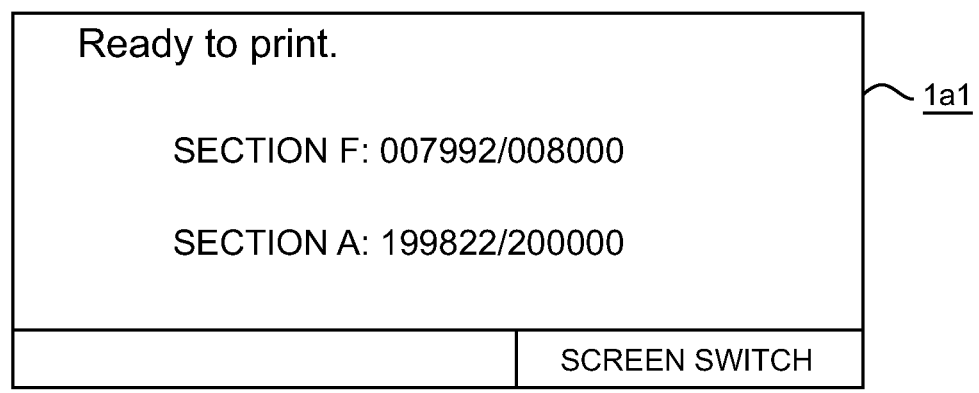
FIG. 25 is a schematic diagram indicating an instance of a ready screen displayed on a display screen in the multi function peripheral of Embodiment 2 in case that a last previous print job is section management printing and a difference between a predetermined uppermost limit value of the number of printed sheets on any section of all sections and the number of sheets that has been printed for the section is less than a threshold.

FIG. 25 is a schematic diagram indicating an instance of a ready screen displayed on the display screen 1*a*1 in the multi function peripheral 1 of Embodiment 2 in case that a last previous print job is section management printing and a difference between a predetermined uppermost limit value of the number of printed sheets on each section of all sections and the number of sheets that has been printed for the section is less than a threshold.

This ready screen includes (a) a message "Ready to print." indicating that the current screen is a ready screen, (b) a fourth image that indicates the numbers of printed sheets and the uppermost limit values of them for respective sections, and (c) a screen-switch button to detect inputting a request, in terms of operation to this button on this ready screen, for displaying another ready screen. The another screen contains the second image indicating one or more remaining amounts of toner rather than the fourth image in case that any errors have not taken place. The another ready screen is the forementioned ready screen that containing the second image.

It should be noted that the multi function peripheral 1 of Embodiment 2 may display a ready screen that contains an image indicating the numbers of sheets printed for respective sections and/or the numbers of sheets that can be printed hereafter, if the last previous print job is section management printing and the difference between a predetermined uppermost limit value of the number of printed sheets on any section and the number of sheets that has been printed for the section is less than a threshold. The numbers of sheets that can be printed hereafter may be calculated as the difference between the number of printed sheets and the uppermost limit value of it.

Otherwise, if in Step ST109 it is determined that the print job does not have the characteristic (ST109: "NO"), then the controlling unit 101r reads out data of the print type of the print job (i.e. the last previous print job) from the print job history data storing unit 101k (Step ST111).

In addition, the controlling unit 101r reads out data of staple types and remaining amounts of staples with the respective staple types from the staple remaining amount memory unit 101n (Step ST112).

In Embodiment 2, the data of staple types and remaining amounts of staples with the respective staple types is read out after the print type data is read out. Alternatively, the data of staple types and remaining amounts of staples with the respective staple types may be read out before the print type data is read out. Further, alternatively, the process of reading out the data of staple types and remaining amounts of staples with the respective staple types and the process of reading out the print type data may be performed in parallel.

In Step ST113, the controlling unit 101r determines whether the finished print job has a characteristic or not according to whether or not the type of the finished print job is "staple printing" and a remaining amount of staples with any of staple types is less than a predetermined threshold.

If in Step ST113 it is determined that the finished print job has the characteristic (ST113: "YES"), then the controlling unit 101r reads out a template file of a ready screen that the value of information on whether or not a characteristic exists is "YES" and the type of the characteristic is that "staples will be short in near future" from the template file storing unit 101o, and combines the template file with data of remaining amounts of staples with respective staple types read out from the staple remaining amount memory unit 101n in order to generate ready screen data, and then causes the display screen 1a1 to display the ready screen indicating remaining amounts of staples with respective staple types (ST114).

Figure 26:
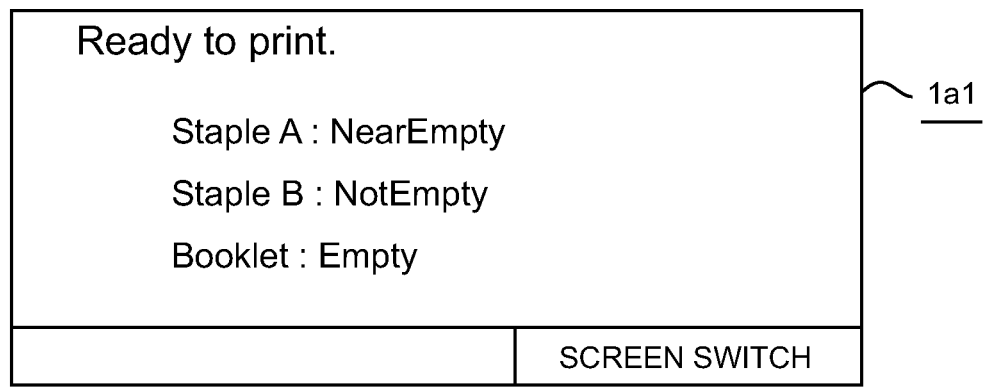
FIG. 26 is a schematic diagram indicating an instance of a ready screen displayed on a display screen in the multi function peripheral of Embodiment 2 in case that a last previous print job is staple printing and a remaining amount of staples with any of staple types is less than a threshold.

FIG. 26 is a schematic diagram indicating an instance of a ready screen displayed on the display screen 1a1 in the multi function peripheral 1 of Embodiment 2 in case that a last previous print job is staple printing and a remaining amount of staples with any of staple types is less than a threshold.

This ready screen includes (a) a message "Ready to print." indicating that the current screen is a ready screen, (b) a fifth image that indicates remaining amounts of staples in respective staple storages, and (c) a screen-switch button to detect inputting a request, in terms of operation to this button on this ready screen, for displaying another ready screen. The another ready screen includes the first image indicating one or more remaining amounts of toner rather than the fifth image in case that any errors has not taken place. The another ready screen is the forementioned ready screen that containing the first image.

It should be noted that the multi function peripheral 1 of Embodiment 2 may display a ready screen further containing an image that indicates statuses of some options such as booklet printing function, if the type of the finished print job is "staple printing" and a remaining amount of staples with any of staple types is less than a predetermined threshold.

Otherwise, if in Step ST113 it is determined that the print job does not have the characteristic (ST113: "NO"), then the controlling unit 101r reads out a template file of a ready screen that the value of information on whether or not a characteristic exists is "NO" from the template file storing unit 101o, and combines the template file with data of one or more remaining amounts of toner read out from the toner remaining amount memory unit 101h in order to generate ready screen data, and then causes the display screen 1a1 to display the ready screen containing an image indicating one or more remaining amounts of toner (Step ST115).

Figure 27:
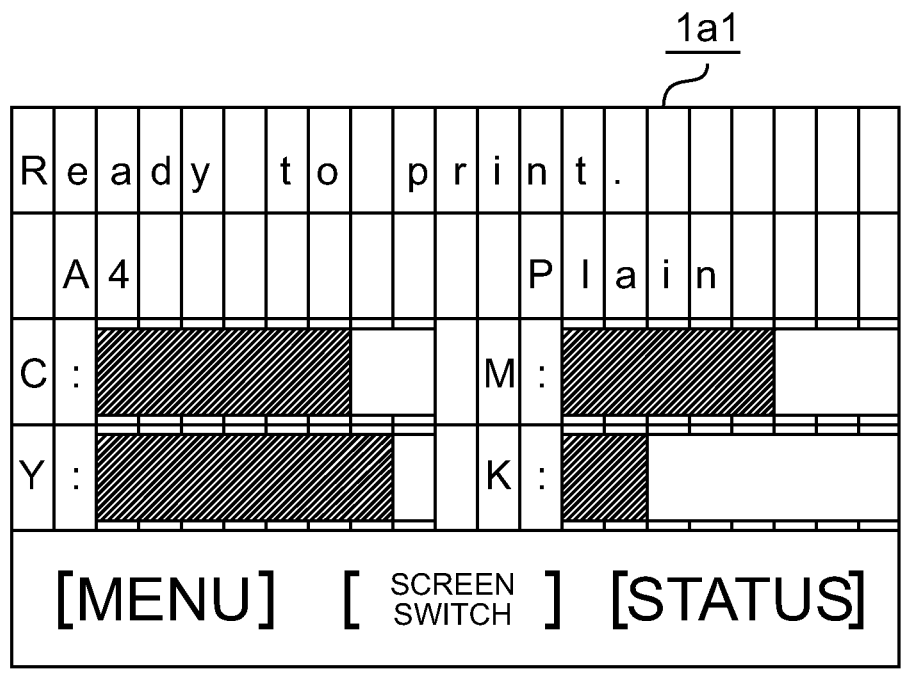
FIG. 27 is a schematic diagram indicating an instance of a ready screen displayed on a display screen in the multi function peripheral of Embodiment 2 in case that any errors have not occurred in a last previous print job.

FIG. 27 is a schematic diagram indicating an instance of a ready screen displayed on the display screen 1a1 in the multi function peripheral 1 of Embodiment 2 in case that any errors have not occurred in a last previous print job.

This ready screen includes (a) a message "Ready to print." indicating that the current screen is a ready screen, (b) a paper size set up as a default, (c) a paper type set up as a default, (d) the second image that indicates one or more remaining amounts of toner, (e) a menu-screen button to detect inputting a request, in terms of operation to this button on this ready screen, for displaying a menu screen, and (f) a status-indication-screen button to detect inputting a request, in terms of operation to this button on this ready screen, for displaying a status indication screen that indicates a job list of executable jobs to be executed hereafter.

It should be noted that the ready screens displayed by the display screen 1a1 in Embodiment 2 may further contain an image that indicates the number of consumed papers together with the first image that indicates one or more remaining amounts of toner.

As mentioned above, the multi function peripheral 1 of Embodiment 2 executes a series of the processes.

According to the multi function peripheral 1 of Embodiment 2, information suggesting an issue that would occur is provided to an operator and then the operator can cope in advance of errors that will take place in near future.

In addition, the operator can know an issue that will take place in near future in advance.

Further, the multi function peripheral 1 of Embodiment 2 can display necessary information only when a user who needs the information stands in front of the display panel, therefore a ready screen to be displayed can be chosen from ready screens according to whether any of errors has taken place or not.

In addition, according to the multi function peripheral 1 of Embodiment 2, information for preventing from occurrence of an issue can be indicated automatically.

Embodiment 3

Figure 28:
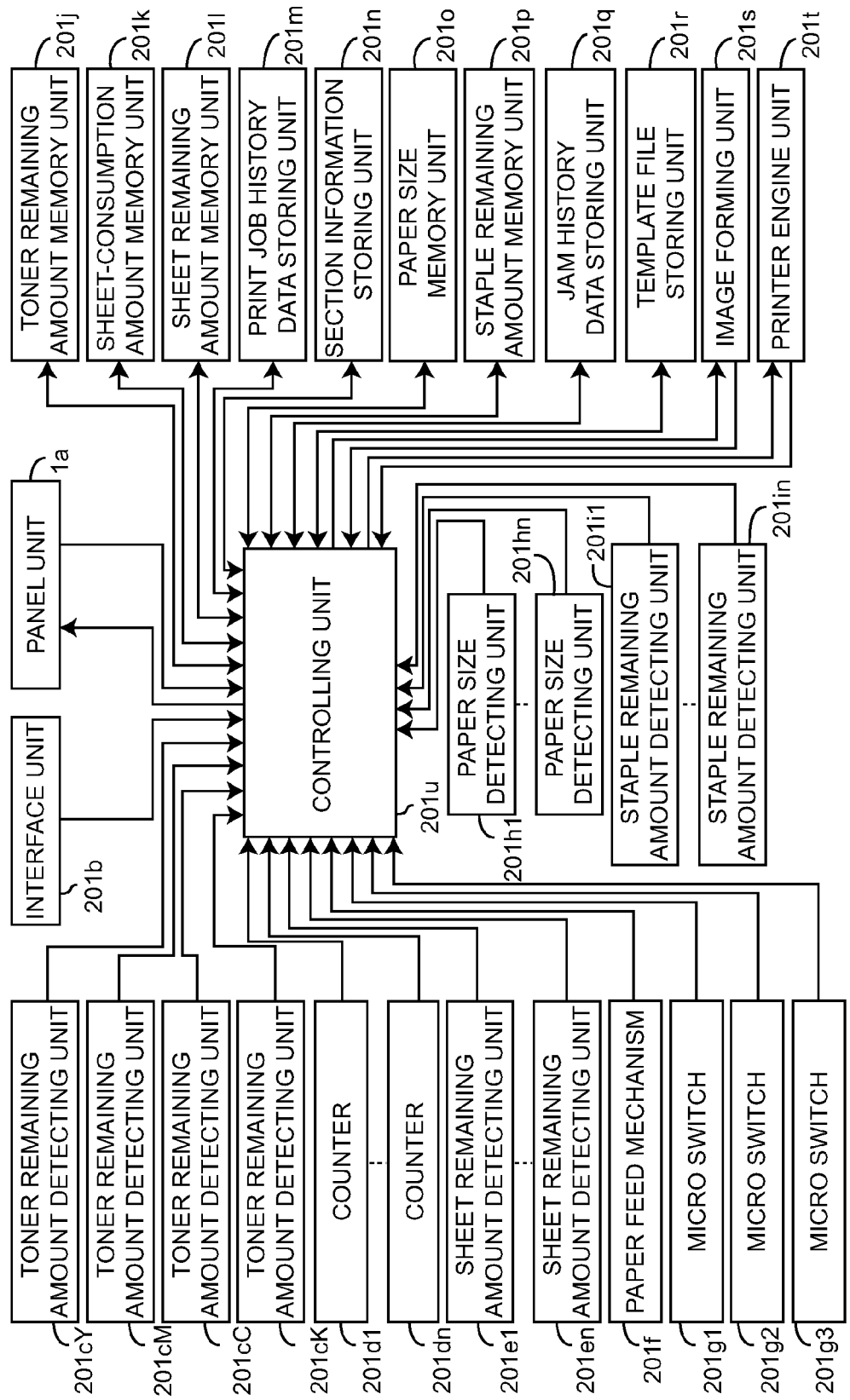
FIG. 28 is a functional block diagram indicating an instance of configuration of a multi function peripheral according to Embodiment 3.

A multi function peripheral 1 of Embodiment 3 causes a display screen 1a1 to display a ready screen that includes information on an error that has occurred during execution of a print job after the print job is finished. FIG. 28 is a functional block diagram indicating an instance of configuration of the multi function peripheral 1 according to Embodiment 3.

The multi function peripheral 1 of Embodiment 3 is a multi function peripheral as shown in FIG. 1, that displays ready screens indicating that a job can be accepted on a display screen 1a1 in a display panel when a job can be accepted. The ready screens further indicate predetermined various sorts of information specified by content of an error that has occurred in execution of a last previous print job.

As shown in FIG. 28, the multi function peripheral 1 of Embodiment 3 comprises a panel unit 1a; an interface unit 201b; toner remaining amount detecting units 201cY, 201cM, 201cC and 201cK; counters 201d1 to 201dn of respective paper drawers; sheet remaining amount detecting units 201e1 to 201en of respective paper drawers; a paper feed mechanism 201f; micro switches 201g1 to 201g3; paper size detecting units 201h1 to 201hn of respective paper drawers; staple remaining amount detecting units 201i1 to 201in; a toner remaining amount memory unit 201j; a sheet-consumption amount memory unit 201k; a sheet remaining amount memory unit 201l; a print job history data storing unit 201m; a section information storing unit 201n; a paper size memory unit 201o; a staple remaining amount memory unit 201p; a jam history data storing unit 201q; a template file storing unit 201r; an image forming unit 201s; a printer engine unit 201t; and a controlling unit 201u.

Further, the multi function peripheral 1 of Embodiment 3 comprises a computer that has an internal memory (not shown) in which an image forming program was written during manufacture, or is installed an image forming program via either a computer readable recording medium or a communication network.

Each of the units in the multi function peripheral 1 of Embodiment 3 may be embodied with software (i.e. program control), hardware (i.e. specific-purpose electronic circuits) or a combination of software and hardware.

The panel unit 1a has a display screen 1a1. The display screen 1a1 is an example of a display unit. The display screen 1a1 displays a menu screen, a status indication screen and a ready screen. The menu screen is displayed right after a power supply switch of the multi function peripheral 1 is turned on, in order to perform (a) switching a current active function among a facsimile function, a scanner function, a copier function and a printer function, (b) setting-up setting items of document scanning such as resolution, electronic file format of generated document data, image quality, density, and magnification, (c) setting-up each of operation modes, etc. The status indication screen is displayed upon an operator's operation on a touch panel, in order to indicate a current execution status of a job. The ready screen is displayed when a job can be accepted, in order to indicate that a job can be accepted.

The panel unit 1a of Embodiment 3 has a display-period setting operation detecting function and a display-period setting request outputting function.

The display-period setting operation detecting function is a function for detecting inputting a display period of a ready screen in terms of operator's operation to a touch panel. The display period can be set to an optional period within the period from the end of the finished print job to the beginning of a next print job in terms of the operator's operation.

The display-period setting request outputting function is a function is a function for outputting to the controlling unit 201u a pair of the display period data and a request to set the display period of each of ready screens.

The interface unit 201b receives a packet that comprises (a) a header part containing a job ID assigned to each of print jobs and a MAC address of a terminal device in a communication network such as LAN or WAN and (b) a print data body described in a page description language or the like, via the communication network transmitted from the terminal device such as a personal computer or another multi function peripheral as the terminal device not shown here, and outputs data included in the received packet to the controlling unit 201u after executing some processes such as parity check and error correction for the data of the received packet.

The toner remaining amount detecting units 201cY, 201cM, 201cC and 201cK detect remaining amounts of toner with respective colors YMCK (Yellow/Magenta/Cyan/Black), and attach toner sensor IDs assigned to the respective units 201cY, 201cM, 201cC and 201cK to respective data of the remaining amounts of toner, and output respective pairs of the remaining amount of toner and the toner sensor ID to the controlling unit 201u.

The counters 201d1 to 201dn are located with paper drawers to count the numbers of sheets printed from the respective paper drawers, and attach counter IDs assigned to the respective counters 201d1 to 201dn to respective data of the counted numbers of printed sheets, and output respective pairs of the counted number of printed sheets and the counter ID to the controlling unit 201u.

The sheet remaining amount detecting units 201e1 to 201en are located with paper drawers to detect remaining amounts of papers in the respective paper drawers, and attach paper sensor IDs assigned to the respective units 201e1 to 201en to the respective remaining amounts of papers, and output respective pairs of the remaining amount of papers and the paper sensor ID to the controlling unit 201u.

The paper feed mechanism 201f outputs an output completion notice right after a paper sheet (an information record medium) has been fed to a transportation path. The output completion notice indicates that a paper sheet has been fed to a transportation path.

The micro switches 201g1 to 201g3 are located in upper region, middle region and lower region in a transportation path, respectively. The micro switches 201g1 to 201g3 are switches with arms not shown here to detect that a paper passes on the transportation path, and output a paper detection signal to the controlling unit 201u when detecting that a paper passes at each of the regions where the micro switches 201g1 to 201g3 are located. The paper detection signal indicates that a paper passes at a region where one of the micro switches 201g1 to 201g3 is located.

The paper size detecting units 201h1 to 201hn have a function for detecting paper sizes of papers supplied in respective paper drawers, and a function for attaching size sensor IDs assigned to the respective paper size detecting units 201h1 to 201hn to respective detected paper sizes and outputting respective pairs of the size sensor ID and the detected paper size to the controlling unit 201u.

The staple remaining amount detecting units 201i1 to 201in detect remaining amounts of staples in respective staple storages, and output to the controlling unit 201u a pair of each of the remaining amounts of staples and a staple sensor ID assigned to each of the staple remaining amount detecting units 201i1 to 201in.

The toner remaining amount memory unit 201j stores the remaining amounts of toner, the toner sensor IDs and detection time as related to each other, respectively.

The sheet-consumption amount memory unit 201k stores the numbers of printed sheets, the counter IDs and detection time as related to each other, respectively.

The sheet remaining amount memory unit 201l stores the remaining amounts of papers, the paper sensor IDs and detection time as related to each other, respectively.

The print job history data storing unit 201m stores at least a print job ID, a print job priority level, print job progress information, a MAC address of the requesting terminal device, type information of either color printing or monochrome printing, execution beginning time, execution ending time, the number of printed sheets, information on whether an error has occurred or not, an error type that indicates content of the error for each of print jobs, as related to each other.

The section information storing unit 201n store a MAC address uniquely assigned to each of terminal devices in the network and information on a section that accommodates the terminal device to which the MAC address is assigned, as related to each other.

The paper size memory unit 201o stores relationships between respective paper drawers and respective paper sizes.

The staple remaining amount memory unit 201p stores at least staple types and remaining amounts of staples with the respective staple types.

The jam history data storing unit 201$q$ stores at least jam types and the numbers of times of jams with the respective jam types.

The template file storing unit 201$r$ stores template files of the menu screen, the status indication screen and the ready screens. Information on whether an error has occurred or not, an error type that indicates content of the error, a display period, one or more items to be displayed, display format, and information on layout of the one or more items are defined in the template file.

The image forming unit 201$s$ has a bitmap data generating function and a bitmap data outputting function.

The bitmap data generating function is a function for receiving print data described in a page description language from the controlling unit 201$u$ and converting the received print data to bitmap data.

The bitmap data outputting function is a function for sending the bitmap data generated in terms of the bitmap data generating function as a response to the controlling unit 201$u$.

The printer engine unit 201$t$ has a print job executing function, a print job list generating function, a print-job-start notice outputting function and a print-job-end notice outputting function.

The print job executing function is a function for generating an image with electrophotographic process based on the bitmap data received from the controlling unit 201$u$ and forming the image on a surface of a paper as an information record medium.

The print job list generating function is a function for generating a print job list of executable print jobs to be executed, with sorting the executable print jobs to be executed based on a job priority level included in the data received from the controlling unit 201$u$ if an interrupting print job takes place, and for outputting the generated print job list to the controlling unit 201$u$.

The print-job-start notice outputting function is a function for outputting a print-job-start notice to the controlling unit 201$u$ at the beginning of a job. The print-job-start notice indicates that execution of the print job started.

The print-job-end notice outputting function is a function for outputting a print-job-end notice to the controlling unit 201$u$ at the end of a job. The print-job-end notice indicates that execution of the print job ended.

The controlling unit 201$u$ has functions mentions below and controls the panel unit 1$a$, the interface unit 201$b$, the toner remaining amount detecting units 201$c$Y, 201$c$M, 201$c$C and 201$c$K, the counters 201$d$1 to 201$dn$, the sheet remaining amount detecting units 201$e$1 to 201$en$, the paper feed mechanism 201$f$, micro switches 201$g$1 to 201$g$3, the paper size detecting units 201$h$1 to 201$hn$, the staple remaining amount detecting units 201$i$1 to 201$in$, the toner remaining amount memory unit 201$j$, the sheet-consumption amount memory unit 201$k$, the sheet remaining amount memory unit 201$l$, the job history data storing unit 201$m$, the section information storing unit 201$n$, the paper size memory unit 201$o$, the staple remaining amount memory unit 201$p$, the jam history data storing unit 201$q$, the template file storing unit 201$r$, the image forming unit 201$s$, and the printer engine unit 201$t$, in order to execute an error existence determining process mentioned below and a display control process to cause the display screen 1$a$1 to display ready screens mentioned below in the multi function peripheral 1 of this embodiment.

A display-period setting request determining function of the controlling unit 201$u$ is a function for determining whether a display-period setting request for setting-up a display period of a ready screen has been received from an operator or not according to whether a pair of the display period data and the display-period setting request has been received from the panel unit 1$a$.

A display-period setting-up function of the controlling unit 201$u$ is a function for setting-up the display period of a template file of a ready screen stored in the template file storing unit 201$r$ if in terms of the display-period setting request determining function it is determined that the display-period setting request has been received.

A packet data transferring function of the controlling unit 201$u$ is a function for outputting to the image forming unit 201$s$ data included in a packet received from the interface unit 201$b$.

A bitmap data transferring function of the controlling unit 201$u$ is a function for outputting to the printer engine unit 201$t$ bitmap data received from the image forming unit 201$s$.

A timer function of the controlling unit 201$u$ is a function for measuring time continuously.

A toner amount writing function of the controlling unit 201$u$ is a function for receiving pairs of the remaining amounts of toner with respective colors YMCK and the respective toner sensor IDs output from the toner remaining amount detecting units 201$c$Y, 201$c$M, 201$c$C and 201$c$K, and for writing a set of the remaining amount of toner, the toner sensor ID and detection time data on each of the colors in the toner remaining amount memory unit 201$j$ with regarding the time when the pairs are received as the detection time and attaching the detection time data to each of the received pairs.

A number-of-printed-sheet writing function of the controlling unit 201$u$ is a function for receiving pairs of the respective counted numbers of printed sheets and the respective counter IDs from the counters 201$d$1 to 201$dn$, and for writing a set of the counted number of printed sheets, the counter ID and detection time on each of the paper drawers in the sheet-consumption amount memory unit 201$k$ with regarding the time when the pairs are received as the detection time and attaching the detection time data to each of the received pairs.

A print job list writing function of the controlling unit 201$u$ is a function for receiving the print job list from the printer engine 201$t$, and for writing the print job list with color/monochrome printing type information in the print job history data storing unit 201$m$ after determining whether a print data body of each of jobs in the print job list has color information and attaching the color/monochrome printing type information to the print job. The color/monochrome printing type information is specified according to the determining result, and indicates that a print job is either color-printing job or monochrome-printing job.

A first print job history updating function of the controlling unit 201$u$ is a function for updating print job execution beginning time in print job history data stored in the print job history data storing unit 201$m$ upon receiving a print-job-start notice from the printer engine unit 201$t$.

A second print job history updating function of the controlling unit 201$u$ is a function for updating print job history data in the print job history data storing unit 201$m$ by changing the value of job progress information to a value (e.g. "finished") indicating that a job ends upon receiving a print-job-end notice from the printer engine unit 201$t$.

A print job reception determining function of the controlling unit 201$u$ is a function for determining whether a job can be accepted or not according to whether a job is being executed or not, with reference to the print job history data storing unit 201$m$.

A first ready-screen display control function of the controlling unit 201$u$ is a function for causing the display unit 1$a$1 to display a ready screen if in terms of the print job reception determining function it is determined that any jobs are not being executed, that is, a job can be accepted. This ready screen indicates that a print job can be accepted, and has a screen-switch button (an example of the first button) to detect a request for displaying another ready screen that includes other information. In this function, a template file that indicates that a job can be accepted and contains the screen-switch button for a ready screen assigned to the default screen is read out from the template file storing unit 201r, with reference to the default screen assignment information in the template file storing unit 201r, and then data of the ready screen is generated from the template file.

A toner empty error determining function of the controlling unit 201u is a function for receiving pairs of the remaining amounts of toner and the toner sensor IDs from the toner remaining amount detecting units 201cY, 201cM, 201cC and 201cK, and determining whether a toner empty error has occurred due to empty of toner in a cartridge or not according to whether or not any of the remaining amounts of toner is zero.

A toner empty error information updating function of the controlling unit 201u is a function for updating data of a print job in the print job history data storing unit 201m, by changing the value of information on whether an error has occurred in the print job or not to "YES" indicating that an error has occurred and changing the value of error type information to "toner empty error", if in terms of the toner empty error determining function it is determined that a toner empty error has occurred.

A paper remaining amount error determining function of the controlling unit 201u is a function for receiving pairs of the remaining amounts of papers and the paper sensor IDs from the sheet remaining amount detecting units 201e1 to 201en, and determining whether a paper empty error has occurred due to paper empty in any of paper drawers or not according to whether or not any of the remaining amounts of papers is zero.

A paper error information updating function of the controlling unit 201u is a function for updating data of a print job in the print job history data storing unit 201m, by changing the value of information on whether an error has occurred in the print job or not to "YES" and changing the value of error type information to "paper empty error", if in terms of the paper remaining amount error determining function it is determined that a paper empty error has occurred.

A size mismatch error determining function of the controlling unit 201u is a function for receiving pairs of the detected paper sizes and the paper size sensor IDs and reading out paper size data in relation to the paper size sensor IDs from the paper size memory unit 201o, and determining whether a size mismatch error has occurred or not due to paper size mismatch between the size of papers supplied in a paper drawer and the paper size of the paper drawer preset in the paper size memory unit 201o, according to whether or not the detected paper sizes are identical to the read-out paper sizes.

A size mismatch error determining function of the controlling unit 201u is a function for updating data of a print job in the print job history data storing unit 201m, by changing the value of information on whether an error has occurred in the print job or not to "YES" and changing the value of error type information to "size mismatch error", if in terms of the size mismatch error determining function it is determined that a size mismatch error has occurred.

A section management disable error determining function of the controlling unit 201u is a function for receiving pairs of the numbers of sheets printed for respective sections and the counter IDs from the counters 201d1 to 201dn, and updating the numbers of sheets printed for respective sections in the print job history data storing unit 201m, by overwriting the data with the received numbers of sheets, and for reading out data of all jobs that was finished in the past from the print job history data storing unit 201m, reading out MAC addresses of sections from the section information storing unit 201n, calculating the numbers of sheets printed for respective sections by summing up the number of sheets printed for each of sections corresponding to the MAC addresses based on the data of all jobs, and then determining whether a section management disable error has occurred or not according to whether or not any of the numbers of sheets printed for respective sections has been greater than a predetermined uppermost limit value, after updating the data of the numbers of sheets printed for respective sections in the print job history data storing unit 201m. The section management disable error indicates that any of the numbers of sheets printed for respective sections has been greater than a predetermined uppermost limit value.

A section management disable error information updating function of the controlling unit 201u is a function for updating data of a print job in the print job history data storing unit 201m, by changing the value of information on whether an error has occurred in the print job or not to "YES" and changing the value of error type information to "section management disable error", if in terms of the section management disable error determining function it is determined that a section management disable error has occurred.

A staple error determining function of the controlling unit 201u is a function for receiving pairs of the remaining amounts of staples and the staple sensor IDs from the staple remaining amount detecting units 201i1 to 201in, and determining whether a staple empty error has occurred due to staple empty in any of staple storages or not according to whether or not any of the remaining amounts of staples is zero.

A staple error information updating function of the controlling unit 201u is a function for updating data of a print job in the print job history data storing unit 201m, by changing the value of information on whether an error has occurred in the print job or not to "YES" and changing the value of error type information to "staple empty error", if in terms of the staple error determining function it is determined that a staple empty error has occurred.

A jam error determining function of the controlling unit 201u is a function for determining whether a jam error has occurred due to that a paper is clogged at any of upper region, middle region and lower region in a transportation path or not, according to
whether or not a paper detection signal is received from the micro switches within a predetermined time after an output completion notice is received from the paper feed mechanism 201f.

A jam error information updating function of the controlling unit 201u is a function for updating data of a print job in the print job history data storing unit 201m, by changing the value of information on whether an error has occurred in the print job or not to "YES" and changing the value of error type information to "jam error", if in terms of the jam error determining function it is determined that a jam error has occurred.

A print-job-end determining function of the controlling unit 201u is a function for determining whether a print job ends or not according to whether the print-job-end notice has been received from the printer engine unit 201t.

A print job data updating function of the controlling unit 201u is a function for updating print job history data in the print job history data storing unit 101*k* by writing end time of a finished print job in the print job history data storing unit 201*m* if in terms of the print-job-end determining function it is determined that the print job is finished.

A print job error determining function of the controlling unit 201*u* is a function for determining whether an error has occurred in a last previous finished print job with reference to information on whether an error has occurred or not of the last previous finished print job in the print job history data storing unit 201*m*.

An error type determining function of the controlling unit 201*u* is a function for determining an error type of the error that has occurred in the last previous finished print job with reference to error type information in the print job history data storing unit 201*m*, if in terms of the print job error determining function it is determined that an error has occurred in the last previous finished print job.

A second ready-screen display control function of the controlling unit 201*u* is a function for causing the display screen 1*a*1 to display a ready screen that includes a first image indicating one or more remaining amount of toner, if in terms of the print job error determining function it is determined that any errors have not occurred. In this function, a template file indicating that any errors have not occurred is read out from the template file storing unit 201*r*, and data of one or more remaining amounts of toner is read out from the toner remaining amount memory unit 201*j*, and then data of the ready screen is generated by combining the template file with the one or more remaining amounts of toner.

A third ready-screen display control function of the controlling unit 201*u* is a function for causing the display screen 1*a*1 to display a ready screen that contains a second image indicating one or more remaining amount of toner, if in terms of the print job error determining function it is determined that an error has occurred and the error type is "toner empty error". In this function, a template file for indicating "toner empty error" is read out from the template file storing unit 201*r*, and data of one or more remaining amounts of toner is read out from the toner remaining amount memory unit 201*j*, and then data of the ready screen is generated by combining the template file with the one or more remaining amounts of toner.

A fourth ready-screen display control function of the controlling unit 201*u* is a function for causing the display screen 1*a*1 to display a ready screen that contains a third image indicating the numbers of sheets printed for respective sections, if in terms of the print job error determining function it is determined that an error has occurred and the error type is "section management disable error". In this function, a template file for indicating "section management disable error" is read out from the template file storing unit 201*r*, and the numbers of sheets printed for respective sections are calculated as mentioned above, and then data of the ready screen is generated by combining the template file with the numbers of sheets printed for respective sections.

A fifth ready-screen display control function of the controlling unit 201*u* is a function for causing the display screen 1*a*1 to display a ready screen that contains a fourth image indicating remaining amounts of papers in respective paper drawers, if in terms of the print job error determining function it is determined that an error has occurred and the error type is "size mismatch error". In this function, a template file for indicating "size mismatch error" is read out from the template file storing unit 201*r*, and data of the remaining amounts of papers in respective paper drawers is read out from the sheet remaining amount memory unit 201*l*, and then data of the ready screen is generated by combining the template file with the remaining amounts of papers in respective paper drawers.

A sixth ready-screen display control function of the controlling unit 201*u* is a function for causing the display screen 1*a*1 to display a ready screen that includes a fifth image indicating remaining amounts of papers in respective paper drawers, if in terms of the print job error determining function it is determined that an error has occurred and the error type is "paper empty error". In this function, a template file for indicating "paper empty error" is read out from the template file storing unit 201*r*, and data of the remaining amounts of papers in respective paper drawers is read out from the sheet remaining amount memory unit 201*l*, and then data of the ready screen is generated by combining the template file with the remaining amounts of papers in respective paper drawers.

A seventh ready-screen display control function of the controlling unit 201*u* is a function for causing the display screen 1*a*1 to display a ready screen that contains a sixth image indicating remaining amounts of staples in respective staple storages, if in terms of the print job error determining function it is determined that an error has occurred and the error type is "staple empty error". In this function, a template file for indicating "staple empty error" is read out from the template file storing unit 201*r*, and data of the remaining amounts of staples in respective staple storages is read out from the staple remaining amount memory unit 201*p*, and then data of the ready screen is generated by combining the template file with the remaining amounts of staples in respective staple storages.

An eighth ready-screen display control function of the controlling unit 201*u* is a function for causing the display screen 1*a*1 to display a ready screen that contains a seventh image indicating jam types (i.e. factors of jams) and the numbers of times of jams with respective the jam types, if in terms of the print job error determining function it is determined that an error has occurred and the error type is "jam error". In this function, a template file for indicating "jam error" is read out from the template file storing unit 201*r*, and data of the jam types and the numbers of times of jams is read out from the jam history data storing unit 201*q*, and then data of the ready screen is generated by combining the template file with the jam tapes and the numbers of times of jams.

Hereinafter, processes executed by the multi function peripheral 1 of Embodiment 3 with the forementioned configuration will be explained with reference to drawings.

Figure 29:
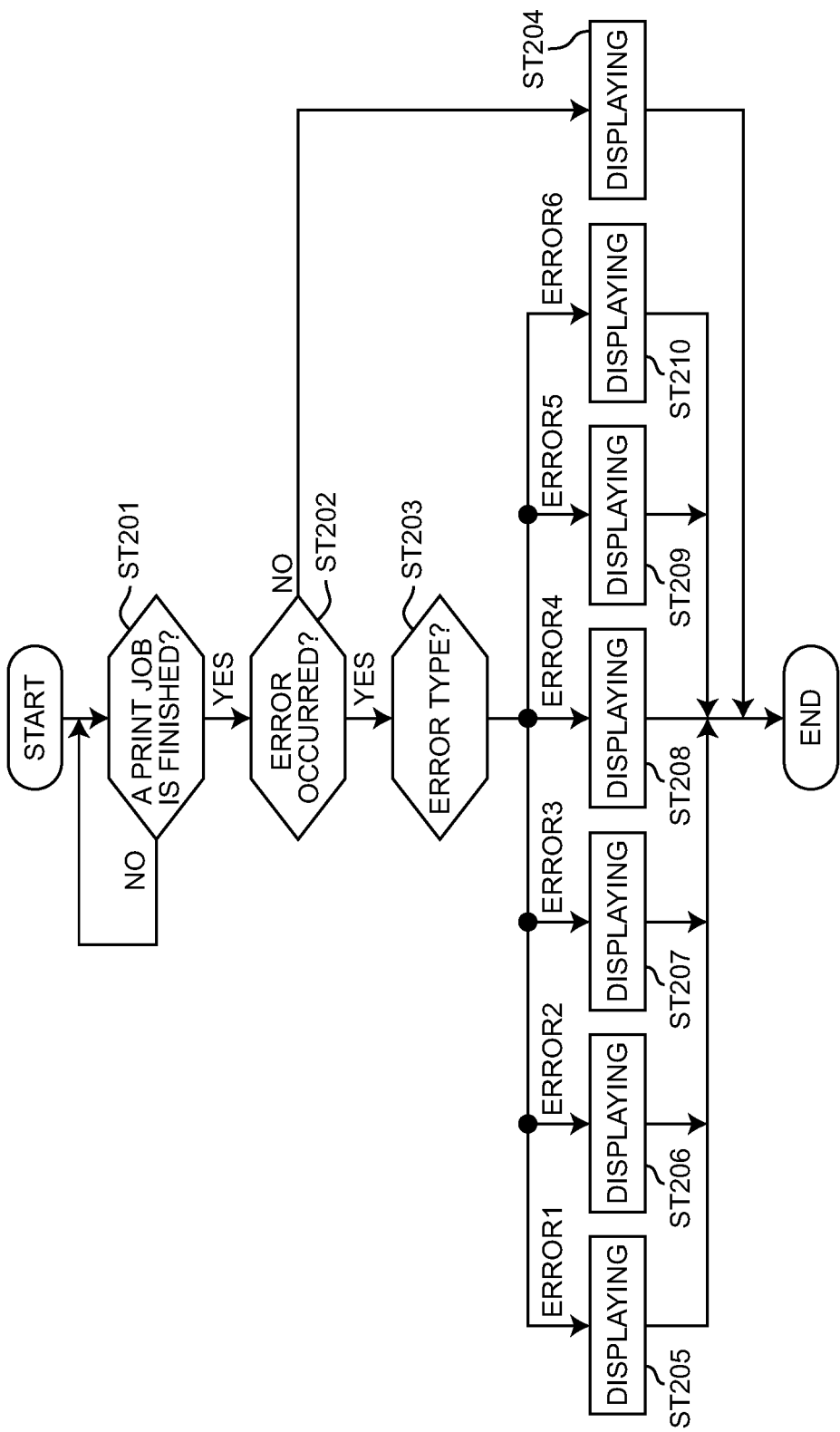
FIG. 29 is a flowchart for explaining a process executed by the multi function peripheral of Embodiment 3.

FIG. 29 is a flowchart for explaining a process executed by the multi function peripheral of Embodiment 3.

In the multi function peripheral 1 of Embodiment 3, right after an operator gets rid of any of "toner empty error", "size mismatch error", "section management disable error", "staple empty error" and "jam error", execution of an image forming program installed in a computer of the multi function peripheral 1 is started to perform processes described below.

Firstly, the controlling unit 201*u* determines whether a current print job is finished or not according to whether the print-job-end notice was received from the printer engine unit 201*t* (Step ST201).

If in Step ST201 it is determined that the current print job is finished (ST201: "YES"), then the controlling unit 201*u* determines whether an error has occurred in a last previous finished print job or not with reference to information on whether an error has occurred in the last previous finished print job or not stored in the print job history data storing unit 201*m* (Step ST202).

Otherwise, if in Step ST201 it is determined that the current print job has not been finished (ST201: "NO"), then the controlling unit 201u repeatedly determines whether the current print job ends.

If in Step ST202 it is determined that an error has occurred in the last previous finished print job (ST202: "YES"), then the controlling unit 201u determines an error type of the error that has occurred in the last previous finished print job with reference to error type information of the last previous finished print job stored in the print job history data storing unit 201m (Step ST203).

Otherwise, in Step ST202 it is determined that any errors have not occurred in the last previous finished print job (ST202: "NO"), then the controlling unit 201u reads out a template file indicating that any errors have not occurred from the template file storing unit 201r, and reads out data of one or more remaining amounts of toner from the toner remaining amount memory unit 201j, and combines the template file with the one or more remaining amounts of toner in order to generate ready screen data, and then causes the display screen 1a1 to display the ready screen that contains a first image indicating one or more remaining amounts of toner only in the display period preset by an operator.

Figure 30:
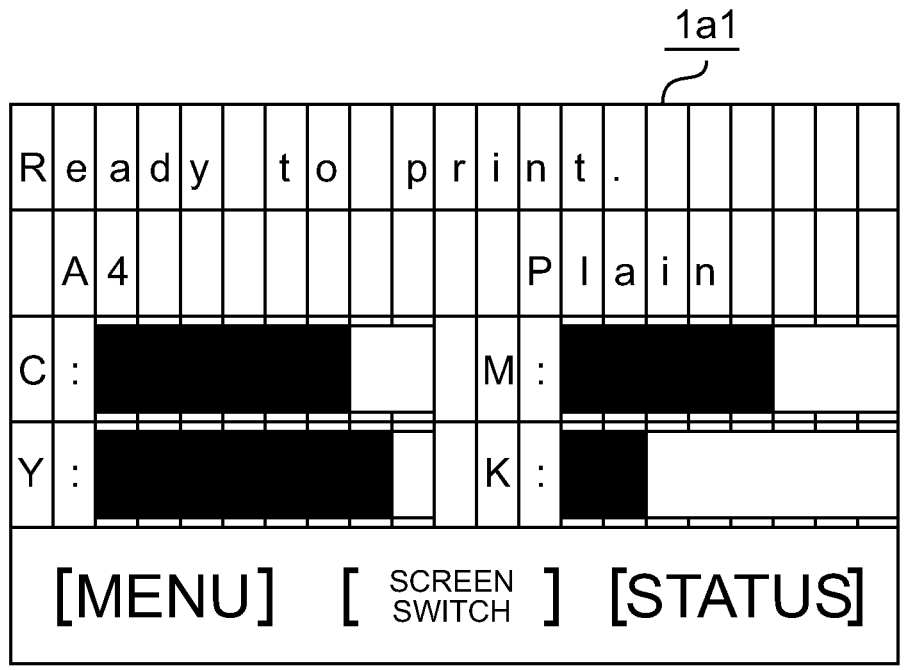
FIG. 30 is a schematic diagram indicating an instance of a ready screen displayed on a display screen in the multi function peripheral of Embodiment 3 in case that any errors have not occurred in a last previous print job.

FIG. 30 is a schematic diagram indicating an instance of a ready screen displayed on the display screen 1a1 in the multi function peripheral 1 of Embodiment 3 in case that any errors have not occurred in a last previous print job.

This ready screen includes (a) a message "Ready to print." indicating that the current screen is a ready screen, (b) a paper size set up as a default, (c) a paper type set up as a default, (d) the first image that indicates one or more remaining amounts of toner, (e) a menu-screen button to detect inputting a request, in terms of operation to this button on this ready screen, for displaying a menu screen, and (f) a status-indication-screen button to detect inputting a request, in terms of operation to this button on this ready screen, for displaying a status indication screen that indicates a job list of executable jobs to be executed hereafter.

It should be noted that the ready screens displayed on the display screen 1a1 in Embodiment 3 may further contain an image that indicates the number of consumed papers together with the first image that indicates one or more remaining amounts of toner.

If in Step ST203 it is determined that the error type is "toner empty error" (ST203: ERROR1), then the controlling unit 201u reads out a template file that the value of information on whether an error has occurred in the print job is "YES" and the value of error type information is "toner empty error" from the template file storing unit 201r and reads out data of one or more remaining amounts of toner from the toner remaining amount memory unit 201j, and combines the template file with the one or more remaining amounts of toner in order to generate ready screen data, and then causes the display screen 1a1 to display the ready screen that contains a second image indicating one or more remaining amounts of toner only in the display period preset by an operator.

Figure 31:
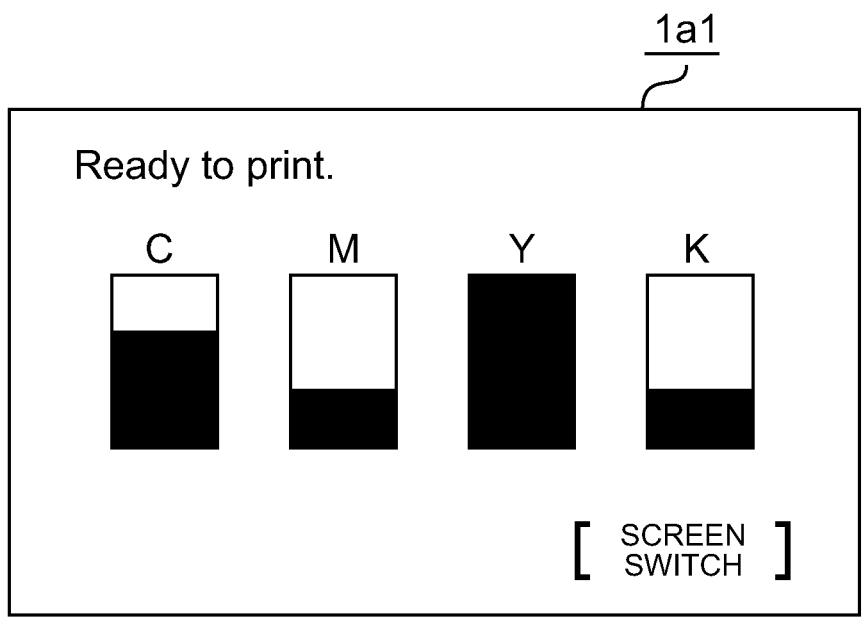
FIG. 31 is a schematic diagram indicating an instance of a ready screen displayed on a display screen in the multi function peripheral of Embodiment 3 in case that a toner empty error has occurred in a last previous print job.

FIG. 31 is a schematic diagram indicating an instance of a ready screen displayed on the display screen 1a1 in the multi function peripheral 1 of Embodiment 3 in case that a toner empty error has occurred in a last previous print job.

This ready screen includes (a) a message "Ready to print." indicating that the current screen is a ready screen, (b) the second image that indicates one or more remaining amounts of toner, and (c) a screen-switch button to detect inputting a request, in terms of operation to this button on this ready screen, for displaying another ready screen. The another ready screen contains the first image indicating one or more remaining amounts of toner rather than the second image. The another ready screen is the forementioned ready screen that containing the first image, displayed in case that any errors has not taken place.

Otherwise, if in Step ST203 it is determined that the error type is "section management disable error" (ST203: ERROR2), then the controlling unit 201u calculates the numbers of sheets printed for respective sections as mentioned above, reads out a template file that the value of information on whether an error has occurred in the print job is "YES" and the value of error type information is "section management disable error" from the template file storing unit 201r, combines the template file with the numbers of sheets printed for respective sections in order to generate ready screen data, and then causes the display screen 1a1 to display the ready screen that contains a third image indicating the numbers of sheets printed for respective sections only in the display period preset by an operator (Step ST206).

Figure 32:
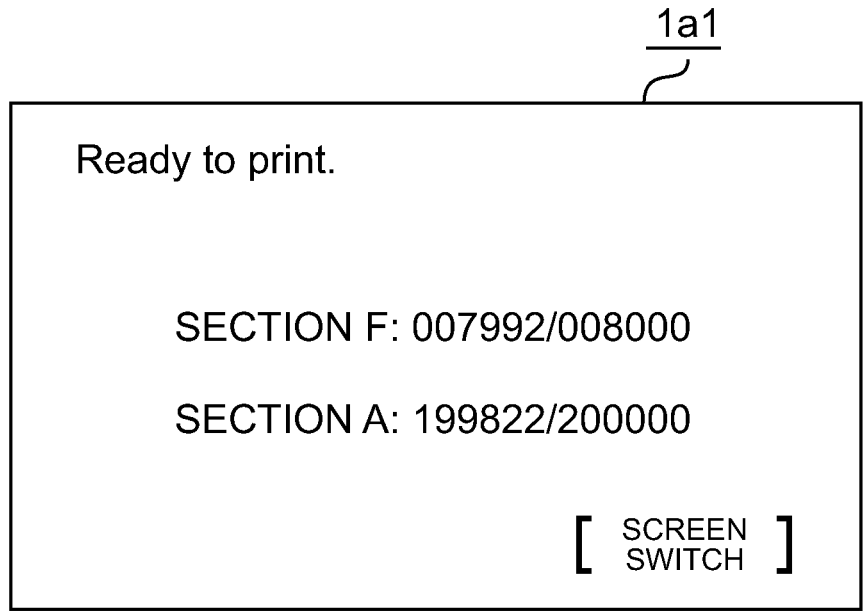
FIG. 32 is a schematic diagram indicating an instance of a ready screen displayed on a display screen in the multi function peripheral of Embodiment 3 in case that a section management disable error has occurred in a last previous print job due to excess of the number of sheets printed for a section over a predetermined uppermost limit value of the section.

FIG. 32 is a schematic diagram indicating an instance of a ready screen displayed on the display screen 1a1 in the multi function peripheral 1 of Embodiment 3 in case that a section management disable error has occurred in a last previous print job due to excess of the number of sheets printed for a section over a predetermined uppermost limit value of the section.

This ready screen includes (a) a message "Ready to print." indicating that the current screen is a ready screen, (b) the third image that indicates the numbers of sheets printed for respective sections, and (c) a screen-switch button to detect inputting a request, in terms of operation to this button on this ready screen, for displaying another ready screen. The another ready screen contains the first image indicating one or more remaining amounts of toner rather than the third image. The another ready screen is the forementioned ready screen that containing the first image, displayed in case that any errors has not taken place.

It should be noted that the multi function peripheral 1 of Embodiment 3 may display a ready screen that contains an image indicating the numbers of sheets printed for respective sections and/or the numbers of sheets that can be printed hereafter, if a section management disable error has occurred in the last previous print job. The numbers of sheets that can be printed hereafter may be calculated as a difference between the number of printed sheets and the uppermost limit value of it.

Otherwise, if in Step ST203 it is determined that the error type is "size mismatch error" (ST203: ERROR3), then the controlling unit 201u reads out a template file that the value of information on whether an error has occurred in the print job is "YES" and the value of error type information is "size mismatch error" from the template file storing unit 201r, combines the template file with remaining amounts of papers in respective paper drawers read out from the sheet remaining amount memory unit 201l in order to generate ready screen data, and then causes the display screen 1a1 to display the ready screen that contains a fourth image indicating the remaining amounts of papers in respective paper drawers only in the display period preset by an operator (Step ST207).

Figure 33:
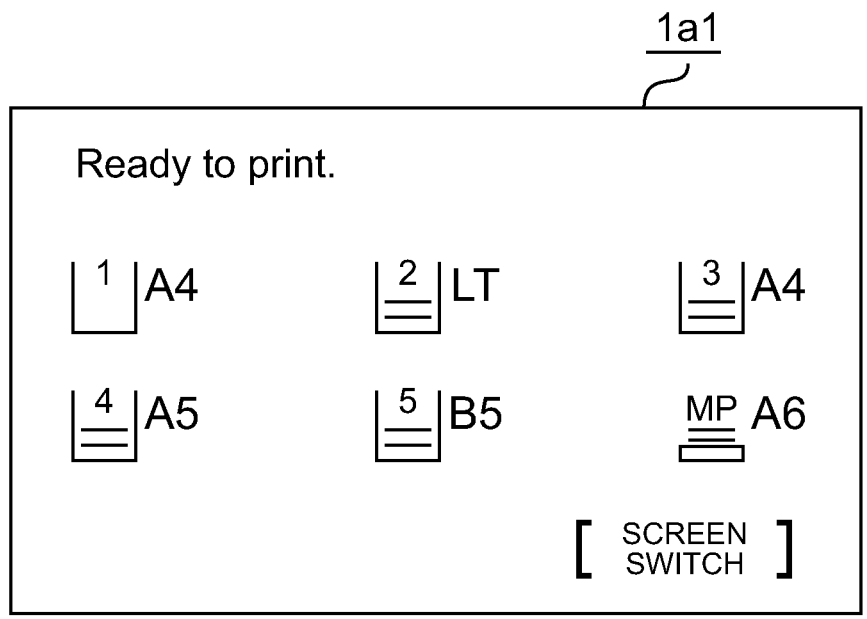
FIG. 33 is a schematic diagram indicating an instance of a ready screen displayed on a display screen in the multi function peripheral of Embodiment 3 in case that a size mismatch error has occurred in a last previous print job due to that the size of an information record medium supplied in any one of paper drawers in the multi function peripheral is not identical to the size of an information record medium that has been set on the paper drawer.

FIG. 33 is a schematic diagram indicating an instance of a ready screen displayed on the display screen 1a1 in the multi function peripheral 1 of Embodiment 3 in case that a size mismatch error has occurred in a last previous print job due to that the size of an information record medium supplied in any one of paper drawers in the multi function peripheral is not identical to the size of an information record medium that has been set on the paper drawer.

This ready screen includes (a) a message "Ready to print." indicating that the current screen is a ready screen, (b) the fourth image that indicates remaining amounts of papers in respective paper drawers, and (c) a screen-switch button to detect inputting a request, in terms of operation to this button on this ready screen, for displaying another ready screen. The another ready screen contains the first image indicating one or more remaining amounts of toner rather than the fourth image. The another ready screen is the forementioned ready screen that containing the first image, displayed in case that any errors has not taken place.

Otherwise, if in Step ST203 it is determined that the error type is "paper empty error" (ST203: ERROR4), then the controlling unit 201u reads out a template file that the value of information on whether an error has occurred in the print job is "YES" and the value of error type information is "paper empty error" from the template file storing unit 201r, combines the template file with remaining amounts of papers in respective paper drawers read out from the sheet remaining amount memory unit 201l in order to generate ready screen data, and then causes the display screen 1a1 to display the ready screen that contains a fifth image indicating the remaining amounts of papers in respective paper drawers only in the display period preset by an operator (Step ST208).

Figure 34:
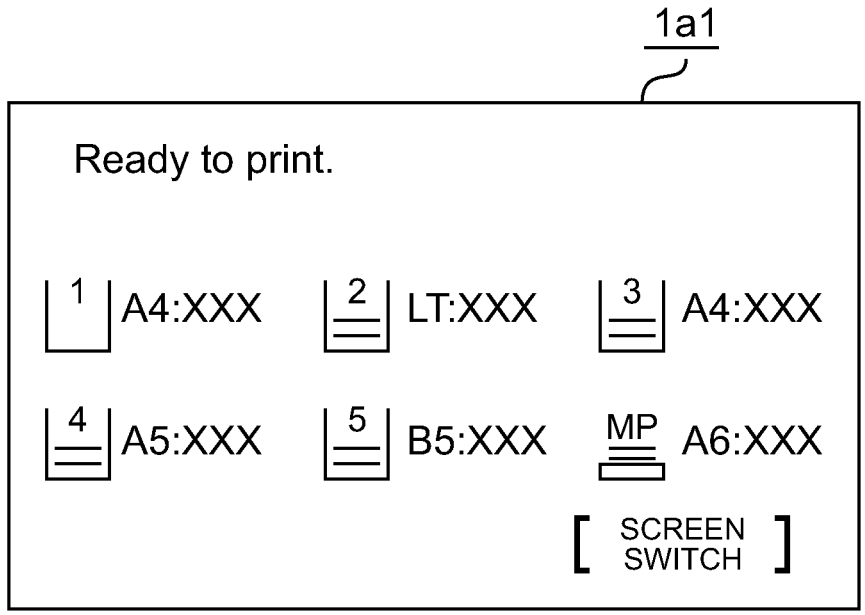
FIG. 34 is a schematic diagram indicating an instance of a ready screen displayed on a display screen in the multi function peripheral of Embodiment 3 in case that a paper empty error has occurred in a last previous print job due to that a remaining amount of paper in a paper drawer becomes zero.

FIG. 34 is a schematic diagram indicating an instance of a ready screen displayed on the display screen 1a1 in the multi function peripheral 1 of Embodiment 3 in case that a paper empty error has occurred in a last previous print job due to that a remaining amount of paper in a paper drawer becomes zero.

This ready screen includes (a) a message "Ready to print." indicating that the current screen is a ready screen, (b) the fifth image that indicates remaining amounts of papers in respective paper drawers, and (c) a screen-switch button to detect inputting a request, in terms of operation to this button on this ready screen, for displaying another ready screen. The another ready screen contains the first image indicating one or more remaining amounts of toner rather than the fifth image. The another ready screen is the forementioned ready screen that containing the first image, displayed in case that any errors has not taken place.

In Embodiment 3, an identical ready screen such as the ready screen shown in FIG. 33 may be displayed in both of the case that a paper empty error has occurred and the case that a size mismatch error has occurred.

Otherwise, if in Step ST203 it is determined that the error type is "staple empty error" (ST203: ERROR5), then the controlling unit 201u reads out a template file that the value of information on whether an error has occurred in the print job is "YES" and the value of error type information is "staple empty error" from the template file storing unit 201r, combines the template file with remaining amounts of staples in respective staple storages read out from the staple remaining amount memory unit 201p in order to generate ready screen data, and then causes the display screen 1a1 to display the ready screen that contains a sixth image indicating the remaining amounts of staples in respective staple storages only in the display period preset by an operator (Step ST209).

Figure 35:
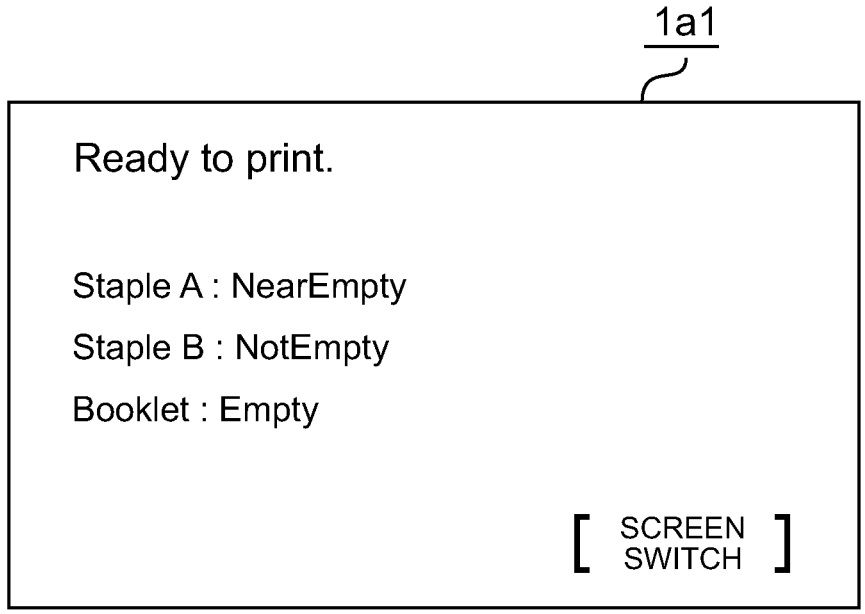
FIG. 35 is a schematic diagram indicating an instance of a ready screen displayed on a display screen in the multi function peripheral of Embodiment 3 in case that a staple empty error has occurred in a last previous print job due to that a remaining amount of staples in any of staple storages becomes zero.

FIG. 35 is a schematic diagram indicating an instance of a ready screen displayed on the display screen 1a1 in the multi function peripheral 1 of Embodiment 3 in case that a staple empty error has occurred in a last previous print job due to that a remaining amount of staples in any of staple storages becomes zero.

This ready screen includes (a) a message "Ready to print." indicating that the current screen is a ready screen, (b) the sixth image that indicates remaining amounts of staples in respective staple storages, and (c) a screen-switch button to detect inputting a request, in terms of operation to this button on this ready screen, for displaying another ready screen. The another ready screen contains the first image indicating one or more remaining amounts of toner rather than the sixth image. The another ready screen is the forementioned ready screen that containing the first image, displayed in case that any errors has not taken place.

It should be noted that the multi function peripheral 1 of Embodiment 3 may display a ready screen further containing an image that indicates statuses of some options such as booklet printing function, if it is determined that a staple empty error has occurred in the last previous print job.

Otherwise, if in Step ST203 it is determined that the error type is "jam error" (ST203: ERROR6), then the controlling unit 201u reads out a template file that the value of information on whether an error has occurred in the print job is "YES" and the value of error type information is "jam error" from the template file storing unit 201r, combines the template file with jam types and the numbers of times of jams with the respective jam types read out from the jam history data storing unit 201q in order to generate ready screen data, and then causes the display screen 1a1 to display the ready screen that contains a seventh image indicating the jam types and the numbers of times of jams with the respective jam types only in the display period preset by an operator (Step ST210).

FIG. 36 is a schematic diagram indicating an instance of a ready screen displayed on the display screen 1a1 in the multi function peripheral 1 of Embodiment 3 in case that a jam error has occurred in a last previous print job due to that a paper is clogged at any of upper region, middle region and lower region in a transportation path inside of the multi function peripheral.

This ready screen includes (a) a message "Ready to print." indicating that the current screen is a ready screen, (b) the seventh image that indicates jam types and the numbers of times of jams with the respective jam types, and (c) a screen-switch button to detect inputting a request, in terms of operation to this button on this ready screen, for displaying another ready screen. The another ready screen contains the first image indicating one or more remaining amounts of toner rather than the seventh image. The another ready screen is the forementioned ready screen that containing the first image, displayed in case that any errors has not taken place.

As mentioned above, the multi function peripheral 1 of Embodiment 3 executes a series of the processes.

In Embodiment 3, information on an errors that has occurred in the last previous print job is displayed only in the period from the end of the last previous print job to reception of a next job after an operator gets rid of the error. Alternatively, the information may be displayed immediately when the error occurs.

According to the multi function peripheral 1 of Embodiment 3, if an error occurs in execution of a print job, then a ready screen with error information is displayed and the error information indicates content of the error specified by the error type, and therefore operators can cope with not only errors due to toner but errors due to factors other than toner.

Further, according to the multi function peripheral 1 of Embodiment 3, when the same sort of issues occurs, the issues can be recognized at the same time.

Furthermore, the multi function peripheral 1 of Embodiment 3 can display necessary information only when a user who needs the information stands in front of the display panel, therefore a ready screen to be displayed can be chosen from ready screens according to whether any of errors has taken place or not.

In addition, according to the multi function peripheral 1 of Embodiment 3, information for preventing from occurrence of an issue can be indicated automatically.

Further, the multi function peripheral 1 of Embodiment 3 can notify that similar errors may occur to an operator after the operator gets rid of an error.

Embodiment 4

Figure 37:
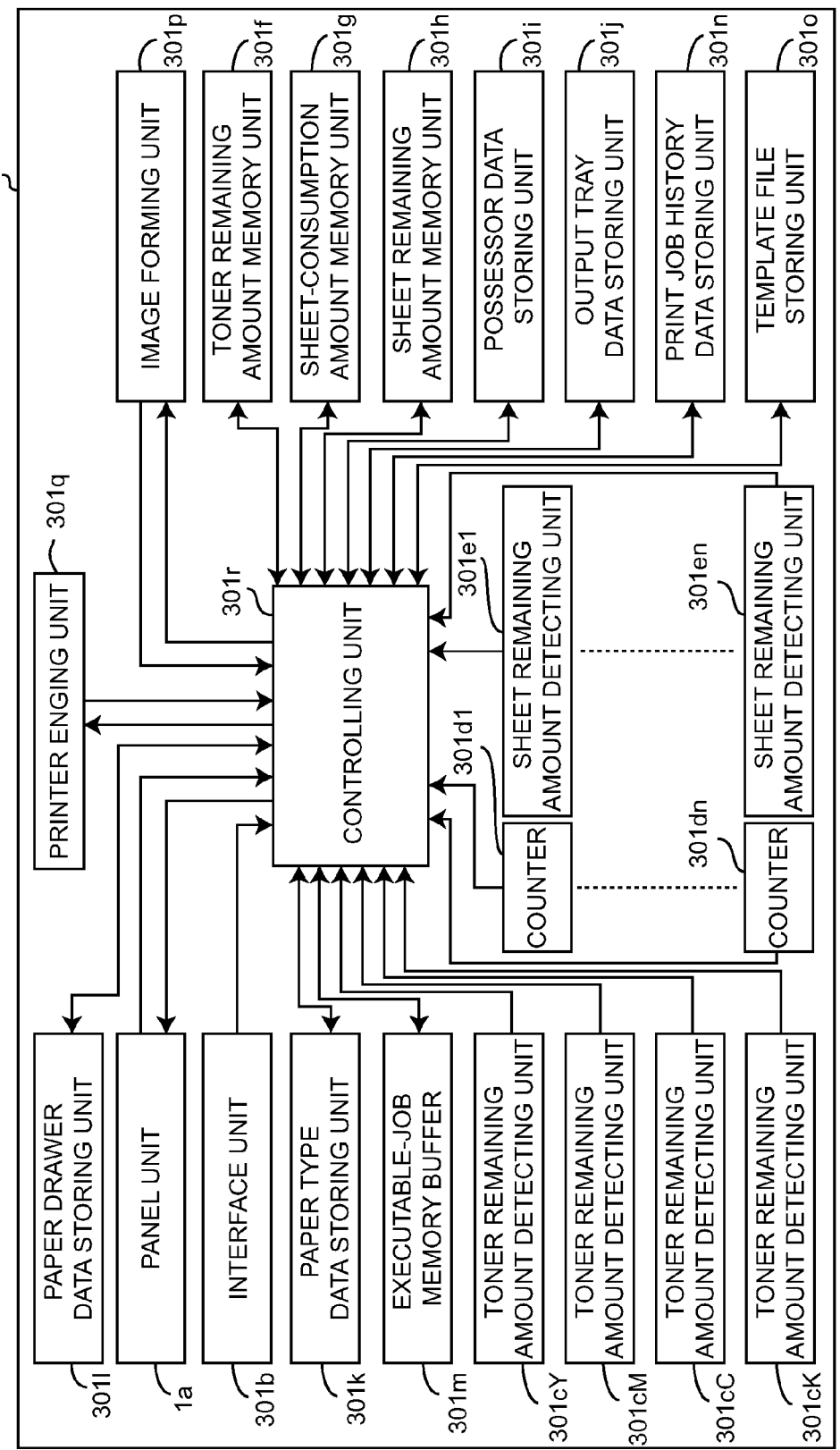
FIG. 37 is a functional block diagram indicating an instance of configuration of a multi function peripheral according to Embodiment 4.

A multi function peripheral 1 displays a ready screen having information on either one or more executable print jobs to be executed hereafter or one or more finished print jobs when a job can be accepted. FIG. 37 is a functional block diagram indicating an instance of configuration of the multi function peripheral 1 according to Embodiment 4.

The multi function peripheral 1 of Embodiment 4 is a multi function peripheral as shown in FIG. 1, that displays ready screens indicating that a job can be accepted on a display screen 1a1 in a display panel when a job can be accepted. The ready screens further indicate predetermined various sorts of information according to whether an executable print job exists or not and whether a finished print job exists or not.

As shown in FIG. 37, the multi function peripheral 1 of Embodiment 4 comprises a panel unit 1a; an interface unit 301b; toner remaining amount detecting units 301cY, 301cM, 301cC and 301cK; counters 301d1 to 301dn of respective paper drawers; sheet remaining amount detecting units 301e1 to 301en of respective paper drawers; a toner remaining amount memory unit 301f; a sheet-consumption amount memory unit 301g; a sheet remaining amount memory unit 301h; a possessor data storing unit 301i; an output tray data storing unit 301j; a paper type data storing unit 301k;

a paper drawer data storing unit 301l; an executable-job memory buffer 301m; a print job history data storing unit 301n; a template file storing unit 301o; an image forming unit 301p; a printer engine unit 301q; and a controlling unit 301r.

Further, the multi function peripheral 1 of Embodiment 4 comprises a computer that has an internal memory (not shown) in which an image forming program was written during manufacture, or is installed an image forming program via either a computer readable recording medium or a communication network.

Each of the units in the multi function peripheral 1 of Embodiment 4 may be embodied with software (i.e. program control), hardware (i.e. specific-purpose electronic circuits) or a combination of software and hardware.

The panel unit 1a has a display screen 1a1. The display screen 1a1 is an example of a display unit. The display screen 1a1 displays a menu screen, a status indication screen and a ready screen. The menu screen is displayed right after a power supply switch of the multi function peripheral 1 is turned on, in order to perform (a) switching a current active function among a facsimile function, a scanner function, a copier function and a printer function, (b) setting-up setting items of document scanning such as resolution, electronic file format of generated document data, image quality, density, and magnification, (c) setting-up each of operation modes, etc. The status indication screen is displayed upon an operator's operation on a touch panel, in order to indicate a current execution status of a job. The ready screen is displayed when a job can be accepted, in order to indicate that a job can be accepted.

The panel unit 1a of Embodiment 4 has a display-period setting operation detecting function and a display-period setting request outputting function.

The display-period setting operation detecting function is a function for detecting inputting a display period of a ready screen in terms of operator's operation to a touch panel. The display period can be set to an optional period within the period from the end of the finished print job to the beginning of a next print job in terms of the operator's operation.

The display-period setting request outputting function is a function is a function for outputting to the controlling unit 301r a pair of the display period data and a request to set the display period of each of ready screens.

The interface unit 1b receives a packet that comprises (a) a header part containing a print job ID assigned to each of print jobs and a MAC address of a terminal device in a communication network such as LAN or WAN, (b) a print data body (i.e. payload) described in a page description language or the like, via the communication network transmitted from the terminal device such as a personal computer or another multi function peripheral as the terminal device not shown here, and (c) FCS (Frame Check Sequence) for parity check, and outputs data included in the received packet to the controlling unit 301r after executing some processes such as parity check and error correction for the data of the received packet.

The toner remaining amount detecting units 301cY, 301cM, 301cC and 301cK detect remaining amounts of toner with respective colors YMCK (Yellow/Magenta/Cyan/Black), and attach toner sensor IDs assigned to the respective units 301cY, 301cM, 301cC and 301cK to respective data of the remaining amounts of toner, and output respective pairs of the remaining amount of toner and the toner sensor ID to the controlling unit 301r.

The counters 301d1 to 301dn are located with paper drawers to count the numbers of sheets printed from the respective paper drawers, and attach counter IDs assigned to the respective counters 301d1 to 301dn to respective data of the counted numbers of printed sheets, and output respective pairs of the counted number of printed sheets and the counter ID to the controlling unit 301r.

It should be noted that paper drawers may be input trays.

The sheet remaining amount detecting units 301e1 to 301en are located with paper drawers to detect remaining amounts of papers in the respective paper drawers, and attach paper sensor IDs assigned to the respective units 301e1 to 301en to the respective remaining amounts of papers, and output respective pairs of the remaining amount of papers and the paper sensor ID to the controlling unit 301r.

The toner remaining amount memory unit 301f stores the remaining amounts of toner, the toner sensor IDs and detection time as related to each other, respectively.

For the toner remaining amount memory unit 301f, one or more of storages such as cache memory, semiconductor memory and HDD (Hard Disk Drive) may be used.

The sheet-consumption amount memory unit 301g stores the numbers of printed sheets, the counter IDs and detection time as related to each other, respectively.

For the sheet-consumption amount memory unit 301g, one or more of storages such as cache memory, semiconductor memory and HDD may be used.

The sheet remaining amount memory unit 301h stores the remaining amounts of papers, the paper sensor IDs and detection time as related to each other, respectively.

For the sheet remaining amount memory unit 301h, one or more of storages such as cache memory, semiconductor memory and HDD may be used.

The possessor data storing unit 301i stores at least MAC addresses of terminal devices on a network and data (e.g. names) on persons possessing the terminal devices as related to each other.

For the possessor data storing unit 301i, one or more of storages such as cache memory, semiconductor memory and HDD may be used.

The output tray data storing unit 301j stores at least data of paper sizes and output trays to which the respective paper sizes assigned as related to each other.

For the output tray data storing unit 301*j*, one or more of storages such as cache memory, semiconductor memory and HDD may be used.

The paper type data storing unit 301*k* stores at least data of paper drawers and paper types assigned to the respective paper drawers from the terminal device, as related to each other. Relationship between one of the paper drawers and one of the paper types has been set in terms of user operation.

For the paper type data storing unit 301*k*, one or more of storages such as cache memory, semiconductor memory and HDD may be used.

The paper drawer data storing unit 301*l* stores counter IDs of the counters 301*d*1 to 301*dn* and paper sizes as related to each other. Relationship between one of the counter IDs and one of the paper sizes has been set in terms of user operation.

For the paper drawer data storing unit 301*l*, one or more of storages such as cache memory, semiconductor memory and HDD may be used.

The executable-job memory buffer 301*m* is readable and writable, and stores a set of bitmap data, a MAC address data in relation to the bitmap data, a file name, a print job ID, a paper size and a file size for each of executable print jobs to be executed hereafter. The sets of data for respective print jobs are sorted in the execution order of the print jobs.

The print job history data storing unit 301*n* is readable and writable, and stores a print job ID, a MAC address, a file name, a paper size, a file size, execution beginning time, execution ending time, as related to each other.

For the print job history data storing unit 301*n*, one or more of storages such as cache memory, semiconductor memory and HDD may be used.

The template file storing unit 301*o* stores template files of the menu screen, the status indication screen and the ready screens. Executable job existence information indicating whether an executable print job to be executed hereafter exists or not, finished-job existence information indicating whether a finished print job exists or not, a display period set in term of user operation, one or more items to be displayed, display format, information on layout of the one or more items are defined in the template file.

For the template file storing unit 301*o*, one or more of storages such as cache memory, semiconductor memory and HDD may be used.

The image forming unit 301*p* has a bitmap data generating function and a bitmap data outputting function.

The bitmap data generating function is a function for receiving print data described in a page description language from the controlling unit 301*r* and converting the received print data to bitmap data.

The bitmap data outputting function is a function for sending the bitmap data generated in terms of the bitmap data generating function as a response to the controlling unit 301*r*.

The printer engine unit 301*q* has an image forming function, a job list generating function, a print-job-start notice outputting function and a print-job-end notice outputting function.

The image forming function is a function for generating an image with electrophotographic process based on the bitmap data received from the controlling unit 301*r* and forming the image on a surface of a paper as an information record medium.

The job list generating function is a function for receiving bitmap data, generating a job list of executable jobs to be executed, with sorting the executable jobs to be executed based on a job priority level included in the data received from the controlling unit 301*r* if an interrupting job takes place, and for outputting the generated job list to the controlling unit 301*r*.

The print-job-start notice outputting function is a function for outputting a print-job-start notice to the controlling unit 301*r* at the beginning of a job. The print-job-start notice indicates that execution of the job started.

The print-job-end notice outputting function is a function for outputting a print-job-end notice to the controlling unit 301*r* at the end of a job. The print-job-end notice indicates that execution of the job ended.

The controlling unit 301*r* has functions mentions below and controls the panel unit 1*a*, the interface unit 301*b*, the toner remaining amount detecting units 301*c*Y, 301*c*M, 301*c*C and 301*c*K, the counters 301*d*1 to 301*dn*, the sheet remaining amount detecting units 301*e*1 to 301*en*, the toner remaining amount memory unit 301*f*, the sheet-consumption amount memory unit 301*g*, the sheet remaining amount memory unit 301*h*, the possessor data storing unit 301*i*, the output tray data storing unit 301*j*, the paper type data storing unit 301*k*, the paper drawer data storing unit 301*l*, the executable-job memory buffer 301*m*, the print job history data storing unit 301*n*, the template file storing unit 301*o*, the image forming unit 301*p*, and the printer engine unit 301*q*, in order to execute an executable-print-job existence determining process mentioned below and a display control process to cause the display screen 1*a*1 to display ready screens mentioned below in the multi function peripheral 1 of this embodiment.

A display-period setting request determining function of the controlling unit 301*r* is a function for determining whether a display-period setting request for setting-up a display period of a ready screen has been received from an operator or not according to whether a pair of the display period data and the display-period setting request has been received from the panel unit 1*a*.

A display-period setting-up function of the controlling unit 301*r* is a function for setting-up the display period of a template file of a ready screen stored in the template file storing unit 301*o* if in terms of the display-period setting request determining function it is determined that the display-period setting request has been received.

A packet data transferring function of the controlling unit 301*r* is a function for outputting to the image forming unit 301*p* data included in a packet received from the interface unit 301*b*.

A bitmap data transferring function of the controlling unit 301*r* is a function for outputting to the printer engine unit 301*q* bitmap data received from the image forming unit 301*p*.

A data copy function of the controlling unit 301*r* is a function for receiving a print job list from the printer engine unit 301*q*, and generating a copy of a MAC address, a file name, a print job ID, a paper size and a file size in the print job list.

An initial data writing function of the controlling unit 301*r* is a function for writing the copy generated in terms of the data copy function into the print job history storing unit 301*n*. The copy contains a MAC address, a file name, a print job ID, a paper size and a file size.

An executable job data writing function of the controlling unit 301*r* is a function for writing a pair of received bitmap data and the data used in the data copy function into the executable-job memory buffer 301*m*. The data used in the data copy function contains a MAC address, a file name, a print job ID, a paper size and a file size.

A timer function of the controlling unit 301*r* is a function for measuring time continuously.

A toner amount writing function of the controlling unit $301r$ is a function for receiving pairs of the remaining amounts of toner with respective colors YMCK and the respective toner sensor IDs output from the toner remaining amount detecting units $301cY$, $301cM$, $301cC$ and $301cK$, and for writing a set of the remaining amount of toner, the toner sensor ID and detection time data on each of the colors in the toner remaining amount memory unit $301f$ with regarding the time when the pairs are received as the detection time and attaching the detection time data to each of the received pairs.

A number-of-printed-sheet writing function of the controlling unit $301r$ is a function for receiving pairs of the respective counted numbers of printed sheets and the respective counter IDs from the counters $301d1$ to $301dn$, and for writing a set of the counted number of printed sheets, the counter ID and detection time data on each of the paper drawers in the sheet-consumption amount memory unit $301g$ with regarding the time when the pairs are received as the detection time and attaching the detection time data to each of the received pairs.

A paper remaining amount writing function of the controlling unit $301r$ is a function for receiving pairs of the remaining amounts of papers in the respective paper drawers and the respective paper sensor IDs from the sheet remaining amount detecting unit $301e1$ to $301en$, and for writing a set of the remaining amount of papers, the paper sensor ID and detection time on each of the paper drawers in the sheet remaining amount memory unit $301h$ with regarding the time when the pairs are received as the detection time and attaching the detection time data to each of the received pairs.

A first print job history updating function of the controlling unit $301r$ is a function for updating print job execution beginning time in print job history data stored in the print job history data storing unit $301n$ upon receiving a print-job-start notice from the printer engine unit $301q$.

A second print job history updating function of the controlling unit $301r$ is a function for updating print job history data in the print job history data storing unit $301n$ by changing the value of job progress information to a value (e.g. "finished") indicating that a job ends upon receiving a print-job-end notice from the printer engine unit $301q$.

A job receipt permission determining function of the controlling unit $301r$ is a function for determining whether a print job can be accepted according to whether the total amount of executable print jobs is less than the capacity of the executable-job memory buffer $301m$, with reference to data of the executable print jobs in the executable-job memory buffer $301m$.

An executable-job existence determining function of the controlling unit $301r$ is a function for determining whether a next executable print job exists or not with reference to the data in the executable-job memory buffer $301m$, if in terms of the job receipt permission determining function it is determined that a print job can be accepted.

A job-execution-instruction outputting function of the controlling unit $301r$ is a function for outputting an execution instruction to execute a next executable print job in the executable-job memory buffer $301m$, if in terms of the job receipt permission determining function it is determined that any print jobs can not be accepted.

An executable-job related-data reading-out function of the controlling unit $301r$ is a function for reading out a MAC address and a file name of the next executable print job from the executable job memory buffer $301m$, if in terms of the executable-job existence determining feature it is determined that the next executable print job exists.

A first possessor-name reading-out function of the controlling unit $301r$ is a function for reading out a person's name from the possessor data storing unit $301i$. The person possesses the terminal device with the MAC address read out from the executable-job memory buffer $301m$ in terms of the executable-job related-data reading-out function.

A first ready-screen display control function of the controlling unit $301r$ is a function for (a) reading out a template file of a ready screen that the value of information on whether or not an executable print job to be executed hereafter exists is "YES" from the template file storing unit $301o$, (b) reading out a file name of the executable print job from the print job history data storing unit $301n$ and a possessor's name in relation to the executable print job from the possessor data storing unit $301i$, (c) combining the template file with the file name and the possessor's name in order to generate ready screen data, and (d) causing the display screen $1a1$ to display the ready screen indicating the file name and the possessor's name only in the display period.

A finished-print-job existence determining function of the controlling unit $301r$ is a function for determining whether a print job finished in the past exists in the print job history data storing unit $301n$ with reference to execution-end time of finished print jobs in the print job history data storing unit $301n$, if in terms of the executable-job existence determining function it is determined that any executable print jobs do not exist.

A finished-job-related-data reading-out function of the controlling unit $301r$ is a function for reading out a MAC address and a paper size of a finished print job from the print job history data storing unit $301n$, if in terms of the finished-print-job existence determining function it is determined that a print job finished in the past exists.

A second possessor-name reading-out function of the controlling unit $301r$ is a function for reading out a person's name from the possessor data storing unit $301i$. The person possesses the terminal device with the MAC address read out from the print job history data storing unit $301n$.

An output tray data reading-out function of the controlling unit $301r$ is a function for reading out data of an output tray from the output tray data storing unit $301j$. The output tray is in relation to a paper size read out from the print job history data storing unit $301n$ in terms of the finished-job-related-data reading-out function.

A second ready-screen display control function of the controlling unit $301r$ is a function for (a) reading out a template file of a ready screen that the value of information on whether or not an executable print job to be executed hereafter exists is "YES" from the template file storing unit $301o$, (b) reading out a possessor's name from the possessor data storing unit $301i$ and a paper size from the print job history data storing unit $301n$, (c) combining the template file with data of the possessor's name and an output tray in relation to the paper size in order to generate ready screen data, and (d) causing the display screen $1a1$ to display the ready screen indicating the possessor's name and the output tray only in the display period.

In Embodiment 4, a combination of the first and the second ready-screen display control functions is an example of the display controlling function.

A default screen determining function of the controlling unit $301r$ is a function for determining a ready screen with reference to default screen assignment information in the template file storing unit $301o$, if in terms of the finished-print-job existence determining function it is determined that any print jobs finished in the past do not exist. The default screen assignment information indicates whether the screen is assigned to the default screen.

A third ready-screen display control function of the controlling unit 301r is a function for (a) reading out a template file of a ready screen for indicating one or more remaining amounts of toner from the template file storing unit 301o, (b) reading out one or more remaining amounts of toner from the toner remaining amount memory unit 301f, (c) combining the template file with the one or more remaining amounts of toner in order to generate ready screen data, and (d) causing the display screen 1a1 to display the ready screen having information on the remaining amounts of toner only in the display period, if in terms of the default screen determining function it is determined that the ready screen having information on one or remaining amounts of toner is assigned to the default screen. The template file is a template file that the value of information on whether or not an executable print job to be executed hereafter exists is "NO", the value of information on whether or not a finished print job exists is "NO" and the value of default screen assignment information is "YES".

A fourth ready-screen display control function of the controlling unit 301r is a function for (a) reading out a template file of a ready screen for indicating paper sizes and the numbers of printed sheets on respective paper drawers from the template file storing unit 301o, (b) reading out the numbers of printed sheets with the respective counter IDs (i.e. on respective paper drawers) from the sheet-consumption amount memory unit 301g, and paper sizes set to the respective paper drawers from the paper size memory unit 301l, (c) combining the template file with the numbers of printed sheets and the paper sizes on the respective paper drawers in order to generate ready screen data, and (d) causing the display screen 1a1 to display the ready screen indicating the paper sizes and the numbers of printed sheets on respective paper drawers only in the display period, if in terms of the default screen determining function it is determined that the ready screen indicating paper sizes and the numbers of printed sheets on respective paper drawers is assigned to the default screen. The template file is a template file that the value of information on whether or not an executable print job to be executed hereafter exists is "NO", the value of information on whether or not a finished print job exists is "NO" and the value of default screen assignment information is "YES".

A fifth ready-screen display control function of the controlling unit 301r is a function for (a) reading out a template file of a ready screen for indicating paper sizes and remaining amounts of papers on respective paper drawers from the template file storing unit 301o, (b) reading out remaining amounts of papers in respective paper drawers from the sheet remaining amount memory unit 301h, and paper sizes set to the respective paper drawers from the paper size memory unit 301l, (c) combining the template file with the remaining amounts of papers and the paper sizes on the respective paper drawers in order to generate ready screen data, and (d) causing the display screen 1a1 to display the ready screen indicating the paper sizes and the remaining amounts of papers on respective paper drawers only in the display period, if in terms of the default screen determining function it is determined that the ready screen indicating paper sizes and remaining amounts of papers on respective paper drawers is assigned to the default screen. The template file is a template file that the value of information on whether or not an executable print job to be executed hereafter exists is "NO", the value of information on whether or not a finished print job exists is "NO" and the value of default screen assignment information is "YES".

A sixth ready-screen display control function of the controlling unit 301r is a function for (a) reading out a template file of a ready screen for indicating paper sizes, paper types and remaining amounts of papers on respective paper drawers from the template file storing unit 301o, (b) reading out remaining amounts of papers in respective paper drawers from the sheet remaining amount memory unit 301h, paper sizes set to the respective paper drawers from the paper size memory unit 301l, and paper types set to the respective paper drawers from the paper type data storing unit 301k, (c) combining the template file with the remaining amounts of papers, the paper sizes and the paper types on the respective paper drawers in order to generate ready screen data, and (d) causing the display screen 1a1 to display the ready screen indicating the paper sizes, the paper types and the remaining amounts of papers on respective paper drawers only in the display period, if in terms of the default screen determining function it is determined that the ready screen indicating paper sizes, paper types and remaining amounts of papers on respective paper drawers is assigned to the default screen. The template file is a template file that the value of information on whether or not an executable print job to be executed hereafter exists is "NO", the value of information on whether or not a finished print job exists is "NO" and the value of default screen assignment information is "YES".

The controlling unit 301r of Embodiment 4 may further have (a) a function for referring to history data of finished print jobs in the print job history data storing unit 301n after referring to a print job list of executable print jobs to be executed hereafter in terms of the executable-job existence determining function, (b) a function for determining whether both of the executable print job and the finished print job exist according to the results of referring, and (c) a function for causing the display screen 1a1 to display a ready screen indicating information on the finished job, if both of the excecutable print job and the finished print job exist, as the result of determining. Specifically, this information contains the name of the person who possesses the terminal device sending a request of the finished print job, and data of the output tray to which printed documents have been output in the finished print job.

It should be noted that the toner remaining amount memory unit 301f, the sheet-consumption amount memory unit 301g, the sheet remaining amount memory unit 301h, the possessor data storing unit 301i, the output tray data storing unit 301j, the paper type data storing unit 301k, the paper drawer data storing unit 301l, the executable-job memory buffer 301m (an example of the print job list storing unit), the print job history data storing unit 301n and the template file storing unit 301o may be comprised by one component or area such as an internal cache of the controlling unit 1o, an internal buffer of the multi function peripheral 1, a semiconductor flash memory, or a data storage device located in the multi function peripheral 1 or connected via a computer network to the multi function peripheral 1, where they are equipped as different components in the multi function peripheral 1 of Embodiment 4.

Hereinafter, processes executed by the multi function peripheral 1 of Embodiment 4 with the forementioned configuration will be explained with reference to drawings.

Figure 38:
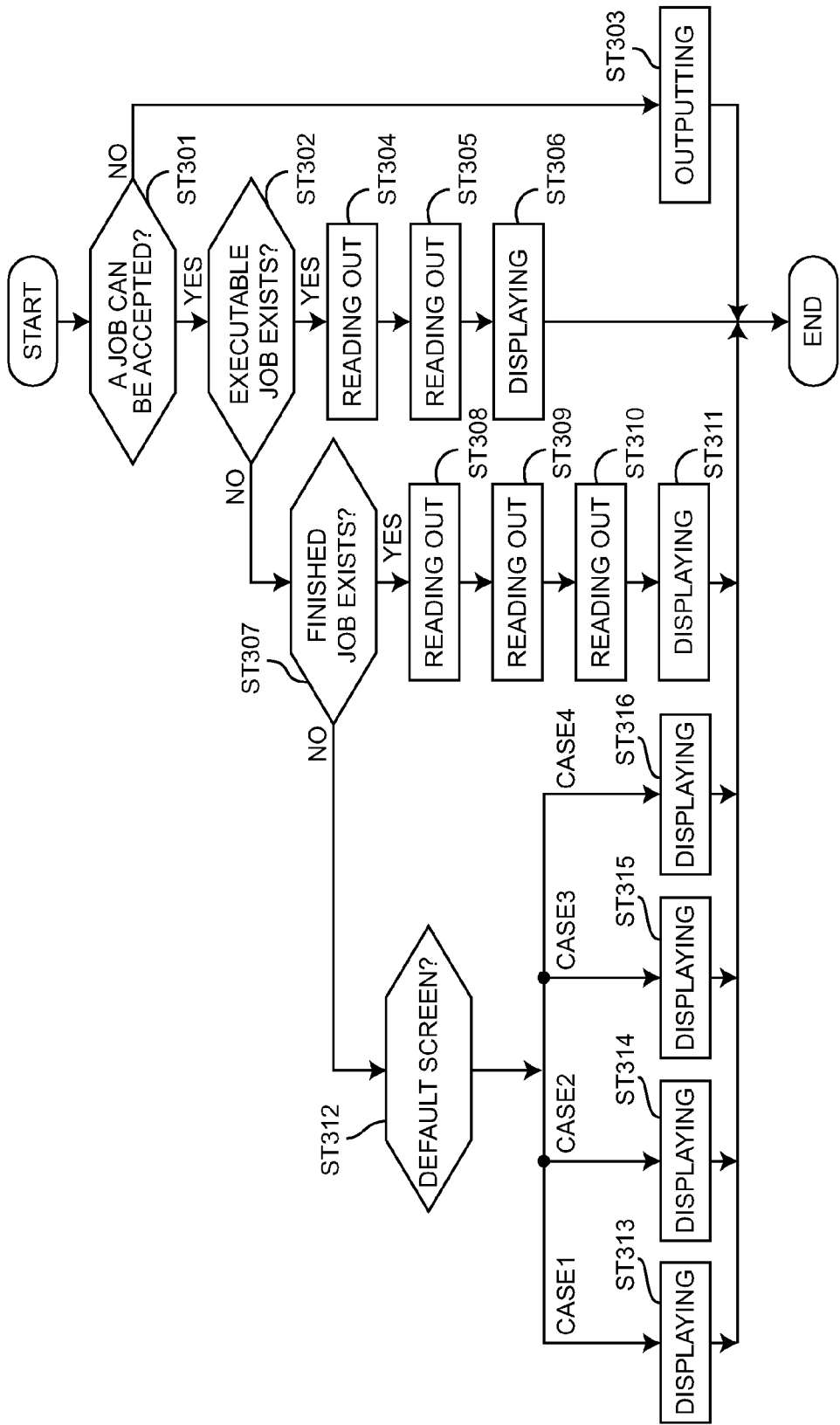
FIG. 38 is a flowchart for explaining a process executed by the multi function peripheral of Embodiment 4.

FIG. 38 is a flowchart for explaining a process executed by the multi function peripheral 1 of Embodiment 4.

In the multi function peripheral 1 of Embodiment 4, when process of a print job is started, execution of an image forming program installed in a computer of the multi function peripheral 1 is started to perform processes described below.

Firstly, the controlling unit 301r determines whether a print job can be accepted or not according to whether total amount of data of executable print jobs to be executed hereafter in the print job list stored in the executable-job memory buffer 301m is less than the memory area size of the executable job memory buffer 301m (Step ST301).

Alternatively, in Embodiment 4, the controlling unit 301r may determine whether a print job can be accepted or not according to whether or not the number of executable print jobs to be executed hereafter in the print job list is less than a predetermined threshold.

If in Step ST301 it is determined that a print job can be accepted (ST301: "YES"), then the controlling unit 301r determines whether a next print job to be executed exists or not with reference to the executable job memory buffer 301m (Step ST302).

Otherwise, if in Step ST301 it is determined that any print jobs can not be accepted (ST301: "NO"), then the controlling unit 301r outputs an execution instruction of a next print job in the executable-job memory buffer 301m to the image forming unit 301p in order to generate a vacant area in the executable-job memory buffer 301m, and then ends the process (Step ST303).

If in Step ST302 it is determined that the next print job to be executed exists (ST302: "YES"), then the controlling unit 301r reads out a MAC address and a file name of the next print job from the executable-job memory buffer 301m (Step ST304).

After reading out the MAC address, the controlling unit 301r reads out the name of a person possessing a terminal device with the MAC address from the possessor data storing unit 301i (Step ST305).

The controlling unit 301r reads out a template file of a ready screen that the value of information on whether or not an executable print job to be executed hereafter exists is "YES" from the template file storing unit 301o, combines the template file with the file name read out from the print job history data storing unit 301n and the possessor's name read out from the possessor data storing unit 301i in order to generate ready screen data, and causes the display screen 1a1 to display the ready screen indicating the file name and the possessor's name only in the display period (Step ST306).

FIG. 39 is a schematic diagram indicating an instance of a ready screen displayed on the display screen 1a1 in the multi function peripheral 1 of Embodiment 4 in case that an executable print job to be executed exists.

This ready screen includes (a) a message "Ready to print." indicating that the current screen is a ready screen, (b) a message "WAITING PRINT JOB" indicating that an executable print job to be executed hereafter (i.e. a waiting print job) exists, (c) an image that indicates information (i.e. the possessor's names and the file names) related to executable print jobs in the order of execution of the print jobs, and (d) a screen-switch button to detect inputting a request, in terms of operation to this button on this ready screen, for displaying another ready screen. The another ready screen contains an image indicating one or more remaining amounts of toner rather than the image that indicates the related information.

It should be noted that a ready screen displayed in the display screen 1a1 when an executable print job to be executed hereafter exists is not limited to this ready screen.

For instance, in Embodiment 4, the controlling unit 301r may refer to history data of finished print jobs in the print job history data storing unit 301n after referring to a print job list of executable print jobs to be executed hereafter in the executable-job memory buffer 301m, and may cause the display screen 1a1 to display a ready screen indicating information related to the finished job, such as a ready screen shown in FIG. 40 mentioned below.

In this instance, alternatively, the controlling unit 301r may refer to history data of finished print jobs in the print job history data storing unit 301n before referring to a print job list of executable print jobs to be executed hereafter in the executable-job memory buffer 301m. Further, alternatively, the controlling unit 301r may perform the process of referring to history data of finished print jobs in the print job history data storing unit 301n and the process of referring to a print job list of executable print jobs to be executed hereafter in the executable job memory buffer 301m in parallel.

Otherwise, if in Step ST302 it is determined that the next print job to be executed does not exist (ST302: "NO"), then the controlling unit 301r determines whether a print job finished in the past exists or not with reference to execution-end time of a finished print job in the print job history data storing unit 301n (Step ST307).

If in Step ST307 it is determined that a print job finished in the past exists in the print job history data storing unit 301n (ST307: "YES"), then the controlling unit 301r reads out a MAC address and a paper size on the finished print job from the print job history data storing unit 301n (Step ST308).

Further, the controlling unit 301r reads out a possessor's name of a terminal device with the MAC address from the possessor data storing unit 301i (Step ST309).

Furthermore, the controlling unit 301r reads out data of an output tray in relation to the paper size read out the from the print job history data storing unit 301n (Step ST310).

In Embodiment 4, as mentioned above, the data of the output tray is read out after the possessor's name is read out. Alternatively, the controlling unit 301r may read out the data of the output tray before reading out the possessor's name. Further, alternatively, the controlling unit 301r may perform the process of reading out the data of the output tray and the process of reading out the possessor's name in parallel.

After Step ST310, the controlling unit 301r reads out a template file of a ready screen that the value of information on whether or not an executable print job to be executed hereafter exists is "YES" from the template file storing unit 301o, combines the template file with data of the possessor's name and the output tray in order to generate ready screen data, and causes the display screen 1a1 to display the ready screen indicating the possessor's name and the output tray to which printed documents are output, only in the display period (Step ST311). The display period has been set as a period within the period from the end of the finished print job to the beginning of the next executable print job.

In Embodiment 4, as mentioned above, the template file is read out after the possessor's name and data of the output tray are read out. Alternatively, the controlling unit 301r may read out the template file before reading out the data of the output tray and the possessor's name. Further, alternatively, the controlling unit 301r may perform the process of reading out the template file and the process of reading out the possessor's name and the data of the output tray in parallel.

FIG. 40 is a schematic diagram indicating an instance of a ready screen displayed on the display screen 1a1 in the multi function peripheral 1 of Embodiment 4 in case that any executable print jobs to be executed do not exist and a finished print job exists.

This ready screen includes (a) a message "Ready to print." indicating that the current screen is a ready screen, (b) a message "FINISHED PRINT JOB" indicating that a finished print job exists, (c) an image that indicates information (i.e. the possessor's names and the output trays) related to finished print jobs in the order of execution of the print jobs, and (d) a screen-switch button to detect inputting a request, in terms of operation to this button on this ready screen, for displaying another ready screen. The another ready screen contains an image indicating one or more remaining amounts of toner rather than the image that indicates the related information.

Otherwise, if in Step ST307 it is determined that a print job finished in the past does not exist in the print job history data storing unit 301n (ST307: "NO"), then the controlling unit 301r determines a ready screen that the value of the default screen assignment information is "YES" with reference to the default screen assignment information in the template file storing unit 301o (Step ST312).

If in Step ST312 it is determined that the default screen is a ready screen having information on one or more remaining amounts of toner (ST312: "CASE1"), then the controlling unit 301r reads out a template file of a ready screen for indicating one or more remaining amounts of toner from the template file storing unit 301o, reads out one or more remaining amounts of toner from the toner remaining amount memory unit 301f, combines the template file with the one or more remaining amounts of toner in order to generate ready screen data, and causes the display screen 1a1 to display the ready screen having information on the remaining amounts of toner only in the display period (Step ST313). The display period has been set as a period within the period from the end of the finished print job to the beginning of the next executable print job. The template file is a template file that the value of information on whether or not an executable print job to be executed hereafter exists is "NO", the value of information on whether or not a finished print job exists is "NO" and the value of default screen assignment information is "YES".

Figures 41, 42:
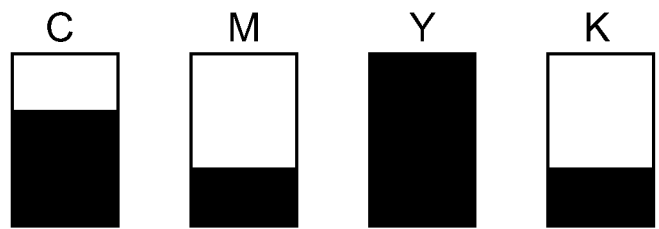
FIG. 41 is a schematic diagram indicating an instance of a ready screen displayed on a display screen in the multi function peripheral of Embodiment 4 in case that any of an executable print job to be executed and a finished print job does not exist.
FIG. 42 is a schematic diagram indicating another instance of a ready screen displayed on a display screen in the multi function peripheral of Embodiment 4 in case that any of an executable print job to be executed and a finished print job does not exist.

FIG. 41 is a schematic diagram indicating an instance of a ready screen displayed on the display screen 1a1 in the multi function peripheral 1 of Embodiment 4 in case that any of an executable print job to be executed and a finished print job does not exist.

This ready screen includes (a) a message "Ready to print." indicating that the current screen is a ready screen, (b) an image that indicates remaining amounts of toner with respective colors of YMCK in the multi function peripheral 1, and (c) a screen-switch button to detect inputting a request, in terms of operation to this button on this ready screen, for displaying another ready screen. The another ready screen contains an image indicating information other than the remaining amounts of toner, such as remaining amounts of papers in respective paper drawers, the numbers of papers printed from respective paper drawers, paper sizes of respective paper drawers, or paper types of respective paper drawers.

If in Step ST312 it is determined that the default screen is a ready screen indicating paper sizes of respective paper drawers and the numbers of sheets printed from respective paper drawers (ST312: "CASE2"), then the controlling unit 301r reads out a template file of a ready screen for indicating paper sizes and the numbers of printed sheets on respective paper drawers from the template file storing unit 301o, reads out the numbers of printed sheets with the respective counter IDs (i.e. respective paper drawers) from the sheet-consumption amount memory unit 301g, and paper sizes set to the respective paper drawers from the paper size memory unit 301l, combines the template file with the numbers of printed sheets and the paper sizes on the respective paper drawers in order to generate ready screen data, and causes the display screen 1a1 to display the ready screen indicating the paper sizes and the numbers of printed sheets on respective paper drawers only in the display period (Step ST314). The display period has been set as a period within the period from the end of the finished print job to the beginning of the next executable print job. The template file is a template file that the value of information on whether or not an executable print job to be executed hereafter exists is "NO", the value of information on whether or not a finished print job exists is "NO" and the value of default screen assignment information is "YES".

In Embodiment 4, as mentioned above, the numbers of printed sheets are read out after the template file is read out, and then the counter IDs and the paper sizes are read out. Alternatively, the controlling unit 301r may perform the process of reading out the template file, the process of reading out the numbers of printed sheets, and the process of reading out the counter IDs and the paper sizes, along another order.

Alternatively, the controlling unit 301r may perform the process of reading out the template file, the process of reading out the numbers of printed sheets, and the process of reading out the counter IDs and the paper sizes, in parallel.

FIG. 42 is a schematic diagram indicating another instance of a ready screen displayed on the display screen 1a1 in the multi function peripheral 1 of Embodiment 4 in case that any of an executable print job to be executed and a finished print job does not exist.

This ready screen includes (a) a message "Ready to print." indicating that the current screen is a ready screen, (b) an image that indicates the paper sizes and the numbers of printed sheets on respective paper drawers in the multi function peripheral 1, and (c) a screen-switch button to detect inputting a request, in terms of operation to this button on this ready screen, for displaying another ready screen. The another ready screen contains an image indicating information other than the numbers of printed sheets, such as remaining amounts of toner with respective colors of YMCK, remaining amounts of papers in respective paper drawers, or paper types of respective paper drawers with/without the paper sizes.

It should be noted that the multi function peripheral 1 of Embodiment 4 may cause the display screen 1a1 to display a ready screen further indicating paper types of respective paper drawers.

If in Step ST312 it is determined that the default screen is a ready screen indicating paper sizes of respective paper drawers and remaining amounts of papers in respective paper drawers (ST312: "CASE3"), then the controlling unit 301r reads out a template file of a ready screen for indicating paper sizes and remaining amounts of papers on respective paper drawers from the template file storing unit 301o, reads out remaining amounts of papers in respective paper drawers from the sheet remaining amount memory unit 301h, and paper sizes set to the respective paper drawers from the paper size memory unit 301l, combines the template file with the remaining amounts of papers and the paper sizes on the respective paper drawers in order to generate ready screen data, and causes the display screen 1a1 to display the ready screen indicating the paper sizes and the remaining amounts of papers on respective paper drawers only in the display period (Step ST315). The display period has been set as a period within the period from the end of the finished print job to the beginning of the next executable print job. The template file is a template file that the value of information on whether or not an executable print job to be executed hereafter exists is "NO", the value of information on whether or not a finished print job exists is "NO" and the value of default screen assignment information is "YES".

In Embodiment 4, as mentioned above, the remaining amounts of papers are read out after the template file is read out, and then the counter IDs and the paper sizes are read out. Alternatively, the controlling unit 301r may perform the process of reading out the template file, the process of reading out the remaining amounts of papers, and the process of reading out the counter IDs and the paper sizes, along another order.

Alternatively, the controlling unit 301*r* may perform the process of reading out the template file, the process of reading out the remaining amounts of papers, and the process of reading out the counter IDs and the paper sizes, in parallel.

Figure 43:
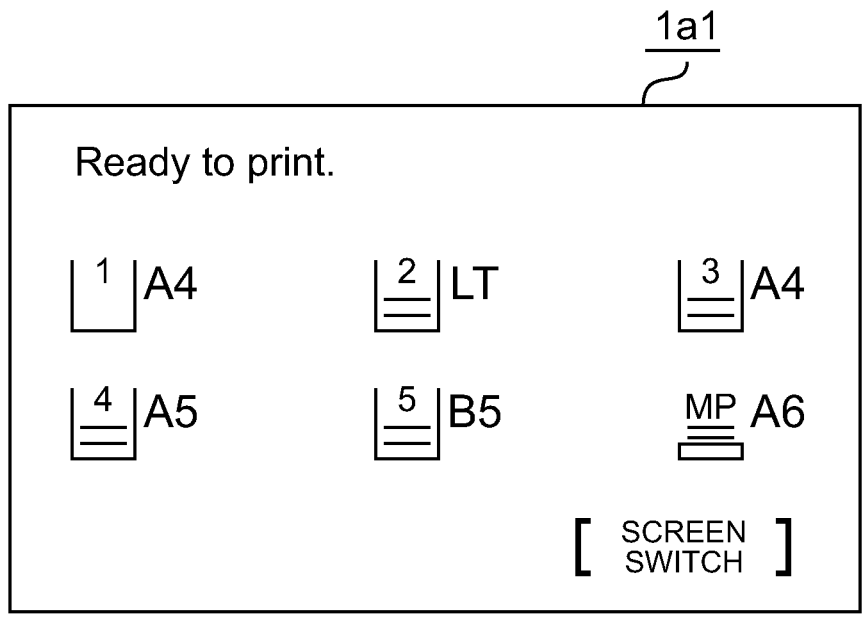
FIG. 43 is a schematic diagram indicating another instance of a ready screen displayed on a display screen in the multi function peripheral of Embodiment 4 in case that any of an executable print job to be executed and a finished print job does not exist.

FIG. 43 is a schematic diagram indicating another instance of a ready screen displayed on the display screen 1*a*1 in the multi function peripheral 1 of Embodiment 4 in case that any of an executable print job to be executed and a finished print job does not exist.

This ready screen includes (a) a message "Ready to print." indicating that the current screen is a ready screen, (b) an image that indicates the paper sizes and the remaining amounts of papers on respective paper drawers in the multi function peripheral 1, and (c) a screen-switch button to detect inputting a request, in terms of operation to this button on this ready screen, for displaying another ready screen. The another ready screen contains an image indicating information other than the remaining amounts of papers, such as remaining amounts of toner with respective colors of YMCK, the numbers of sheets printed from respective paper drawers, or paper types of respective paper drawers with/without the paper sizes.

It should be noted that the remaining amounts of papers may further be indicated with seven-segment indication in this ready screen.

If in Step ST312 it is determined that the default screen is a ready screen indicating paper sizes and paper types of respective paper drawers and remaining amounts of papers in respective paper drawers (ST312: "CASE4"), then the controlling unit 301*r* reads out a template file of a ready screen for indicating paper sizes, paper types and remaining amounts of papers on respective paper drawers from the template file storing unit 301*o*, reads out remaining amounts of papers in respective paper drawers from the sheet remaining amount memory unit 301*h*, paper sizes set to the respective paper drawers from the paper size memory unit 301*l*, and paper types set to the respective paper drawers from the paper type data storing unit 301*k*, combines the template file with the remaining amounts of papers, the paper sizes and the paper types on the respective paper drawers in order to generate ready screen data, and causes the display screen 1*a*1 to display the ready screen indicating the paper sizes, the paper types and the remaining amounts of papers on respective paper drawers only in the display period (Step ST316). The display period has been set as a period within the period from the end of the finished print job to the beginning of the next executable print job. The template file is a template file that the value of information on whether or not an executable print job to be executed hereafter exists is "NO", the value of information on whether or not a finished print job exists is "NO" and the value of default screen assignment information is "YES".

In Embodiment 4, as mentioned above, the remaining amounts of papers are read out after the template file is read out, and the counter IDs and the paper sizes are read out, and then the paper types are read out. Alternatively, the controlling unit 301*r* may perform the process of reading out the template file, the process of reading out the remaining amounts of papers, the process of reading out the counter IDs and the paper sizes, and the process of reading out the paper types, along another order.

Alternatively, the controlling unit 301*r* may perform the process of reading out the template file, the process of reading out the remaining amounts of papers, the process of reading out the counter IDs and the paper sizes, and the process of reading out the paper types, in parallel.

Figure 44:
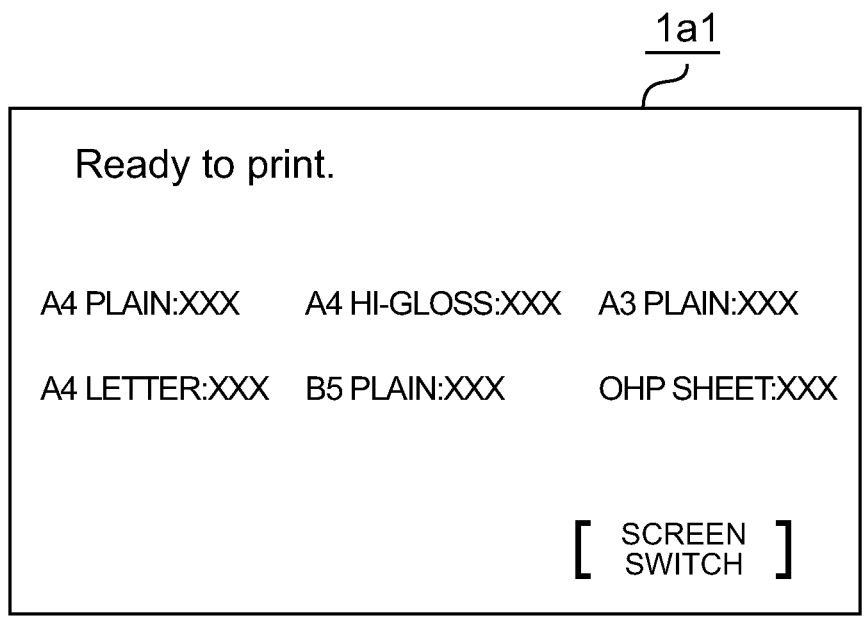
FIG. 44 is a schematic diagram indicating another instance of a ready screen displayed on a display screen in the multi function peripheral of Embodiment 4 in case that any of an executable print job to be executed and a finished print job does not exist.

FIG. 44 is a schematic diagram indicating another instance of a ready screen displayed on the display screen 1*a*1 in the multi function peripheral 1 of Embodiment 4 in case that any of an executable print job to be executed and a finished print job does not exist.

This ready screen includes (a) a message "Ready to print." indicating that the current screen is a ready screen, (b) an image that indicates the paper sizes, the paper types and the remaining amounts of papers on respective paper drawers in the multi function peripheral 1, and (c) a screen-switch button to detect inputting a request, in terms of operation to this button on this ready screen, for displaying another ready screen. The another ready screen contains an image indicating information other than the remaining amounts of papers, such as remaining amounts of toner with respective colors of YMCK, or the numbers of sheets printed from respective paper drawers with/without the paper sizes and the paper types.

It should be noted that the multi function peripheral 1 of Embodiment 4 may cause the display screen 1*a*1 to display a ready screen further indicating the numbers of printed sheets with respective the paper types.

It should be noted that the multi function peripheral 1 of Embodiment 4 may cause the display screen 1*a*1 to display a ready screen indicating only the paper types of respective paper drawers.

As mentioned above, the multi function peripheral 1 of Embodiment 4 executes a series of the processes.

According to the multi function peripheral 1 of Embodiment 4, when a next print job exists, a ready screen indicating information on the next print job is displayed, and when a finished print job exists, a ready screen indicating information on the finished print job is displayed by the display screen 1*a*1. Therefore, either information on the next print job to be executed or information on execution order of executable print jobs to be executed is provided to an operator who wants to know it, and information on a finished print job is provided to an operator who wants to know it.

Further, according to the multi function peripheral 1 of Embodiment 4, when a finished print job exists, the display screen 1*a*1 indicates the output tray on which documents printed in the finished print job are placed. Therefore, an operator can easily know the output tray to which the documents have been output.

In addition, the operator hardly forgets to pick up the documents.

Furthermore, according to the multi function peripheral 1 of Embodiment 4, when executable print jobs to be executed hereafter exist, the display screen 1*a*1 indicates all the executable print jobs. Therefore, an operator easily notices that the executable print jobs exist, and the execution order of the executable print jobs visually.

Furthermore, the multi function peripheral 1 of Embodiment 4 can display necessary information only when a user who needs the information stands in front of the display panel, therefore a ready screen to be displayed can be chosen from ready screens according to existences of an executable print job and a finished print job.

Furthermore, in the multi function peripheral 1 of Embodiment 4, information indicated in a ready screen can be chosen from ready screens according to existences of an executable print job and a finished print job. Therefore, a display area on the display screen 1*a*1 is utilized efficiently in each case.

Furthermore, the image forming program in the embodiments may be a program that realizes the forementioned functions (i.e. program features) with an application program, an emulator, an OS, a browser, a middleware, or the like.

Furthermore, the program can be stored in computer readable recording media and then techniques in the embodiments can be provided to users by distribution of the media storing the program.

In addition, the image forming program may be provided to users by (a) distributing computer readable recording media storing the program to users, (b) transmitting the program to computers of users via a communication network such as Internet or via wireless communication, and installing the program in the computers, or the like. Alternatively, the image forming program may be used by users via an ASP (Application Service Provider) service.

Further, the image forming program in the embodiments may be described in any of programming languages that includes a high-level language such as C language, Delphi, XTL, Perl (Practical Extraction and Report Language) or XML (eXtensible Markup Language), an object oriented language such as C++, Java, C#, Java2 or Small talk or the like. Alternatively, the image forming program may be generated from a source program described in the such programming language.

Further, the computer readable recording medium for storing the program may be any sort of medium such as magnetic tape, magnetic disk (e.g. flexible disk, hard disk drive), optical disk (e.g. CD-ROM, DVD, BD-ROM (Blu-ray Disk-Read Only Memory), BD-R (Blu-ray Disk-Recordable), BD-RE (Blu-ray Disk-Rewritable)), Magneto-Optical disk, semiconductor memory, or holographic memory.

Further, the computer readable recording medium may be located on a communication network such as LAN, WAN, intranet, or Internet, which the multi function peripheral 1 is connected to.

Further, the number of the computer readable recording media may be one or more. A combination of the media with an identical type or different types can be used.

In addition, the multi function peripheral 1 comprises (a) the program with data structure necessary to realize the forementioned functions, (b) interpreter/translator/intermediate code execution environment, and (c) hardware on which the interpreter, the translator or the intermediate code execution environment operates, if required.

The interpreter, the translator or the intermediate code execution environment may be an implementation of a high-level language such as C language, Delphi, XTL, Perl (Practical Extraction and Report Language) or XML (eXtensible Markup Language), an object oriented language such as C++, Java, C#, Java2 or Small talk, or the like.

The description of the present invention has been presented for purposes of illustration and description, and is not intended to be exhaustive or limited to the invention in the form disclosed. Many modifications and variations will be apparent to those of ordinary skill in the art.

What is claimed is:

1. An image forming apparatus comprising:
a display unit; and
a display controlling unit that causes the display unit to display a first ready screen, a second ready screen and a third ready screen,
wherein the first ready screen is a screen indicating that a job can be accepted when a job can be accepted, and the first ready screen has a first screen switching button for detecting operator's input of a request for displaying the second ready screen and a first default screen registering button for indicating that the first ready screen is a default screen; the default screen being the screen that will be displayed initially when the job can be accepted; said first ready screen has a first information which includes at least one of information on consumable goods or information on record media;
wherein the second ready screen has a second screen switching button for detecting input of a request for displaying said third ready screen and a second default screen registering button for indicating that the second ready screen is the default screen, the second ready screen does not have any information on consumable goods and information record media; and
wherein the third ready screen has a third screen switching button for detecting input of a request for displaying another ready screen and a third default screen registering button for indicating that the third ready screen is the default screen; said third ready screen has a second information which includes at least one of information on consumable goods or information on record media; said second information including different information from said first information; and wherein a user can access the third ready screen from the first ready screen by selecting only two buttons, said two buttons being said second screen switching button and said first screen switching button.

2. The image forming apparatus according to claim 1, wherein the first information contains information on the number of sheets of information record media consumed for each section.

3. The image forming apparatus according to claim 1, wherein the first information contains information on the number of consumed sheets with each size of information record media.

4. The image forming apparatus according to claim 1, wherein the first information contains information on the number of consumed sheets of information record media in each paper drawer.

5. The image forming apparatus according to claim 1, wherein the first information contains information on the number of sheets of information record media that have been printed in each of color printing and monochrome printing.

6. A non-transitory computer readable recording medium storing an image forming program that can be installed in an image forming apparatus with a display unit and causes the display unit to display plural ready screens indicating that a job can be accepted, the image forming program causing a computer in the image forming apparatus to perform features comprising:
a first display controlling feature for causing the display unit to display a first ready screen indicating that a job can be accepted when a job can be accepted; the first ready screen having a first screen switching button for detecting operator's input of a request for displaying a second ready screen and a first default screen registering button for indicating that the first ready screen is a default screen; the default screen being the screen that will be displayed initially when the job can be accepted; said first ready screen having a first information which includes at least one of information on consumable goods or information on record media;
a second display controlling feature for causing the display unit to display a second ready screen when a job can be accepted after detecting input operation to the first button on the first ready screen by an operator, the second ready screen having no information on consumable goods and information record media and having a second screen switching button for detecting input of a request for displaying a third ready screen; and having a second registering button for registering the second ready screen as the default screen; and a third display controlling feature for causing the display unit to display the third ready screen; said third ready screen displaying a second information that includes at least information on consumable goods or information on record media and said second information is different from the type of information; said third ready screen further having a third screen switching button and a third default screen registering button for indicating that the third ready screen is the default screen; and wherein a user can access the third ready screen from the first ready screen by selecting only two buttons, said two buttons being said second screen switching button and said first screen switching button.

7. The computer readable recording medium according to claim 6, wherein the first information contains information on the number of sheets of information record media consumed for each section.

8. The computer readable recording medium according to claim 6, wherein the first information contains information on the number of consumed sheets with each size of information record media.

9. The computer readable recording medium according to claim 6, wherein the first information contains information on the number of consumed sheets of information record media in each paper drawer.

10. The computer readable recording medium according to claim 6, wherein the first information contains information on the number of sheets of information record media that have been printed in each of color printing and monochrome printing.

* * * * *